US012525224B2

(12) United States Patent
Altaf et al.

(10) Patent No.: US 12,525,224 B2
(45) Date of Patent: Jan. 13, 2026

(54) DEEPFAKE DETECTION

(71) Applicant: PINDROP SECURITY, INC., Atlanta, GA (US)

(72) Inventors: Umair Altaf, Atlanta, GA (US); Sai Pradeep Peri, Atlanta, GA (US); Lakshay Phatela, Atlanta, GA (US); Payas Gupta, Atlanta, GA (US); Yitao Sun, Atlanta, GA (US); Svetlana Afanaseva, Atlanta, GA (US); Kailash Patil, Atlanta, GA (US); Elie Khoury, Atlanta, GA (US); Bradley Magnetta, Atlanta, GA (US); Vijay Balasubramaniyan, Atlanta, GA (US); Tianxiang Chen, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 154 days.

(21) Appl. No.: 18/388,385

(22) Filed: Nov. 9, 2023

(65) Prior Publication Data
US 2024/0355319 A1 Oct. 24, 2024

Related U.S. Application Data

(60) Provisional application No. 63/503,903, filed on May 23, 2023, provisional application No. 63/497,587, filed on Apr. 21, 2023.

(51) Int. Cl.
*G10L 15/00* (2013.01)
*G06N 20/00* (2019.01)
(Continued)

(52) U.S. Cl.
CPC ............. *G10L 15/08* (2013.01); *G06N 20/00* (2019.01); *G10L 15/02* (2013.01); *G10L 15/16* (2013.01);
(Continued)

(58) Field of Classification Search
None
See application file for complete search history.

(56) References Cited

U.S. PATENT DOCUMENTS 9,060,057 B1   6/2015   Danis
10,565,498 B1  2/2020   Zhiyanov
(Continued)

FOREIGN PATENT DOCUMENTS

EP    3 156 978 A1    4/2017
FR    3105479 A1      6/2021
(Continued)

OTHER PUBLICATIONS

International Search Report and Written Opinion on International Application No. PCT/US 24/26212 dated Oct. 18, 2024 (19 Pages).
(Continued)

*Primary Examiner* — Satwant K Singh
(74) *Attorney, Agent, or Firm* — Foley & Lardner LLP

(57) ABSTRACT

Disclosed are systems and methods including software processes executed by a server that detect audio-based synthetic speech ("deepfakes") in a call conversation. The server applies an NLP engine to transcribe call audio and analyze the text for anomalous patterns to detect synthetic speech. Additionally or alternatively, the server executes a voice "liveness" detection system for detecting machine speech, such as synthetic speech or replayed speech. The system performs phrase repetition detection, background change detection, and passive voice liveness detection in call audio signals to detect liveness of a speech utterance. An automated model update module allows the liveness detection model to adapt to new types of presentation attacks, based on the human provided feedback.

20 Claims, 15 Drawing Sheets

(51) Int. Cl.
*G10L 15/02* (2006.01)
*G10L 15/08* (2006.01)
*G10L 15/16* (2006.01)
*G10L 15/26* (2006.01)
*G10L 17/06* (2013.01)
*G10L 17/18* (2013.01)
*G10L 17/24* (2013.01)

(52) U.S. Cl.
CPC .............. *G10L 15/26* (2013.01); *G10L 17/06* (2013.01); *G10L 17/18* (2013.01); *G10L 17/24* (2013.01)

(56) References Cited

U.S. PATENT DOCUMENTS

| | | | |
|---|---|---|---|
| 10,607,148 | B1 | 3/2020 | Niewczas |
| 10,657,971 | B1 | 5/2020 | Newstadt et al. |
| 10,853,579 | B2 | 12/2020 | Laxman et al. |
| 10,878,174 | B1 | 12/2020 | Vontobel et al. |
| 11,106,690 | B1 | 8/2021 | Dhillon et al. |
| 11,151,385 | B2 * | 10/2021 | Iyer ........................ G06F 18/22 |
| 11,417,339 | B1 | 8/2022 | Wang et al. |
| 11,481,434 | B1 | 10/2022 | Venti et al. |
| 11,532,301 | B1 | 12/2022 | Hajebi et al. |
| 11,972,760 | B1 | 4/2024 | Chavez et al. |
| 12,062,105 | B2 | 8/2024 | Liberman et al. |
| 2003/0115191 | A1 | 6/2003 | Copperman et al. |
| 2009/0319271 | A1 | 12/2009 | Gross |
| 2009/0319274 | A1 | 12/2009 | Gross |
| 2012/0215776 | A1 | 8/2012 | Guha et al. |
| 2013/0218566 | A1 | 8/2013 | Qian et al. |
| 2013/0262096 | A1 | 10/2013 | Wilhelms-Tricarico et al. |
| 2014/0270114 | A1 | 9/2014 | Kolbegger et al. |
| 2015/0278341 | A1 | 10/2015 | Shen |
| 2016/0253548 | A1 | 9/2016 | Dos Remedios et al. |
| 2016/0323398 | A1 | 11/2016 | Guo et al. |
| 2016/0328547 | A1 * | 11/2016 | Gross .................... H04L 63/123 |
| 2018/0077101 | A1 | 3/2018 | Desouza Sana et al. |
| 2018/0254046 | A1 | 9/2018 | Khoury et al. |
| 2018/0261227 | A1 | 9/2018 | Blouet |
| 2019/0087870 | A1 | 3/2019 | Gardyne et al. |
| 2019/0114496 | A1 | 4/2019 | Lesso |
| 2019/0114497 | A1 | 4/2019 | Lesso |
| 2019/0174000 | A1 | 6/2019 | Bharrat et al. |
| 2019/0206423 | A1 | 7/2019 | Winton et al. |
| 2019/0311722 | A1 | 10/2019 | Caldwell |
| 2019/0378520 | A1 * | 12/2019 | Chiu ........................ G10L 17/26 |
| 2020/0044852 | A1 | 2/2020 | Streit |
| 2020/0118544 | A1 | 4/2020 | Lee et al. |
| 2020/0194032 | A1 | 6/2020 | Basye et al. |
| 2020/0311738 | A1 | 10/2020 | Gupta et al. |
| 2020/0314246 | A1 | 10/2020 | Hart |
| 2021/0141896 | A1 | 5/2021 | Streit |
| 2021/0168238 | A1 | 6/2021 | Adolphe et al. |
| 2021/0193174 | A1 | 6/2021 | Enzinger et al. |
| 2021/0233541 | A1 * | 7/2021 | Chen ........................ G10L 17/02 |
| 2021/0280171 | A1 | 9/2021 | Phatak et al. |
| 2021/0312906 | A1 | 10/2021 | Kuo et al. |
| 2021/0335354 | A1 | 10/2021 | Park |
| 2022/0027648 | A1 | 1/2022 | Trundle et al. |
| 2022/0060578 | A1 | 2/2022 | Kee et al. |
| 2022/0076077 | A1 | 3/2022 | Reddy et al. |
| 2022/0124195 | A1 | 4/2022 | Lu et al. |
| 2022/0215845 | A1 * | 7/2022 | Sharifi .................... G10L 17/04 |
| 2022/0269922 | A1 | 8/2022 | Mathews |
| 2022/0328050 | A1 | 10/2022 | Hennig et al. |
| 2022/0366901 | A1 | 11/2022 | Rathaur et al. |
| 2022/0366916 | A1 | 11/2022 | Dos Santos et al. |
| 2023/0008613 | A1 | 1/2023 | Do et al. |
| 2023/0032728 | A1 | 2/2023 | Hao |
| 2023/0082094 | A1 | 3/2023 | Keret et al. |
| 2023/0134791 | A1 | 5/2023 | Londeree |
| 2023/0153815 | A1 | 5/2023 | Blouet et al. |
| 2023/0161853 | A1 | 5/2023 | Nair et al. |
| 2023/0179823 | A1 | 6/2023 | Marten et al. |
| 2023/0196396 | A1 | 6/2023 | Doumar et al. |
| 2023/0260521 | A1 | 8/2023 | Slocum et al. |
| 2023/0262160 | A1 | 8/2023 | Trivedi et al. |
| 2023/0274758 | A1 | 8/2023 | Markhasin et al. |
| 2023/0386506 | A1 | 11/2023 | Shor et al. |
| 2024/0040066 | A1 | 2/2024 | Liu et al. |
| 2024/0073219 | A1 | 2/2024 | Maizels et al. |
| 2024/0127630 | A1 | 4/2024 | Michaeli et al. |
| 2024/0203408 | A1 | 6/2024 | Li et al. |
| 2024/0249712 | A1 | 7/2024 | Yao et al. |
| 2024/0296698 | A1 | 9/2024 | Matias et al. |
| 2024/0346850 | A1 | 10/2024 | Kolla et al. |
| 2024/0371510 | A1 | 11/2024 | Aman |
| 2024/0378274 | A1 | 11/2024 | Tanski et al. |
| 2024/0406227 | A1 | 12/2024 | Pandit et al. |
| 2024/0420725 | A1 | 12/2024 | Caven et al. |
| 2025/0022473 | A1 | 1/2025 | Eilam Tzoreff |
| 2025/0086213 | A1 | 3/2025 | Dilipkumar et al. |
| 2025/0273232 | A1 | 8/2025 | Seo et al. |

FOREIGN PATENT DOCUMENTS

| | | |
|---|---|---|
| GB | 2 612 032 A | 4/2023 |
| WO | WO-2008/047339 A2 | 4/2008 |

OTHER PUBLICATIONS

International Search Report and Written Opinion issued in International Application No. PCT/US24/23576 dated Sep. 6, 2024 (18 Pages).

Mittal et al. "AI-assisted Tagging of Deepfake Audio Calls using Challenge-Response." Published in ARXIV on Feb. 28, 2024, pp. 1-18, Retrieved on Aug. 14, 2024, Retrieved from: https://arxiv.org/abs/2402.18085.

Shiota et al., "Voice liveness detection algorithms based on pop noise caused by human breath for automatic speaker verification" published in INTERSPEECH 2015 16th Annual Conference of the International Speech Communication Association. (Year:2015).

International Preliminary Report on Patentability (including WO-ISA) from PCT/US2024/023576 dated Oct. 30, 2025.

* cited by examiner

Block diagram of voice liveness detection system

DEEPFAKE DETECTION

CROSS-REFERENCE TO RELATED APPLICATIONS

The application claims priority to U.S. Provisional Application No. 63/503,903, entitled "Deepfake Detection," filed May 23, 2023, which is incorporated by reference in its entirety.

This application claims priority to U.S. Provisional Application No. 63/497,587, entitled "Deepfake Detection in a Call Center," filed Apr. 21, 2023, which is incorporated by reference in its entirety.

TECHNICAL FIELD

This application generally relates to systems and methods for managing, training, and deploying a machine learning architecture for call metadata processing.

BACKGROUND

Automatic speaker verification (ASV) systems are often essential software programs for call centers. For instance, an ASV allows the callers or end-users (e.g., customers) to authenticate themselves to the call center based on the caller's voice during the phone call with a call center agent, or the ASV may capture spoken inputs to an interactive voice response (IVR) program of the call center. The ASV significantly reduces the time and effort of performing functions at the call center, such as authentication. However, ASVs are vulnerable to malicious attacks, such as a "presentation attack." There are two types of presentation attacks. The first type is called "replay attack," when a malicious actor could replay the recorded audio to the ASV system to gain unauthorized access to a victim's account. The second is called a "deepfake attack," when a malicious actor employs software that outputs machine-generated speech (sometimes referred to as deepfake speech or machine-generated speech) using Text-To-Speech (TTS) or generative-AI software for performing speech synthesis or voice-cloning of any person's voice. The presentation attack generates voice signal outputs used to break (or "trick") a voice biometrics function of the authentication programming of the call center system, thereby gaining access to the features and benefits of the call center system or to a particular victim's account.

Deepfake technology has made significant advancements in recent years, enabling the creation of highly realistic, but fake, still imagery, audio playback, and video playback, employable for any number of purposes, from entertainment to misinformation, to launching deepfake attacks. What is needed is improved means for detecting fraudulent uses of audio-based deepfake technology over telecommunications channels. What is further needed are improved voice biometric systems to check whether the voice received is from a live person speaking into a microphone. This is called "voice liveness detection."

SUMMARY

Disclosed herein are systems and methods capable of addressing the above-described shortcomings and may also provide any number of additional or alternative benefits and advantages. Embodiments include systems and methods for detecting any state of audio-based deepfake technology in a call conversation scenario, such as detecting deepfake audio speech signals in calls made to enterprise or customer-facing call centers.

Disclosed herein are systems and methods for voice liveness detection, executing software programming that detects voice liveness by combining speech-phrase repetition detection, background change detection, and passive voice-liveness detection, to make an intelligent decision or prediction about the liveness of a speech utterance. Additionally, an automated model update module that allows the liveness detection model to adapt to new types of presentation attacks, based on the human provided feedback.

A system may include computing hardware and software to perform deepfake or fraud detection using temporal features, such as unnatural delays in a call conversation. For instance, a computing device may perform deepfake or fraud detection using a speaker's response delay times. The response delay times may be computed in a context-dependent or context-independent manner.

Embodiments may include computer-implemented methods or systems for detecting machine-based speech in calls. A computer may obtain inbound audio data for a call, including a plurality of speech segments corresponding to a dialogue between a caller and an agent. The computer may detect from the plurality of speech segments of the inbound audio data, a speech region including a first speech segment corresponding to the agent and a second speech segment corresponding to the caller. The computer may determine a response delay between the first segment corresponding to the agent and the second segment corresponding to the caller. The computer may identify the caller as a deepfake, in response to determining that the response delay fails to satisfy an expected response time for a human speaker.

When determining the response delay, the computer may identify, based on the plurality of timestamps, the response delay corresponding to a time difference between the first speech segment corresponding to a question by the agent and the second speech segment corresponding to an answer by the caller.

When detecting the speech region, the computer may detect a plurality of timestamps defining the first speech segment and the second speech segment in the speech region.

When determining the response delay, the computer may determine a plurality of statistical measures of response delays based on a plurality of timestamps derived from the plurality of speech segments of the inbound audio data.

The plurality of statistical measures may comprise at least one of: (i) a running variance, (ii) a running inter-quartile range, or (iii) a running mean.

When determining the response delay, the computer may adjust the response delay based on a context of the dialogue between the caller and the agent.

The computer may extract a transcription containing text in chronological sequence of each caller speech segment and each agent speech segment.

The computer may determine the expected response time for the human speaker based on historical data of audio data between callers and agents.

The computer may identify the caller as human, in response to determining that the response delay satisfies an expected response time for a human speaker.

The computer may generate an indication, for a user interface, indicating the caller as one of the deepfake or human.

A system may include hardware and software computers for performing deepfake or fraud detection based upon Natural Language Processing (NLP) programming and processes using call audio and textual representations of the call audio. A computer may perform classifications of NLP text, as derived from an audio speech signal. For instance, the computer may perform deepfake detection by applying a machine-learning architecture for deepfake or fraud detection, trained to detect deepfakes (e.g., machine-based utterances or audio data) based on textual content derived from speech signals. The NLP processes include, for example, authorship verification, contextual analysis, Large Language Model (LLM) identification or classification, and emotion recognition, among others.

Embodiments include a computer-implemented method or system for detecting machine-based speech in calls. A computer may obtain an audio speech signal for a caller from a caller device. The computer may identify textual content from the audio speech signal for the caller. The computer may apply a feature extractor to the textual content to generate a plurality of Natural Language Processing (NLP) features. Each NLP feature of the plurality of NLP features indicate a degree of a likelihood that the textual content as machine generated. The computer may classify, based on the plurality of NLP features, the caller as one of a machine or a human.

When applying the feature extractor, the computer may be configured to generate an NLP feature indicating authorship verification. The feature extractor being trained on second textual content from the caller.

When applying the feature extractor, the computer may be configured to generate an NLP feature indicating a degree of contextual similarity between the textual content of the caller and a second textual content of an agent in the audio speech signal. The feature extractor being trained on a textual corpus.

When applying the feature extractor, the computer may be configured to generate an NLP feature indicating a degree of likelihood that the textual content is generated by a Large Language Model (LLM). The feature extractor being trained on a corpus of human text and machine text.

When applying the feature extractor, the computer may be configured to generate one or more NLP features including (i) a sentiment of the caller from a plurality of candidate sentiments and (ii) at least one of an intensity or a duration of the sentiment within the textual content.

When applying the feature extractor, the computer may be configured to generate an NLP feature indicating a distribution of unique words within the textual content.

The computer may be configured to classify the caller based upon a plurality of acoustic features extracted from the audio speech signal.

The computer may be further configured to compare the plurality of NLP features with a rule defining a combination of NLP features correlated with one of machine-generated speech or human-generated speech.

The computer may be further configured to classify the caller as machine, responsive to determining that the plurality of NLP features satisfying a combination of NLP features correlated with machine generated speech.

The computer may be further configured to provide, via an interface, an indication of the caller classified as one of the machine or human.

A system may include hardware and software components that perform deepfake or fraud detection based on unnatural repetition. The system predicts or detects deepfakes or fraud by identifying repeated speech utterances. For instance, a computer includes software programming for identifying unnatural instances of speaker repetitions in content or speech patterns. A human caller is unlikely to repeat themselves perfectly, either perfectly repeating what the human said or perfectly repeating how the human said it.

Embodiments include a computer-implemented method or system for detecting machine-based speech in calls. A computer can obtain a plurality of audio speech signals for a caller from a caller device corresponding to a plurality of instances of a repeated audible prompt provided to the caller device. For each instance of the repeated audible prompt, the computer can extract a set of acoustic features from the audio speech signal. The computer can determine a similarity score for the plurality of audio speech signals based upon each set of acoustic features extracted from each corresponding audio speech signals. The computer can identify the caller as a fraudulent caller in response to determining that the similarity score satisfies a similarity threshold. The fraudulent caller likely provides a plurality of sets of acoustic features that are identical or near-identical to each other.

The computer may transmit each instance of the repeat audible prompt to the caller device.

An interactive voice response (IVR) program may generate the repeated audible prompt for transmission to the caller device.

The acoustic features may include content of the audio speech signal recognized by a machine-learning architecture executed by the computer.

The acoustic features may include low-level acoustic features of the audio speech signal recognized by a machine-learning architecture executed by the computer.

The acoustic features may include speech patterns of the caller in the audio speech signal recognized by a machine-learning architecture executed by the computer.

The computer may apply a dynamic time-warping (DTW) function on a first speech signal and a second speech signal of the plurality of audio speech signals to determine the similarity score between the first speech signal and the second speech signal.

The computer may apply a neural network architecture on a first speech signal and a second speech signal of the plurality of audio speech signals to determine the similarity score between the first speech signal and the second speech signal.

The computer may apply a speaker embedding neural network to extract a speaker embedding using the set of acoustic features from each audio speech signal. The computer may generate the similarity score by comparing each speaker embedding.

The computer may provide, via a user interface, an indication of the caller classified as one of the fraudulent or genuine.

A system may include hardware and software computers for performing passive "liveness detection" with human-agent feedback. The system may perform the liveness detection using a machine-learning architecture trained using reinforcement learning. For instance, a passive liveness detection system detects machine-related speech for presentation attacks (e.g., detecting replayed speech or synthetic speech) that extracts and evaluates spoofprints to generate a liveness risk score. A human-agent of the call center provides training feedback to the machine-learning architecture, causing the functions of the machine-learning architecture to fully or partially update the spoofprint models of the machine-learning architecture.

Embodiments may include systems and computer-implemented methods for detecting machine-based speech in calls. A computer may obtain a raw audio signal from a calling device including a speech signal for a speaker. The computer may apply a spoofprint extractor of a machine-learning architecture on the raw audio signal to extract spoofprint embedding representing a set of spoofing artifacts in a set of acoustic features. The computer may apply a spoofing classifier of the machine-learning architecture on the spoofprint embedding to generate a liveness score indicating a likelihood that the speaker is a human speaker. The computer may retrain at least a portion of the machine-learning architecture, in response to the computer identifying a new machine spoof attack.

The computer may receive a user input containing an indication, via a user interface, an indicating the speech signal in the raw audio signal as the new machine spoof attack.

The computer may determine a loss metric to retrain the machine-learning architecture based on a comparison between the liveness score and an indication of the new machine spoof attack.

The computer may update the machine-learning architecture in response to identifying no machine spoof attack associated with the speech signal in the raw audio signal.

The computer may generate the set of spoofing artifacts in the set of acoustic features from the raw audio signal.

The computer may train the spoofprint extractor and the spoofing classifier of the machine-learning architecture using an initial training dataset comprising a plurality of examples, each of the plurality of examples identifying (i) a sample raw audio signal and (ii) an indication of one of human speaker or machine spoof attack.

When retraining the machine-learning architecture, the computer may retrain both of the spoofprint extractor and the spoofing classifier of the machine-learning architecture using an identification of the new machine spoof attack.

When retraining the machine-learning architecture, The computer may retrain the portion of the machine-learning architecture using an identification of the new machine spoof attack, while maintaining a remaining portion of the machine-learning architecture.

The computer may update a plurality of data points of a training dataset to include a new data point associated with the identification of the new machine spoof attack. The computer may retrain the machine-learning architecture in accordance with one or more policies and using the plurality of data points with the new data point.

The computer may generate an indicator, for a user interface, indicating the speaker is one of a human speaker or a machine spoof attack, based upon a comparison between the liveness score and a threshold.

A system may include hardware and software components that perform for voice liveness detection. For instance, a computer may perform overall passive liveness detection system, which may include detecting replayed speech or synthetic speech) that generates a liveness risk score using unnatural repetition, unnatural changes in background noise, and train/re-train using human-agent feedback.

Embodiments may include systems and computer-implemented methods for generating liveness scores for audio in calls. A computer may obtain a raw audio signal from a calling device including a speech signal for a speaker. The computer determine a plurality of scores based on the raw audio signal, the plurality of scores comprising at least one of (i) a first score identifying background change or (ii) a second score identifying passive liveness of the speech signal of the speaker. The computer may apply a machine-learning architecture to the plurality of scores to generate a liveness score indicating a likelihood that the speaker is a human. The computer may generate a classification of the speaker as one of human or machine based on the liveness score for the speech signal.

The computer may receive a feedback dataset identifying a second classification indicating the speaker as one of human or machine. The computer may retrain the machine-learning architecture using a comparison of the classification and the second classification of the feedback dataset.

When identifying the raw audio signal, the computer may identify a training dataset including (i) the raw audio signal and (ii) a label indicating one of machine or human for the raw audio signal. The computer may update the machine-learning architecture based on a comparison between the classification from the machine-learning architecture and the label of the training dataset.

The computer may determine based on at least one of feedback or training data, a threshold to compare against the liveness score to generate the classification.

When determining the plurality of scores, the computer may apply the machine-learning architecture to extract a plurality of features from the raw audio signal and to generate the plurality of scores based on the plurality of features.

When determining the plurality of scores, the computer may determine the plurality of scores including a third score identifying repetition of speech within the speech signal.

When applying the machine-learning architecture, the computer may apply a plurality of weights defined by the machine-learning architecture to the plurality of scores to generate the liveness score.

When applying the machine-learning architecture, the computer may apply a neural network of the machine-learning architecture to generate the liveness score.

When obtaining the raw audio signal, the computer may identify from the raw audio signal, the speech signal corresponding to passive speech of the speaker.

The computer may provide, via an interface, an indication of the classification of the speaker as one of human or machine.

A system may include hardware or software components that performs liveness detection for multi-factor authentication for callers or end-users. For instance, a system may employ voice liveness detection as a second-factor of authenticating a user's device or user-side mobile application.

Embodiments may include systems and computer-implemented methods for authenticating users based on speech of audio signals. The computer may obtain, responsive to a first authentication of a user using authentication credentials, an audio speech signal of the user for a second authentication. The computer may extract a plurality of features from the audio speech signal. The computer may generate using the plurality of features, a liveness score indicating a likelihood that the user is a human speaker. The computer may execute, by the computer, using the liveness score, the second authentication to determine whether to permit the user access.

When obtaining the audio speech signal, the computer may present a prompt to direct the user to provide the audio speech signal, responsive to authenticating the user in the first authentication using the authentication credentials.

When generating the liveness score, the computer may apply a machine-learning architecture to the plurality of features to generate the liveness score. The machine-learning architecture is trained on a plurality of examples, each example identifying a second plurality of features and a label indicating one of human speech or machine-generated speech.

When generating the liveness score, the computer may apply a machine-learning architecture to (i) generate a plurality of scores using the plurality of features and (ii) generate the liveness score based on a combination of the plurality of scores.

The plurality of scores may comprise at least one of: (i) a first score identifying background change, (ii) a second score identifying passive liveness of the speech signal of the speaker, or (iii) a third score identifying repetition of speech within the speech signal.

Wherein extracting the plurality of features, the computer may apply a machine-learning architecture to generate the plurality of features including a set of embeddings representing spoofing artifacts in the audio speech signal.

When generating the liveness score, the computer may apply the machine-learning architecture to the set of embedding representing the spoofing artifacts to determine the liveness score.

When execute the second authentication, the computer may perform the second authentication to restrict the user access to a resource, responsive to the liveness score not satisfying a threshold.

When performing the second authentication, the computer may perform the second authentication to permit the user access to a resource, responsive to the liveness score satisfying a threshold.

The computer may generate an indication of a result of the second authentication indicating whether to permit the user access based on the liveness score.

A system may include hardware or software components that perform fraud detection or liveness detection based on the audio background on a caller's side of a call. For instance, a computer may determine a likelihood of fraud or perform liveness detection by executing processes for detecting or evaluating natural or unnatural changes in an audio background.

Embodiments include a computer-implemented method or systems for detecting machine-based speech in calls. In response to a computer detecting a first speech region in a first audio signal received during a call from a caller, the computer may apply an event classifier on a first set of acoustic features extracted from the first audio signal to classify a first set of background audio events in the first audio signal. In response to the computer detecting a second speech region in a second audio signal received during the call, the computer may apply the event classifier on a second set of acoustic features extracted from the second audio signal to classify a second set of background audio events in the second audio signal. The computer may generate a machine likelihood score based upon an amount of similarity between the first set of background audio events and the second set of background audio events obtained during the call. The computer may identify the caller as a machine caller in response to determining that the machine likelihood score satisfies a similarity threshold.

When generating the machine likelihood score, the computer may generate the machine likelihood score based upon identifying a first background event in the first audio signal and a second background event in the second audio signal within a time period during the call. The machine caller provides a plurality of sets of background audio events that are distinct throughout the call.

When generating the machine likelihood score, the computer may apply an attack prediction model to the first set of background events and the second set of background events to generate the machine likelihood score over a first segment corresponding to the first audio signal and a second segment corresponding to the second audio signal.

When applying the event classifier on the first set of acoustic features, the computer may apply the event classifier to detect one or more first anomalous events within the first audio signal. When applying the event classifier on the second set of acoustic features, the computer may apply the event classifier to detect one or more second anomalous events within the second audio signal.

The computer may apply an estimation model to the first set of acoustic features to determine a first quality metric indicating a first degree of change in quality through the first audio signal. The computer may apply the estimation model to the second set of acoustic features to determine a second quality metric indicating a second degree of change in quality through the second audio signal.

The first quality metric and the second quality metric each include at least one of: (i) a respective noise type, (ii) a respective reverberation ratio, or (iii) a respective signal to noise (SNR) ratio.

When generating the machine likelihood score, the computer may generate the machine likelihood score based upon a comparison between the first quality metric and the second quality metric.

The computer may extract the first set of acoustic features from a first background in the first audio signal. The computer may extract the second set of acoustic features from a second background in the second audio signal.

The computer may identify the caller as a human caller in response to determining that the machine likelihood score does not satisfy a similarity threshold.

The computer may generate an indication, for a user interface, of the caller as a machine caller in response to determining that the machine likelihood score satisfies the threshold.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
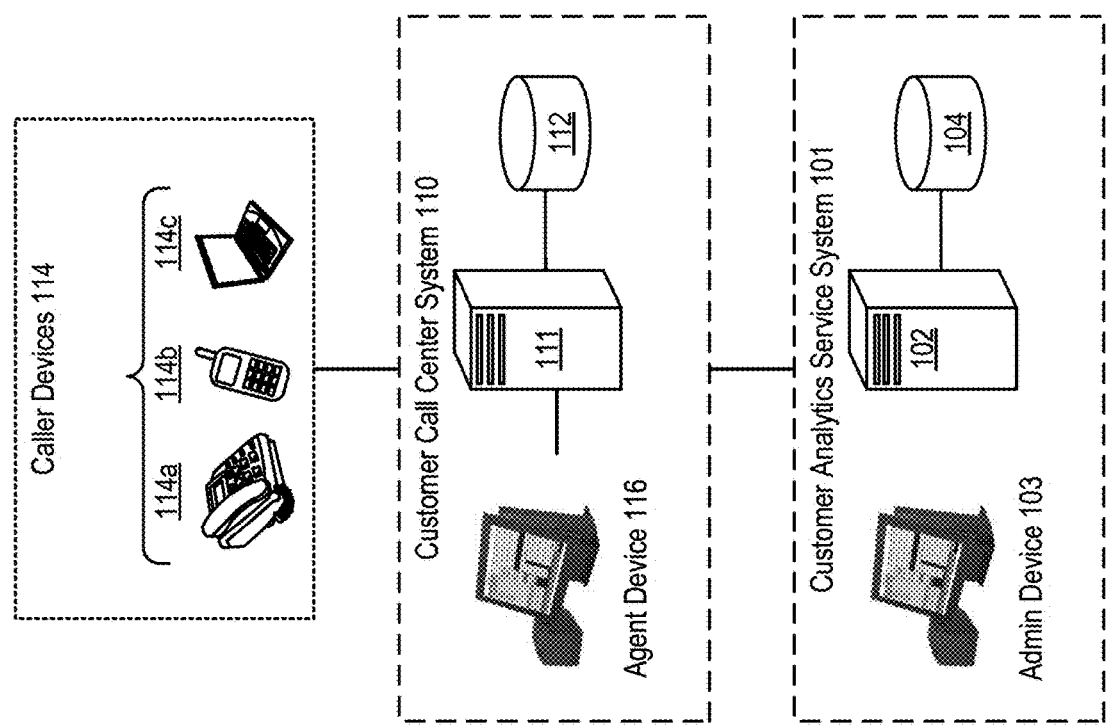
FIG. 1 show a block diagram of a system for handling and analyzing calls from callers, according to an illustrative embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Deep learning is particularly well-suited for creating deepfakes because it allows for creating highly realistic and convincing audio deepfakes. One popular technique for creating audio deepfakes is using a generative model, such as a generative adversarial network (GAN). GANs consist of two neural networks: a generator and a discriminator. The generator generates new audio samples, while the discriminator attempts to distinguish between real and fake audio samples. Over time, the generator learns to produce more realistic audio samples, while the discriminator becomes more adept at detecting fake audio. Another popular technique for creating audio deepfakes is WaveNet, which uses a convolutional neural network (CNN) to model the audio waveform. The CNN is trained on a large dataset of audio samples and learns to generate new audio samples similar to the ones in the training dataset. This technique allows for the creation of highly realistic and convincing audio deepfakes. The use of machine learning and deep learning techniques such as GANs and WaveNet, allows for the creation of highly realistic and convincing audio deepfakes. The usage of these techniques is one of the key factors that sets audio deepfake technology apart from traditional methods of audio manipulation and makes it more powerful and sophisticated.

As the technology evolves and improves, the instance of audio deepfakes being created and used in various applications may likely increase.

Audio deepfakes can circumvent voice biometrics, a technology that uses an individual's unique voice characteristics to authenticate their identity, by creating highly realistic and convincing audio samples that mimic the target individual's voice. This can make it difficult for voice biometric systems to distinguish between real and fake audio samples and may allow imposters to gain unauthorized access to secure systems or information. One way in which audio deepfakes can circumvent voice biometrics is by using a technique called voice conversion. This technique uses machine learning models to convert an audio sample of one person's voice into another person's voice. This can be used to create an audio deepfake that mimics the target individual's voice, making it difficult for voice biometric systems to detect the imposter. Another way in which audio deepfakes can circumvent voice biometrics is by using a technique called voice cloning. This technique uses machine learning models to generate new audio samples similar to the target individual's voice. The deepfake audio generated can be used to impersonate the target individual, making it difficult for voice biometric systems to detect the imposter.

Detection of deepfakes is challenging, as the deepfake audio can be highly realistic and difficult to distinguish from real audio. However, several methods can be used to detect audio deepfakes. One method is to analyze the audio signal, looking for signs of manipulation or inconsistencies. For example, the audio may have been compressed or resampled, which can create artifacts in the signal. Additionally, the audio may have been synthesized using a machine-learning model, which can create patterns in the signal that are not found in real audio. Another method for detecting audio deepfakes is to use machine learning models to classify audio samples as real or fake. These models can be trained on a dataset of real and fake audio samples, and then used to classify new audio samples. One popular technique for this is using a discriminator network, similar to the one used in GANs. The network is trained to distinguish between real and fake audio samples and then used to classify new audio samples. Another approach is to use signal processing and machine learning techniques to detect deepfake audio. Some examples use techniques such as frame-level pitch and voice activity detection, Mel Frequency Cepstral Coefficient (MFCC) extraction, and Dynamic Time Warping (DTW) to extract features from audio and then use a machine learning algorithms or techniques, such as Random Forest or Support Vector Machines (SVM), to train and implement a classifier.

As the technology evolves, detecting audio deepfakes using existing voice biometric systems may become increasingly challenging. Additionally, it is important to consider implementing multiple layers of security, such as using multiple biometric modalities or a combination of biometric and behavioral-based fraud detection methods.

Presented herein are systems and methods to detect attacks presented via replay audio or deepfake audio in a conversation over a phone call (e.g. a caller calling a bank's call center). Attackers can synthetically generate one end of the dialogue using the above mentioned techniques. The proposal relies on temporal, emotional and language cues that characterize human speech when instantiated in voice but are likely to be absent or statistically different for deepfake audio.

The intent of a deepfake audio in such a scenario is to impersonate a human and make the person on the other end (or a voice-enabled IVR, a voice-assistant enabled IVR, or AI-enabled IVR) of the conversation believe that the deepfake audio is from another person, rather than a computer system synthesizing a deepfake audio. This is distinct from a spoken language dialogue system where the person in the conversation knows and understands that the audio from the other end is generated by a computer system.

An example use-case for deepfake audio is the telephone contact center or the call center of a service-providing organization such as a bank or a retailer. The call center employs automated systems such as IVRs and human agents to service call requests such as order information or wire transfers. In the wrong hands, deepfake audio can be used to scale up the social engineering, vishing, and account takeover attacks against the call center agents since it can automatically impersonate a human caller.

Embodiments include a system for active liveness detection as a standalone without voice biometrics. Alternatively, embodiments include a system for Active liveness detection with voice biometrics for trustworthy speaker enrollment and verification.

FIG. 1 shows components of an example system 100 for handling and analyzing calls from callers, according to an embodiment. The system 100 includes components that, for example, recognize and authenticate callers, and evaluate fraud risks for calls. Evaluating or detecting fraud risks may include operations for identifying instances of fraudulent audio signals, such as deepfake or synthetic audio signals, received during a conversation over a telephone call or any app-based call having audio features (e.g., Whatsapp® call, Skype® call). The system 100 comprises a call analytics system 101, call center systems 110 of customer enterprises (e.g., companies, government entities, universities), and caller devices 114a-114c (generally referred to as caller devices 114). The call analytics system 101 includes analytics servers 102, analytics databases 104, and admin devices 103. The call center system 110 includes call center servers 111, call center databases 112, and agent devices 116.

Embodiments may comprise additional or alternative components or omit certain components from those of FIG. 1, and still fall within the scope of this disclosure. It may be common, for example, to include multiple call center systems 110 or for the call analytics system 101 to have multiple analytics servers 102. Embodiments may include or otherwise implement any number of devices capable of performing the various features and tasks described herein. For example, the FIG. 1 shows the analytics server 102 as a distinct computing device from the analytics database 104. In some embodiments, the analytics database 104 may be integrated into the analytics server 102.

Various hardware and software components of one or more public or private networks may interconnect the various components of the system 100. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the caller devices 114 may communicate with callees (e.g., call center systems 110) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as carriers, exchanges, and networks, among others.

The caller devices 114 may be any communications or computing device that the caller operates to place the telephone call to the call destination (e.g., the call center system 110). Non-limiting examples of caller devices 114 may include landline phones 114a and mobile phones 114b. That the caller device 114 is not limited to telecommunications-oriented devices (e.g., telephones). As an example, the caller device 114 may include a caller computing device 114c, which includes an electronic device comprising a processor and/or software, such as or personal computer, configured to implement voice-over-IP (VOIP) telecommunications. As another example, the caller computing device 114c may be an electronic IoT device (e.g., voice assistant device, "smart device") comprising a processor and/or software capable of utilizing telecommunications features of a paired or otherwise networked device, such as a mobile phone 114b.

The call analytics system 101 and the call center system 110 represent network infrastructures 101, 110 of the system 100. Each infrastructure 101, 110 comprises physically and logically related software and electronic devices managed or operated by various enterprise organizations. The devices of each network system infrastructure 101, 110 are configured to provide the intended services of the particular enterprise organization.

The analytics server 102 of the call analytics system 101 may be any computing device comprising one or more processors and software, and capable of performing the various processes and tasks described herein. The analytics server 102 may host or be in communication with the analytics database 104, and receives and processes call data (e.g., audio recordings, metadata) received from the one or more call center systems 110. Although FIG. 1 shows only single analytics server 102, the analytics server 102 may include any number of computing devices. In some cases, the computing devices of the analytics server 102 may perform all or sub-parts of the processes and benefits of the analytics server 102. The analytics server 102 may comprise computing devices operating in a distributed or cloud computing configuration and/or in a virtual machine configuration. It should also be appreciated that, in some embodiments, functions of the analytics server 102 may be partly or entirely performed by the computing devices of the call center system 110 (e.g., the call center server 111).

The analytics server 102 executes audio-processing software that includes a neural network that performs speaker spoof detection, among other potential operations (e.g., speaker recognition, speaker verification or authentication, speaker diarization). The neural network architecture operates logically in several operational phases, including a training phase, an enrollment phase, and a deployment phase (sometimes referred to as a test phase or testing). The inputted audio signals processed by the analytics server 102 include training audio signals, enrollment audio signals, and inbound audio signals processed during the deployment phase. The analytics server 102 applies the neural network to each of the types of inputted audio signals during the corresponding operational phase.

The analytics server 102 or other computing device of the system 100 (e.g., call center server 111) can perform various pre-processing operations and/or data augmentation operations on the input audio signals. Non-limiting examples of the pre-processing operations include extracting low-level features from an audio signal, parsing and segmenting the audio signal into frames and segments and performing one or more transformation functions, such as Short-time Fourier Transform (SFT) or Fast Fourier Transform (FFT), among other potential pre-processing operations. Non-limiting examples of augmentation operations include audio clipping, noise augmentation, frequency augmentation, duration augmentation, and the like. The analytics server 102 may perform the pre-processing or data augmentation operations before feeding the input audio signals into input layers of the neural network architecture or the analytics server 102 may execute such operations as part of executing the neural network architecture, where the input layers (or other layers) of the neural network architecture perform these operations. For instance, the neural network architecture may comprise in-network data augmentation layers that perform data augmentation operations on the input audio signals fed into the neural network architecture.

During training, the analytics server 102 receives training audio signals of various lengths and characteristics from one or more corpora, which may be stored in an analytics database 104 or other storage medium. The training audio signals include clean audio signals (sometimes referred to as samples) and simulated audio signals, each of which the analytics server 102 uses to train the neural network to recognize speech occurrences. The clean audio signals are audio samples containing speech in which the speech is identifiable by the analytics server 102. Certain data augmentation operations executed by the analytics server 102 retrieve or generate the simulated audio signals for data augmentation purposes during training or enrollment. The data augmentation operations may generate additional versions or segments of a given training signal containing manipulated features mimicking a particular type of signal degradation or distortion. The analytics server 102 stores the training audio signals into the non-transitory medium of the analytics server 102 and/or the analytics database 104 for future reference or operations of the neural network architecture.

During the training phase and, in some implementations, the enrollment phase, fully connected layers of the neural network architecture generate a training feature vector for each of the many training audio signals and a loss function (e.g., LMCL) determines levels of error for the plurality of training feature vectors. A classification layer of the neural network architecture adjusts weighted values (e.g., hyper-parameters) of the neural network architecture until the outputted training feature vectors converge with predetermined expected feature vectors. When the training phase concludes, the analytics server 102 stores the weighted values and neural network architecture into the non-transitory storage media (e.g., memory, disk) of the analytics server 102. During the enrollment and/or the deployment phases, the analytics server 102 disables one or more layers of the neural network architecture (e.g., fully-connected layers, classification layer) to keep the weighted values fixed.

During the enrollment operational phase, an enrollee, such as an end-consumer of the call center system 110, provides several speech examples to the call analytics system 101. For example, the enrollee could respond to various interactive voice response (IVR) prompts of IVR software executed by a call center server 111. The call center server 111 then forwards the recorded responses containing bona fide enrollment audio signals to the analytics server 102. The analytics server 102 applies the trained neural network architecture to each of the enrollee audio samples and generates corresponding enrollee feature vectors (sometimes called "enrollee embeddings"), though the analytics server 102 disables certain layers, such as layers employed for training the neural network architecture. The analytics server 102 generates an average or otherwise algorithmically combines the enrollee feature vectors and stores the enrollee feature vectors into the analytics database 104 or the call center database 112.

Layers of the neural network architecture are trained to operate as one or more embedding extractors that generate the feature vectors representing certain types of embeddings. The embedding extractors generate the enrollee embeddings during the enrollment phase, and generate inbound embeddings (sometimes called "test embeddings") during the deployment phase. The embeddings include a spoof detection embedding (sometimes referred to as a "spoofprint") and a speaker recognition embedding (sometimes referred to as a "voiceprint"). As an example, the neural network architecture generates an enrollee spoofprint and an enrollee voiceprint during the enrollment phase, and generates an inbound spoofprint and an inbound voiceprint during the deployment phase. Different embedding extractors of the neural network architecture generate the spoofprints and the voiceprints, though the same embedding extractor of the neural network architecture may be used to generate the spoofprints and the voiceprints in some embodiments.

As an example, the spoofprint embedding extractor may be a neural network architecture (e.g., ResNet, SyncNet) that processes a first set of features extracted from the input audio signals, where the spoofprint extractor comprises any number of convolutional layers, statistics layers, and fully-connected layers and trained according to the LMCL. The voiceprint embedding extractor may be another neural network architecture (e.g. (e.g., ResNet, SyncNet) that processes a second set of features extracted from the input audio signals, where the voiceprint embedding extractor comprises any number of convolutional layers, statistics layers, and fully-connected layers and trained according to a softmax function.

As a part of the loss function operations, the neural network performs a Linear Discriminant Analysis (LDA) algorithm or similar operation to transform the extracted embeddings to a lower-dimensional and more discriminative subspace. The LDA minimizes the intra-class variance and maximizes the inter-class variance between genuine training audio signals and spoof training audio signals. In some implementations, the neural network architecture may further include an embedding combination layer that performs various operations to algorithmically combine the spoofprint and the voiceprint into a combined embedding (e.g., enrollee combined embedding, inbound combined embedding). The embeddings, however, need not be combined in all embodiments. The loss function operations and LDA, as well as other aspects of the neural network architecture (e.g., scoring layers) are likewise configured to evaluate the combined embeddings, in addition or as an alternative to evaluating separate spoofprint and voiceprints embeddings.

The analytics server 102 executes certain data augmentation operations on the training audio signals and, in some implementations, on the enrollee audio signals. The analytics server 102 may perform different, or otherwise vary, the augmentation operations performed during the training phase and the enrollment phase. Additionally or alternatively, the analytics server 102 may perform different, or otherwise vary, the augmentation operations performed for training the spoofprint embedding extractor and the voiceprint embedding extractor. For example, the server may perform frequency masking (sometimes call frequency augmentation) on the training audio signals for the spoofprint embedding extractor during the training and/or enrollment phase. The server may perform noise augmentation for the voiceprint embedding extractor during the training and/or enrollment phase.

During the deployment phase, the analytics server 102 receives the inbound audio signal of the inbound phone call, as originated from the caller device 114 of an inbound caller. The analytics server 102 applies the neural network on the inbound audio signal to extract the features from the inbound audio and determine whether the caller is an enrollee who is enrolled with the call center system 110 or the analytics system 101. The analytics server 102 applies each of the layers of the neural network, including any in-network augmentation layers, but disables the classification layer. The neural network generates the inbound embeddings (e.g., spoofprint, voiceprint, combined embedding) for the caller and then determines one or more similarity scores indicating the distances between these feature vectors and the corresponding enrollee feature vectors. If, for example, the similarity score for the spoofprints satisfies a predetermined spoofprint threshold, then the analytics server 102 determines that the inbound phone call is likely spoofed or otherwise fraudulent. As another example, if the similarity score for the voiceprints or the combined embeddings satisfies a corresponding predetermined threshold, then the analytics server 102 determines that the caller and the enrollee are likely the same person or that the inbound call is genuine or spoofed (e.g., synthetic speech).

Following the deployment phase, the analytics server 102 (or another device of the system 100) may execute any number of various downstream operations (e.g., speaker authentication, speaker diarization) that employ the determinations produced by the neural network at deployment time.

The analytics database 104 and/or the call center database 112 may contain any number of corpora of training audio signals that are accessible to the analytics server 102 via one or more networks. In some embodiments, the analytics server 102 employs supervised training to train the neural network, where the analytics database 104 includes labels associated with the training audio signals that indicate which signals contain speech portions. The analytics server 102 may also query an external database (not shown) to access a third-party corpus of training audio signals. An administrator may configure the analytics server 102 to select the speech segments to have durations that are random, random within configured limits, or predetermined at the admin device 103. The duration of the speech segments vary based upon the needs of the downstream operations and/or based upon the operational phase. For example, during training or enrollment, the analytics server 102 will likely have access to longer speech samples compared to the speech samples available during deployment. As another example, the analytics server 102 will likely have access to longer speech samples during telephony operations compared to speech samples received for voice authentication.

The call center server 111 of a call center system 110 executes software processes for managing a call queue and/or routing calls made to the call center system 110, which may include routing calls to the appropriate call center agent devices 116 based on the inbound caller's comments, instructions, IVR inputs, or other inputs submitted during the inbound call. The call center server 111 can capture, query, or generate various types of information about the call, the caller, and/or the caller device 114 and forward the information to the agent device 116, where a graphical user interface (GUI) of the agent device 116 displays the information to the call center agent. The call center server 111 also transmits the information about the inbound call to the call analytics system 101 to preform various analytics processes on the inbound audio signal and any other audio data. The call center server 111 may transmit the information and the audio data based upon a preconfigured triggering conditions (e.g., receiving the inbound phone call), instructions or queries received from another device of the system 100 (e.g., agent device 116, admin device 103, analytics server 102), or as part of a batch transmitted at a regular interval or predetermined time.

The call center server 111 executes software programming for an IVR program. The IVR program may provide for automated communications between the caller on the caller device 114 and the call center server 111 (or the agent on one of the agent devices 116). The IVR program may augment or facilitate call routing process from the caller in the caller device 114 to the call center server 111. Upon the caller device 114 initiating a call with the call center server 111, the IVR program on the call center server 111 may provide an audio prompt to the caller device 114. The audio prompt may direct the caller to provide a request to the call center server 111. In response, the caller may provide a caller input via the caller device 114 to the IVR program on the call center server 114. The caller input may be, for example, a caller voice input, keypad input, keyboard event, or a mouse event, among others. The IVR program may process the caller input (e.g., executing programming of a NLP algorithm) to extract information for additional process. The IVR program may provide an audio output to the caller to prompt for additional information. The IVR program may also forward or route the caller to one of the agent devices 116 at the caller center server 111.

The admin device 103 of the call analytics system 101 is a computing device allowing personnel of the call analytics system 101 to perform various administrative tasks or user-prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the user employs the admin device 103 to configure the operations of the various components of the call analytics system 101 or call center system 110 and to issue queries and instructions to such components.

The agent device 116 of the call center system 110 may allow agents or other users of the call center system 110 to configure operations of devices of the call center system 110. For calls made to the call center system 110, the agent device 116 receives and displays some or all of the relevant information associated with the call routed from the call center server 111.

The customer analytics system 101 (including admin device 103 or the call center server 111) or the call center system 110 (including the agent device 116 or the call center server 111) may execute or have an analytics system. The analytics system may perform analysis of the audio in the call between the agent on the agent device 116 and the caller on the caller device 114 to detect deepfakes audio. A deepfake audio may correspond to or include audio synthesized or generated by a non-human, machine source. It may be difficult for a human listener to discern audio from a human source, versus such a deepfake audio. In analyzing, the analytics system may extract acoustic features from the audio between the agent and the caller. From the features, the analytics system may apply machine learning architecture or other algorithms on the acoustic features to determine whether the audio is a deepfake audio. In some embodiments, the operations of the analytics system may be spread between the customer call center system 110 (including the agent device 116) and the customer analytics services systems 101 (including the admin device 103). For instance, the agent device 116 may interface with the admin device 103 to perform the analysis of the audio between the caller and the agent. Details regarding the analytics system are detailed herein.

Figure 2:
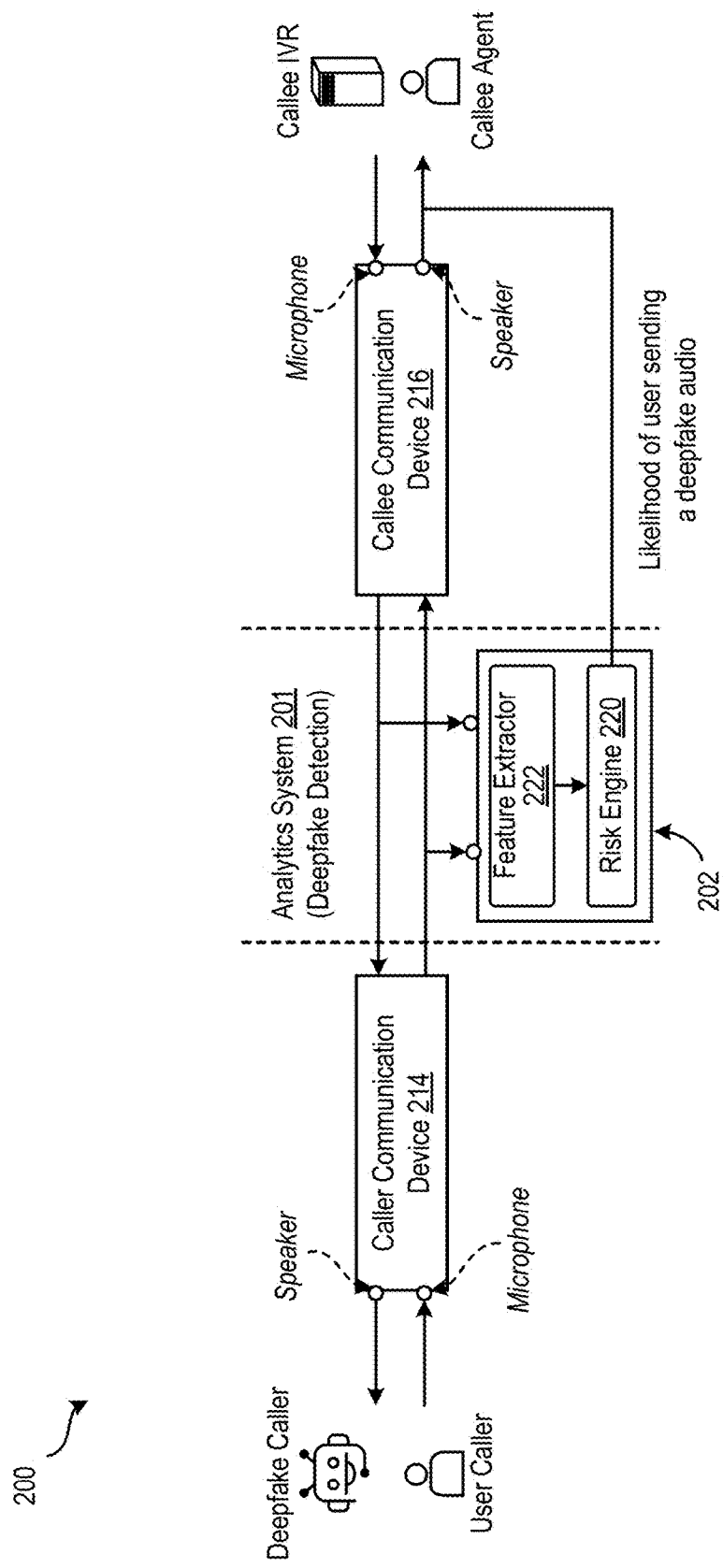
FIG. 2 shows a block diagram of an example system architecture for identifying a deepfake audio during a conversation, according to an illustrative embodiment.

FIG. 2 shows dataflow amongst components of a system 200 including a machine-learning architecture (e.g., neural network architecture) for identifying a deepfake audio during a conversation over a telephone call or any audio call. The system 200 may include an analytics system 201 having an analytics server 202, a caller communication device 214, and callee communication device 216, among others. The analytics server 202 may include software programming that performs functions of a feature extractor 222 and a risk engine 220, among others.

The caller communication device 214 may be any communications or computing device (e.g., similar to the caller device 114) to be used to place a call to a call destination (e.g., the callee communication device 216). In some circumstances, the user of the caller communication device 214 may be a person or an entity (sometimes herein referred to as a caller) that initiates interaction with the callee communication device 216 through an audio-based communication protocol that captures and sends audio signals, which may contain instances or utterances of the caller's voice. Additionally or alternatively, in some circumstances, the user includes a device or computing system generating deepfake audio. Oftentimes, no data, other than the call data containing the audible voice signals, is provided to the analytics system 201 from the user or from an intermediate call center (e.g., call center system 110 and call center server 111).

The callee communication device 216 may be any communications or computing device that receives the audio data from the caller device 214 and handles the inbound call. The callee device 216 includes hardware and software components for automated call-handling, such as a callee IVR system, or for presenting certain call data to a callee-agent user of the callee, such as devices of callee agents. For instance, the callee device(s) 216 includes computing device (e.g., call center server 111) executing software functions of a callee IVR system that captures call data and inputs from the caller device 214 and routes the call according to inputs from the caller device 214. Additionally or alternatively, the callee device(s) 216 includes a computing device (e.g., similar to the agent device 116) operated by a user of the callee (e.g., callee-agent of the call center system 110), which presents the call data to the callee-agent and provides the audio data to the callee-agent. The call may be received and handled by more than one callee device 216. For instance, the call may be received and handled by a callee device 216 operating as the IVR system, programmed to the call to the callee-agents according to selection inputs received from the caller device 214. The intent of the (deepfake caller) user at the caller communication device 214 would be to convince the receiver-callee (e.g., callee IVR, callee agent) at the callee communication device 216 that the callee is receiving call data or in a conversation with a user caller who is a live human.

The analytics system 201 may be one or more computing devices to process data associated with the call between the caller communication device 214 and the callee communication device 216. Upon receipt of the call, the callee communication device 216 may forward the data to the analytics system 201 for further analysis. In some embodiments, the analytics system 201 may be an intermediary between the caller communication device 214 and the callee communication device 216 with visibility to the call with the caller communication device 214 and the callee communication device 216. The analytics server 202 in the analytics system 201 may be any computing device executing software components of a deepfake detection system (DDS) to analyze and evaluate the call. The DDS applies various software programming operations on the call data (e.g., call metadata, audio signal data) that determines the likelihood of the caller being a deepfake audio caller and/or likelihood of the caller being a human user caller.

The feature extractor 222 executing on the analytics server 202 includes software programming that, for example, generates or extracts a set of features from audio data of the call between the caller communication device 214 and the callee communication device 216. The software features of the feature extractor 222 includes various functional aspects (e.g., executable functions, machine-learning layers, machine-learning models) of one or more machine-learning architectures for performing the various functions of the feature extractor 222 described herein. The features may refer to any data (e.g., acoustic parameters, NLP features, sentiment analysis, speech patterns, or timestamps) derived from the call. When the user on the caller communication device 214 initiates a call, the caller and the caller device 214 is connected to the callee device 216. The audio or other types of call data from the call may be sent to the analytics system 201. The feature extractor 222 may detect speech from the audio (e.g., using a voice activity detection (VAD) program) and extract, for example, temporal features or emotional features. In some cases, the VAD program or feature extractor 222 (or other software component of the server 202) performs functions for generating a text-based audio transcription file of the call audio. The server 202 applies the feature extractor 222 on the transcription, and the feature extractor 222 (or other machine-learning architecture) is trained to extract NLP features from the audio transcription file.

The risk engine 220 executing on the analytics server 202 includes software programming that, for example, calculates or determines a risk score indicating a likelihood that the caller at the caller communication device 214 is a human user or a deepfake caller, based on the set of extracted features. The extracted features may be then sent to the risk engine 220. The software programming of the risk engine 220 includes various functional aspects (e.g., executable functions, machine-learning layers, machine-learning models) of one or more machine-learning architectures for performing the various functions of the risk engine 220 described herein, such as analyzing and calculating the risk score using one or more machine learning models and machine-learning techniques. The risk engine 220 may compare the risk score against a risk threshold and/or other threshold scores (e.g., liveness score, fraud score). In some implementations, the analytics server 202 transmits the outputs of the risk engine 220 to the callee device 216, and the callee device 216 handles the call using the outputs of the risk engine 220. For instance, the callee device 216 includes a graphical user interface that presents the output score(s) to the callee-agent, and the callee-agent indicates whether the callee device 216 (or other device of the system 200) should drop the call or take another action. In some implementations, the analytics server 202 sends instructions to the callee device 216 for automatically handling the call. For instance, the callee device 216 includes the callee IVR software preconfigured to automatically handle the call (e.g., route the call to the callee-agent device, drop the call) according to instructions or other outputs received from the analytics system 201.

The models in the DDS of the analytics system 201 can be trained using a variety of techniques, such as supervised learning or unsupervised learning, and can be further refined and optimized over time to improve its accuracy and effectiveness. Additionally, the DDS system can be integrated with other security measures, such as multi-factor authentication or fraud analytics, to provide a more comprehensive and robust security solution for call centers. One or more servers or other computing devices may function as analytics servers executing software programming and functions of the DDS.

The feature extractor 222 may extract various types of features from the call data of a user's response to a prompt or question and extract relevant information, which the risk engine 220 references and analyzes to determine whether the response was produced by a human user caller or a deepfake caller. In some implementations, the features include emotion features that the risk engine 220 may predict or classify into a predicted emotion (e.g., rage, calm, agitation) suggested by the user's voice. In some implementations, the features include temporal features, such as time delay features that measure the temporal distance between the prompt and the user's response.

The feature extractor 222 can extract temporal features that capture and mathematically represent, for example, temporal aspects of the user's speech, such as the timing and rhythm of the user's speech. The temporal feature may include a delay between the user's response and the agent's question. The delay can be measured by feature extractor 222 by analyzing timestamps within, or associated with, the audio data and determining the time difference between the end of the agent's question and the beginning of the user's response. The delay in response time is also an indication of a deepfake caller, particularly if the deepfake caller software at the caller device 214 is processing audio inputs and generating speech signals (e.g., an utterance containing the response) in real-time. In such cases, the delay might be longer than what would be expected from a human speaker.

The feature extractor 222 may determine the delay between the user's response and the agent's question by applying the VAD engine on the audio data to segment the audio data into speech and non-speech regions. After the VAD engine the speech regions, the feature extractor 222 may use the VAD engine to determine each speech segment's start and end times. Optionally, the feature extractor 222 (or other software component of the analytics server 202) may align the audio data with a corresponding transcription or dialogue script, which contains and indicates information about the timing of the agent's question and the user's response. By comparing the start and end times of the speech segments with the timing information in the dialogue script, the feature extractor 222 may compute the delay between the user's response and the agent's question and/or identify timing epochs using the start and end times.

After the feature extractor 222 identifies the epochs of time, where the speaker(s) starts and stops to speak using any of the above techniques, the feature extractor 222 may store the timestamps denoting the start and end of voice activity of the speakers in the audio data of the call. From the multiple identified time epochs of voice activity (and lack thereof), various features may be calculated, such as a caller Response-Delay (RD) times (that could be computed in either a context-dependent or context-independent fashion). The RD times may indicate the time delay that the caller takes to respond to the callee's requests or prompts for voice responses. By comparing the distribution of RD times of the user to a typical human or the RD times of the receiver who is a human, the risk engine 220 may determine liveness or deepfake score indicating an estimate of the likelihood of the user being a human caller or a deepfake caller.

Figure 3:
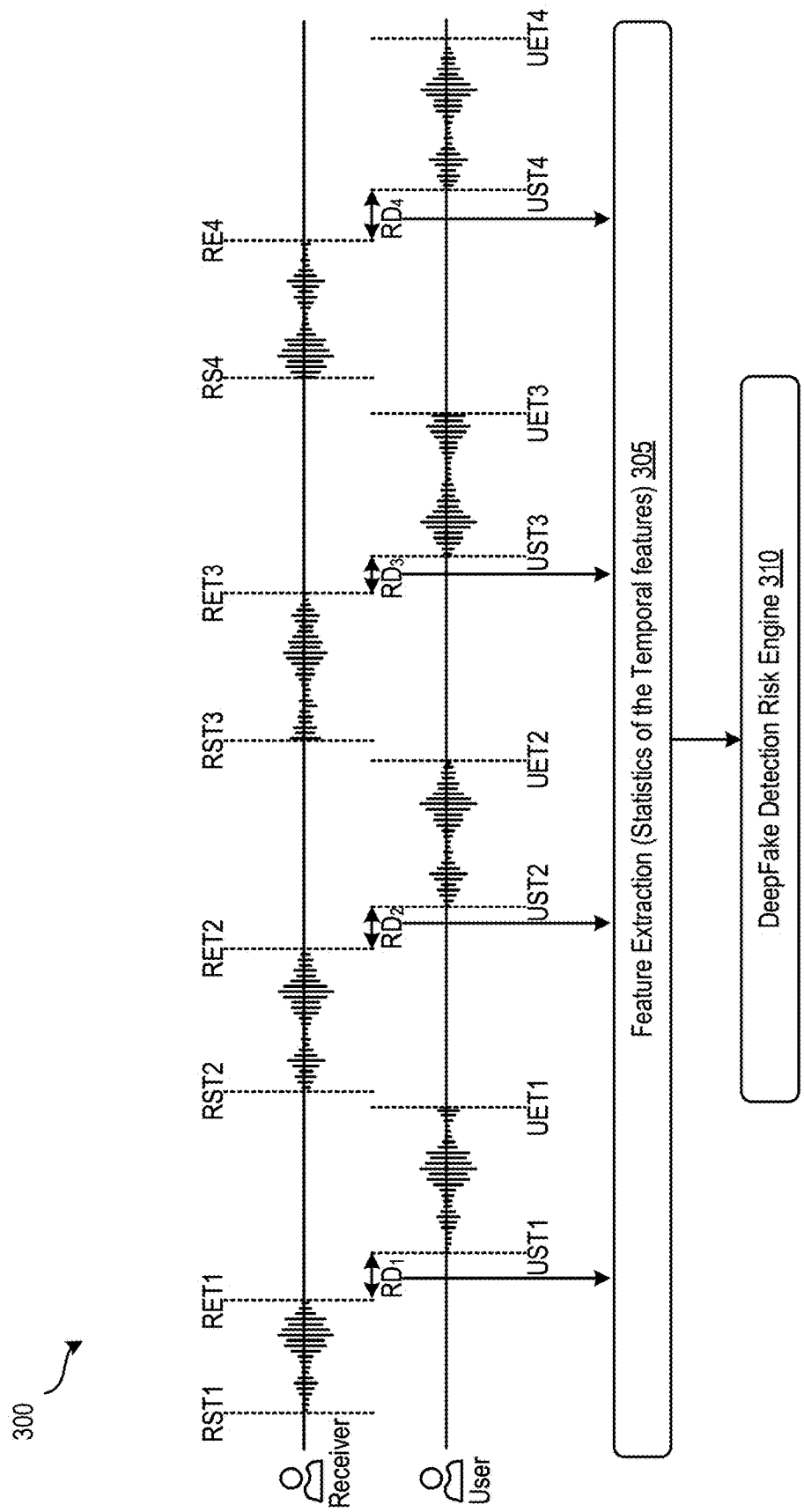
FIG. 3 shows a diagram of a process for extracting a set of features from call audio, according to an illustrative embodiment.

FIG. 3 shows a process 300 for extracting a set of features from call audio with one or more machine-learning architectures, according to an embodiment. The process 300 may be performed or implemented by an analytics system using software components of a server or other computing device, such as a feature extractor 222 and risk engine 220 of an analytics server 202. In operation 305, a computing system (e.g., the analytics server 202) may extract and analyze various temporal features from call audio data. In some embodiments, the server may perform the functions and compute the time measures indicated below:

i—[0, 1, I . . . , T–]—denoting the timestamps of the utterances in the audio stream;
$RST_i$—Receiver Start timestamp for $i_{th}$ utterance;
$RET_i$—Receiver End timestamp for $i_{th}$ utterance;
$UST_i$—User Start timestamp for $i_{th}$ utterance;
$UET_i$—User End timestamp for $i_{th}$ utterance;
$RD_i = UST_i - RET_i$, where $RD_i$ is the Response-Delay (RD) for the $i_{th}$ instance utterance; and
$RD = [RD_1, RD_2, \ldots, R-]$—list of Response-delay's for all the utterances.

As mentioned, the computing system may determine the various statistics of the temporal features. From the extracted RD temporal features, the computing system may calculate the statistics describing the spread of the distribution which will be used to compare user being human versus deepfake. In some embodiments, the computing system calculates the running statistical features below for a given running distribution of RDs (sequence of RDs updated after every exchange of utterances):

Running distribution—$[-D_1, \ldots, RD_i]$ where i=1, . . . I;
$Var(RD)_i$—Running Variance of the 'RD's distribution for given i;
$IQR(RD)_i$—Running value of InterQuartile-Range of the 'RD's distribution for given i; and
$Mean(RD)_i$—Running Mean of the 'RD's distribution for given i.

At operation 310, a feature extractor on the computing system passes the above statistical features describing the temporal distribution to the risk engine of the computing system. Based on the statistical features, the risk engine on the computing system may calculate the likelihood of the caller producing the inbound audio data is a genuine human caller or a deepfake software-based caller.

Figure 4:
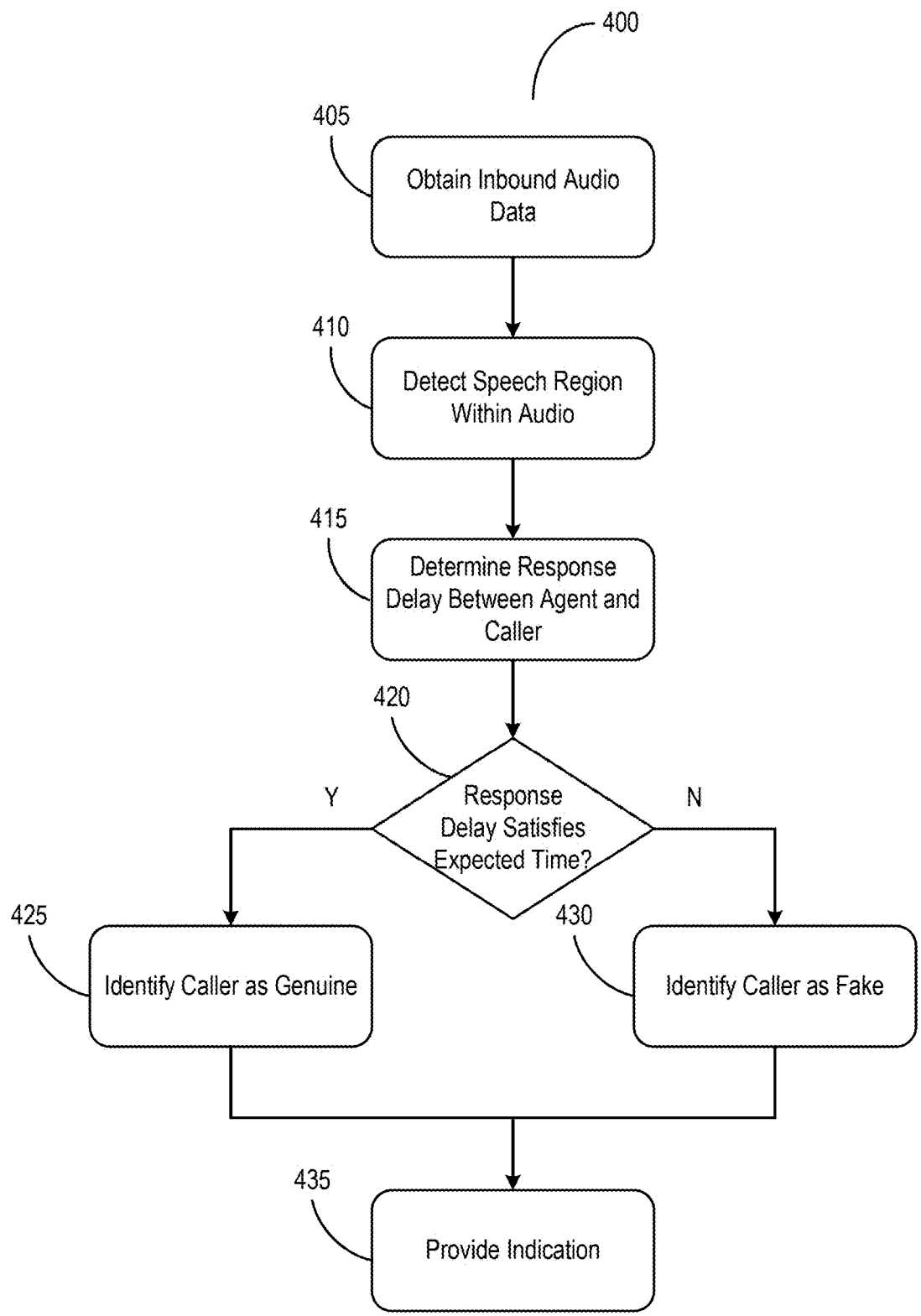
FIG. 4 shows a flow diagram of a method of detecting machine speech based on response delays, in accordance with an illustrative embodiment.

FIG. 4 shows a flow diagram of a method 400 of detecting machine speech based on response delays using one or more machine-learning architectures. The method 400 may be performed or implemented using any of the components detailed herein, such as the customer call center system 110, the customer analytics service system 101, and the analytics system 201, among others. Under the method 400, at step 405, a computer may receive, identify, or otherwise obtain inbound audio data. The inbound audio data may correspond to or include the audio data between a caller (e.g., the caller on the caller device 114 or the caller communication device 214) and an agent (e.g., the agent on the agent device 116, the callee agent on the callee communication device 216, or the IVR program). The inbound audio data may contain or include a set of speech segments corresponding to a dialogue or conversation between the caller and the agent. Each speech segment may correspond to a voice or speech in a respective portion of the audio data from one of the caller and the agent. At least one speech segment may be from the caller and at least one subsequent speech segment may be from the agent, or vice-versa, forming the conversation.

At step 410, the computer may identify, select, or otherwise detect at least one speech region within the set of speech segments of the inbound audio data. The detection may be in accordance with a voice activity detection (VAD) algorithm. The speech region may contain or include at least one speech segment corresponding to the agent and at least one other speech segment corresponding to the caller. The speech segments forming the speech region may be consecutive within the inbound audio data. For instance, the computer may detect a speech region with a speech segment corresponding to a question by the agent and a following speech segment corresponding to an answer from the caller. Conversely, the computer may detect a speech region with a speech segment corresponding to a request by the caller and a following speech segment corresponding to a response from the agent.

With the detection of each speech segments, the computer may define or form the corresponding speech region. The computer may repeat the detection of the speech region with at least one agent speech segment and at least one caller speech segment from the audio data. From the repeated detection over the audio data, the computer may identify a set of speech regions. Each speech region may correspond to least one agent speech segment and at least one subsequent caller speech segment. Within the set, each speech region may be adjacent in time with the subsequent speech region. In addition, the computer may identify, determine, or otherwise detect a set of timestamps corresponding to the set of speech segments in the speech region. Each timestamp may define, identify, or otherwise correspond to a start or an end of a respective speech segment. For example, the set of timestamps may mark: a start of an agent speech segment, an end of the agent speech segment, a start of a caller speech segment, and an end of the caller speech segment, among others.

In some embodiments, the computer may produce, create, or otherwise generate at least one transcription using the audio data. In generating, the computer may apply automated speech recognition (ASR) algorithm (e.g., a deep learning neural network model, a hidden Markov model, or a dynamic time warping) to convert audio to text. The transcription may include or contain text in chronological sequence of each caller speech segment and each agent speech segment in the set of segments from the audio data. The text for the transcription may include a set of words from the caller speech segment (e.g., uttered by the caller), followed by a set of words from the agent speech segment (e.g., uttered by the agent), or vice-versa. The transcription may also contain or include a set of timestamps corresponding to the set of speech segments from the caller or the agent in the audio data. Each timestamp may correspond to a start or an end of a respective speech segment. With the genera-tion of the transcription, the computer may identify the set of timestamps corresponding to the set of speech segments in the speech region.

At step 415, the computer may calculate, generate, or otherwise determine at least one response delay between the speech segment corresponding to the agent and the speech segment corresponding caller in the speech region. The response delay may identify or correspond to an amount of time elapsed between the speech segment from agent and the speech segment from the caller. In some embodiments, the response delay may correspond to the time elapsed between the end of the speech segment from the agent and the start of the speech segment from the caller.

Using the timestamps determined for the speech segments in each speech region, the computer may calculate or determine the response delay. In some embodiments, the computer may calculate a difference between the timestamp referencing the end of the speech segment from the agent and the timestamp referencing the start of the speech segment from the caller. For example, the computer may determine the response delay to correspond to a time difference between one speech segment corresponding to a question by the agent and a subsequent speech segment corresponding to an answer or response by the caller within the speech region. With the determination, the computer may identify or use the difference as the response delay for the speech region. The computer may repeat the determination over the set of speech regions to determine a corresponding set of response delays.

In some embodiments, the computer may modify, alter, or otherwise adjust the response delay based on a context of the dialogue between the caller and the agent. The context may identify, refer to, or otherwise correspond to a topic category (e.g., selected issue for caller center) of the dialogue between the caller and the agent. The response delay may be context-dependent (factoring in context) or context-independent. The computer may identify the context of the dialogue using a NLP algorithm (e.g., context analysis, semantic analysis, topic modeling) applied to the transcription derived from the audio data. The NLP algorithm used to determine the context may include, for example, context analysis (e.g., Bidirectional Encoder Representations from Transformers (BERT)), semantic analysis (e.g., Probabilistic latent semantic analysis), or topic modeling (Latent Dirichlet Allocation (LDA) and Non-Negative Matrix Factorization (NMF)), among others. In some embodiments, the computer may determine the context of the caller speech segment and the context of the agent speech segment separately. Based on the context, the computer may adjust the value of the response delay. For example, the computer may increase the value of the response delay, when the contexts between the caller speech segment and agent speech segment differ. Conversely, the computer may decrease the value of the response delay, when the contexts between the caller speech segment and agent speech segment are the same.

In some embodiments, the computer may calculate, generate, or otherwise determine a set of statistical measures for response delays across the set of speech regions of the audio data. The statistical measures may include, for example a variance, an inter-quartile (or decile) range, or a mean, among others, of the response delays. The variance may identify a degree of dispersion of values of the response delays. The mean may identify an average of the values of response delays. The inter-quartile range may correspond to a degree of dispersion within a mid-spread (e.g., a middle 5-50%) of the values in the response delays across the speech regions of the audio data. In some embodiments, the computer may determine running statistical measures over the set of speech regions of the audio data, as more and more audio data is inbound or added. The running statistical measure may be a moving average, such as a simple moving average, a weighted moving average, or an exponential moving average of the statistical measures.

At step 420, the computer may identify or determine whether the response delay satisfies an expected time for a human speaker. The expected time may specify, identify, or otherwise define a value for the response delay at which the caller in the audio data is determined to be human or machine generated speech. In some embodiments, the expected time may be fixed at a value pre-determined for human versus machine generated speech. In general, the expected time for human speaker may be shorter than an average response time for machine speech. In some embodiments, the computer may use an average of the response delays as the response delay to compare against the expected time. When the response delay is less than or equal to the expected time, the computer may determine that the response delay satisfies the expected time for the human speaker. Conversely, when the response delay is greater than the expected time, the computer may determine that the response delay does not satisfy the expected time for the human speaker.

In some embodiments, the computer may calculate or determine the expected time for the human speaker based on historical data of audio data between callers and agents. The historical data may identify timestamps between speech segments of callers and agents. The historical data may, for example, be a log of calls between callers and agents on a database (e.g., call center database 112) or training data with speech segments of callers known to be human speakers and agents, among others. From the timestamps in the historical data, the computer may determine an average response time between callers and agents. With the determination, the computer may generate the expected time to compare against. For instance, the computer may set a value for the expected time offset from the average response time. With the determination of the expected time, the computer may compare against the response delay as discussed herein.

In some embodiments, the computer may identify or determine whether the set of statistical parameters satisfy a set of expected statistical parameters for human speakers. The expected statistical parameters may specify, identify, or otherwise define values for the variance, the inter-quartile (or decile) range, or the mean at which the caller in the audio data is determined to be human or machine generated speech. In some embodiments, the values for the set of expected statistical parameters may be fixed or pre-determined. For example, the set of expected statistical parameters may be set at values uncharacteristic of human speakers. In some embodiments, the computer may determine the set of expected statistical parameters based on historical data of audio data between callers and agents. From the timestamps in the historical data, the computer may determine the values for the variance, the inter-quartile (or decile) range, or the mean. The computer may set the expected values for the statistical parameters using the determined values. In addition, the computer may determine a threshold margin for each of the values of the set of expected statistical parameters. For example, the computer may determine the threshold margin as a certain percentage (e.g., 5-20%) of the corresponding value.

The computer may compare the set of statistical parameters against the set of expected statistical parameters for human speakers using the threshold margins. When at least one of values of the statistical parameters are off by the threshold margins, the computer may determine that the set of statistical parameters do not satisfy the set of expected statistical parameters for human speakers. On the other hand, when all of the values of the statistical parameters are within the threshold margins, the computer may determine that the set of statistical parameters satisfy the set of expected statistical parameters for human speakers.

At step 425, if the response delay satisfies (e.g., is less than or equal to) the expected time, the computer may classify, determine, or otherwise identify the caller in the audio data as genuine. The caller may be identified as genuine, when the caller speech in the audio data corresponds to the human speaker. In some embodiments, if the set of statistical parameters are within the threshold margin of the expected statistical parameters, the computer may identify the caller in the audio data as genuine.

At step 430, if the response delay does not satisfy (e.g., greater than) the expected time, the computer may classify, determine, or otherwise identify the caller as fake. The caller may be identified as fake (or deepfake), when the caller speech in the audio data does not correspond to the machine generated speech. In some embodiments, if the set of statistical parameters are outside the threshold margin of the expected statistical parameters, the computer may identify the caller in the audio data as fake.

At step 435, the computer may send, transmit, or otherwise provide an indication of the caller as genuine or fake. When the caller is identified as genuine, the computer may generate the indication to identify the caller as genuine. Conversely, when the caller is identified as fake, the computer may generate the indication to identify the caller as fake. The computer may provide the indication to an agent computer (e.g., the agent device 116 or the callee communication device 216) for presentation that to the agent. Once received, the agent computer may display, render, or otherwise present that indication of the caller as one of genuine or fake to the agent via an interface (e.g., a graphical user interface (GUI)).

Turning back to FIG. 2, in some embodiments, the computing system (the feature extractor 222 on the analytics server 202) may extract emotional features and predict an emotional state (e.g., rage, calm, agitation) from the audio data using any number of techniques. In some embodiments, the computing system extracts the emotional features from the audio data by analyzing speech patterns and prosody (e.g., the melody and rhythm of speech). Emotions such as anger or agitation are often associated with a higher pitch, louder volume, and faster speech rate. In comparison, emotions such as calmness are associated with lower pitch, softer volume, and slower speech rate. The machine-learning architecture of the analytics server 202 analyzes these speech patterns and extracts the emotion features as the relevant acoustic speech features that could fed as inputs into one or more emotion classifiers, such as pitch contour, speech rate, and intensity, among others.

In some embodiments, the analytics server 202 applies acoustic analysis functions in the feature extractor 222 of the machine-learning architecture to extract the relevant emotion features from the call audio to analyze the acoustic properties of the sound of the call audio, such as the spectral density, duration, and energy levels, among others. Emotions such as rage may be associated with a high degree of spectral energy in the high-frequency range, while emotions such as calmness may be associated with low spectral energy across all frequency ranges. The machine-learning architecture of the analytics server 202 analyzes these types of acoustic features and extracts additional or alternative emotion features, such as arousal, valence, and dominance.

By using any number of techniques, the analytics server 202 may extract Geneva Minimalistic Acoustic Parameter Set (eGeMAPS) low-level descriptor features from the audio to determine emotional features. The eGeMAPS may be a set of low-level descriptor features that are commonly used in the recognition of emotions in human voice. The eGeMAPS feature set may include different low-level descriptors, which capture various aspects of the acoustic signal such as pitch, loudness, spectral shape, and temporal dynamics. The eGeMAPS feature set may provide a comprehensive set of low-level descriptors to extract a wide range of acoustic features from human voice. By combining these features with machine learning algorithms and emotion models, the analytics server 202 may recognize or determine emotions in human voice.

Natural Language Processing (NLP) Features

The analytics server 202 may also extract transcribed text content from the audio. The analytics server 202 may perform data acquisition of the text from audio transcription algorithms to turn audio to texts for analysis. With the acquisition, the analytics server 202 may pre-process the text data by conducting text cleaning such as removing stop words, stemming the words, and converting the text to lower case, among others.

The analytics server 202 may execute programming of NLP operations and techniques on the extracted and processed text to analyze the text associated with the audio, in connection with detecting the deepfake. In some embodiments, the analytics server 202 may perform authorship verification to identify if the text in the deepfake has been written by the same person as the original speaker. The authorship verification can be used to identify whether the text has been generated by a machine learning model or has been written by a human. In some embodiments, the analytics server 202 may perform contextual analysis to analyze the context of the text. Deepfakes may contain text that is out of context or not consistent with the topic being discussed. Also, deepfakes may contain text that is not grammatically correct or consistent with the style and tone of the original speaker. Contextual analysis can be used to identify such discrepancies.

In some embodiments, the analytics server 202 may execute LLM classification models and functions for classifying speech as human and or fraudulent (e.g., deepfakes). The analytics server 202 trains these LLM classification models on a large training dataset of a corpus containing human composed text and deepfake engine generated text. The classification model may use a LLM to extract an embedding from the text and classifies into one of the two classes. In some embodiments, the analytics server 202 may perform emotion recognition using sentiment analysis on the transcribed data. The computing system may use various machine learning algorithms to classify the transcribed data into different emotional categories, such as happy, sad, angry, and neutral. The analytics server 202 may also analyze the intensity and duration of the emotions expressed in the text and speech to identify any discrepancies between the original and deepfake content.

The NLP features and functions above can be used in combination with audio analysis to create a more comprehensive deepfake detection system executed by the analytics server 202. The combination of multiple techniques can help to improve the accuracy of deepfake detection. From the NLP text perspective, deepfake text-to-speech functions raise a few issues and capitalize on organic human-to-human conversational cues that deepfake audio and deepfake texts often do not include.

For example, humans often use interjections or stop words (e.g., "hmmm," "umm," "well") with a pause as an interjection to indicate they are thinking or processing what the other person is saying. Stop words can also indicate uncertainty or a need for further clarification. However, deepfake texts do not typically use, for example, "hmmm" as deepfake texts (or deepfake speech used to generate the deepfake text) do not need to indicate thought processes. Instead, the deepfakes may use pre-recorded phrases or responses to show they are processing the input.

As another example, a human caller can quickly understand context of a conversation and adjust the human caller's (human-to-human) conversational responses accordingly. The human caller can recognize and address subtle cues, such as sarcasm, humor, or frustration, and respond appropriately (and organically). A robot caller (machine-generated text or machine-generated speaker), on the other hand, often struggles to understand the context and can sometimes misinterpret the meaning of what the called-human is saying.

In some embodiments, the analytics server 202 may use empirical analysis. Human responses may be more versatile in vocabulary than robot callers' responses. The analytics server 202 may compute and analyze a metric called "density," which is a measurement indicating, for example, how crowded different words are used in a text. The word density may be calculated using: $D=100\times V/(L\times N)$, where N is the number of answers, an average length (L) is the average number of words in each answer, and a vocab size (V) is the number of unique words used in all answers. The word density of humans may be much greater than machine-generated texts in every split, which indicates that humans use a more diverse vocabulary in their expressions. The analytics server 202 may use the density to determine the likelihood of whether the caller is human or machine.

In some embodiments, the analytics server 202 may use a statistical analysis. Factual structures may also be a discriminative factor between machine-generated and human-written text. This is because machines often lack the ability to understand the underlying meaning of the text and the context in which the text is presented. As a result, machine-generated text often lacks coherent and logical factual structures. Overall, while robots can simulate human language to some extent, robots lack the naturalness and flexibility of human communication. As a result, the way robot callers use words (e.g., vocabulary, structure, diction) can differ significantly from human callers. The analytics server 202 may determine various statistics from the text, and may calculate the risk score.

The analytics server 202 may generate transcripts from calls with the contact center. These call transcripts may have a typical ratio of repeat phrases spoken by the agent in reply to the human caller ("repeated similar utterances/overall utterances"). For a caller using Text-to-Speech (TTS) software, leveraging machine-generated text, the repeated phrases spoken by the agent are higher than typically seen. This happens because the caller may encounter prompts from the agent that are unexpected and the caller has difficulty in fully understanding the context, requiring the Agent to repeat the Agent's prompting questions or phrases to the caller, as shown in the sample call transcript below:

Caller: "Calling regarding unblocking the last credit card transaction." [Caller is assuming the call has been authenticated in the IVR]

Agent: "Sure, can you tell me your name?" [Agent is expecting to verify the identification of the caller]

Caller: "Can you unblock the last credit card transactions please?" [in the Caller's TTS software produced this statement as a response to an unexpected prompt and misunderstood context from the Agent to the Caller's TTS software]

Agent: "Can you please tell me your name before answering your query?" [The Agent is re-asking the question to verify the Caller's identification again]

Caller: "John Doe." [Caller's TTS software finally understands and catches up with the context].

The analytics server 202 may use the NLP-based context similarity technique to compare and determine a repetitious utterance ratio of "repeated similar utterances" over "overall utterances." The analytics server 202 may compare the ratio for the current call against the repetitious utterance ratio of a typical call from a human. The analytics server 202 can use this comparison to detect a likelihood that the caller is using deepfakes, generated from a caller device having TTS software leveraging machine-generated text.

In some embodiments, the machine-learning architectures of the analytics server 202 may detect mismatched responses based on the call phase (IVR or Agent). During a typical call to a contact center, the caller, using a caller device having a TTS program leveraging machine-generated text, may not realize that the call has switched from an IVR leg call of the call to an agent leg of the call, after initial identification or may not realize that the call has been sent to the IVR again (e.g., to enter sensitive information such as social security number (SSN) or personal identification number (PIN)). As a result, the caller device 214 may continue sending dual-tone multi-frequency signaling (DTMF) tones to the IVR of the callee device 216 when the agent expects to talk or vice-versa. As such, the detection of voice during a (non-voice enabled) IVR leg or detection of DTMF tones during the agent leg of the call may imply a high likelihood of a deepfake caller in the form of the TTS system leveraging machine-generated text at the caller device.

Figure 5:
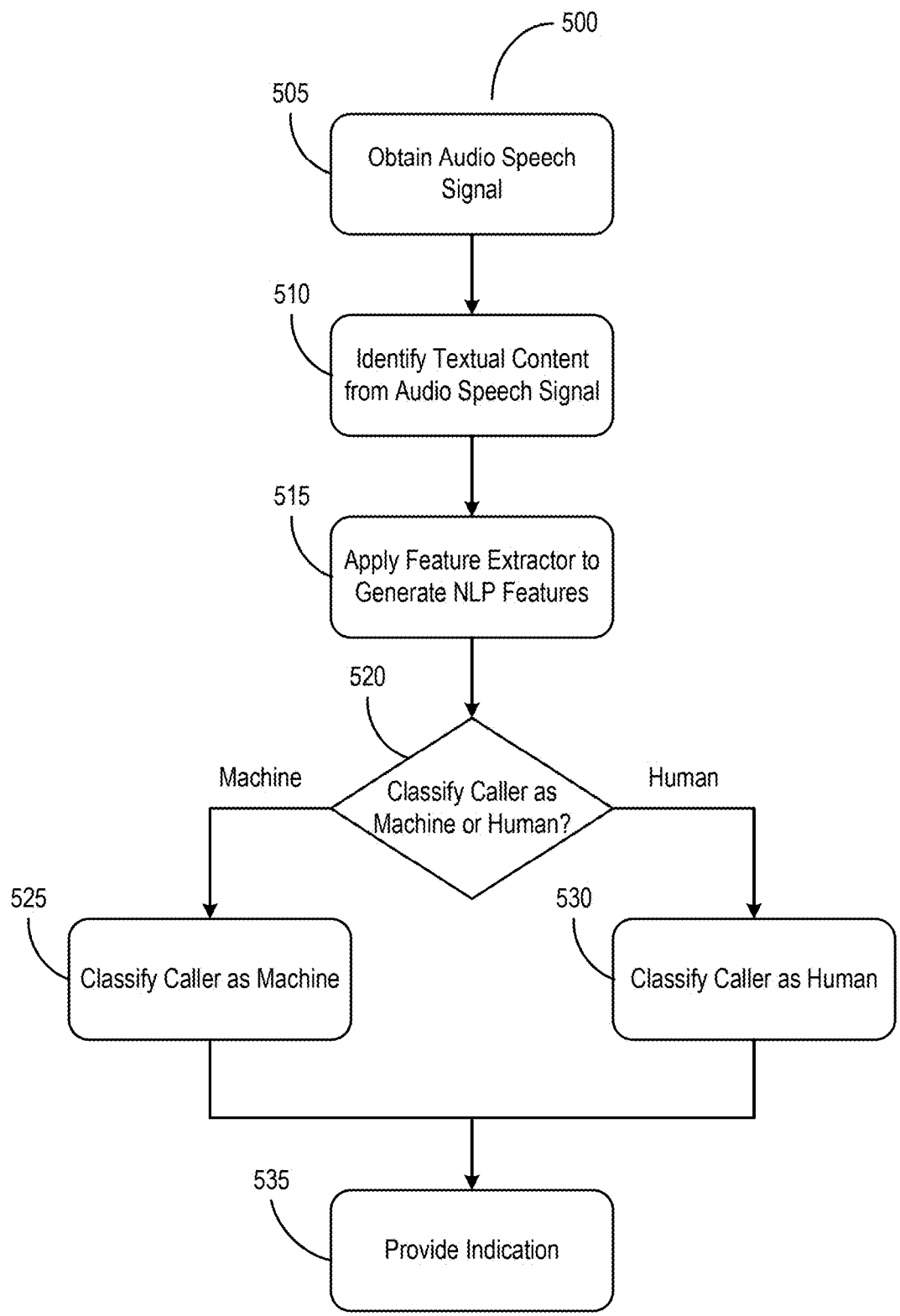
FIG. 5 shows a flow diagram of a method of classifying text derived from audio speech signal for deepfake detection, in accordance with an illustrative embodiment.

FIG. 5 shows a flow diagram of a method 500 of classifying text derived from audio speech signal for deepfake detection using one or more machine-learning architectures. The method 500 may be performed or implemented using any of the components detailed herein, such as the customer call center system 110, the customer analytics service system 101, and the analytics system 201, among others. Under the method 500, at step 505, a computer may receive, identify, or otherwise obtain an audio speech signal. The audio speech signal may correspond to or include the audio from a caller (e.g., the caller on the caller device or the caller communication device 214). In some embodiments, the audio speech signal may correspond to audio between the caller and an agent (e.g., the agent on the agent device 116, the callee agent on the callee communication device 216, or the IVR program). In some embodiments, the computer may select or identify a portion of the audio data corresponding to the audio speech signal from the caller (or the agent). The identification of the portion of the audio data may be based on a speaker identification of the caller (or the agent). For instance, the computer may select portions of the audio data corresponding to the caller, by removing portions corresponding to the known agent.

At step 510, the computer may generate, determine, or otherwise identify textual content from the audio speech signal. The audio speech signal may be from the caller or the agent, or both. To identify, the computer may apply automated speech recognition (ASR) algorithm to convert the audio speech signal to the textual content (e.g., in a similar manner as step 1010). The textual content may include or contain text in chronological sequence of strings (e.g., words, phrases, or interjections) corresponding to speech from the caller or the agent, or both.

At step 515, the computer may apply at least one feature extractor of the machine-learning architecture to the textual content output, determine, or otherwise generate a set of natural language processing (NLP) features. The feature extractor may include a ML model, AI algorithm, or other algorithm of the machine-learning architecture to generate features from the text converted from the audio. The feature extractor may be maintained on the computer, or a separate service invoked by the computer. The NLP features may be used to determine whether caller in the audio speech signal is machine or human, and each of the NLP features may indicate or identify a degree of likelihood that the textual content was machine generated (or naturally generated by a human). In general, the computer may input or feed the textual content generated from the audio speech signal to the feature extractor. The computer may process the input textual content in accordance with the feature extractor. For example, the computer may process the input textual content using the set of weights of the ML model of the feature extractor of the machine-learning architecture. From processing using the feature extractor, the computer may generate one or more NLP features. The NLP features may include any one or more of those described herein.

In some embodiments, the feature extractor may include a stylometric analyzer to determine authorship. The stylometric analyzer may be implemented to include a neural network and related machine-learning functions, such as a deep belief network, an SVM, a regression model (e.g., a linear or logistic regression), a K-nearest neighbors, or Principal Component Analysis (PCA), among others. The stylometric analyzer may have been established or trained on additional textual content generated from audio samples from one or more callers, including the caller. For example, the computer may train the stylometric analyzer using textual content generated from previous calls with the caller. The computer may apply the stylometric analyzer to generate at least one NLP feature. The NLP feature may indicate authorship verification. If the textual content from the audio speech signal is determined to be of the caller, the NLP feature generated by the stylometric analyzer may indicate that authorship of the corresponding textual content is verified of the caller. In contrast, if the textual content from the audio speech signal is determined to be not of the caller (or any other caller), the NLP feature generated by the stylometric analyzer may indicate that authorship of the corresponding textual content is not verified as of the caller.

In some embodiments, the feature extractor may include a context analyzer (e.g., implemented using Bidirectional Encoder Representations from Transformers (BERT)), semantic analysis (e.g., Probabilistic latent semantic analysis), or topic modeling (Latent Dirichlet Allocation (LDA) and Non-Negative Matrix Factorization (NMF)) to determine context of a conversation. The context analyzer may have been established or trained on additional textual content generated from audio samples from one or more callers, including the caller. The context may identify, refer to, or otherwise correspond to a topic category (e.g., issue or entity) of the speaker (e.g., the caller or agent) in the dialogue. The computer may apply the context analyzer to the textual content from the caller or the agent (or both) to determine a context. The computer may determine the context of the textual content of the caller and the context of the textual content of the agent. With the determination, the computer may generate at least one NLP feature indicating a degree of contextual similarity between the context of the textual content of the caller and the context of the textual content of the agent. The degree of contextual similarity may be calculated using a knowledge graph defining semantic distances among contexts.

In some embodiments, the feature extractor may include a LLM detector, which may be implemented according to a neural network and related machine-learning functions, such as an SVM, a regression model (e.g., a linear or logistic regression), a k-nearest neighbors, or PCA, to determine whether the text or content was generated by an LLM or human. The LLM detector may be trained on a corpus of human text and machine text to distinguish between human generated text and machine generated text. For instance, the machine learning architecture of the LLM detector may be trained to detect artifacts presented in machine generated text, not frequently found in the human generated text. The computer may apply the LLM detector to the textual content derived from the audio speech signal to output or generate at least one NLP feature. The NLP feature may indicate a degree of likelihood that the textual content was generated by a LLM (or conversely generated by a human).

In some embodiments, the feature extractor may include a sentiment analyzer (e.g., implemented using a bag of words model, a latent semantic analysis, word embedding model, support vector machine (SVM), regression model (e.g., a linear or logistic regression), random forest, or a deep learning neural network) to identify a sentiment and an intensity or duration of the sentiment. The sentiment analyzer may be trained using a training dataset with examples of text and labels of sentiment and the intensity of the sentiment for the text. The computer may apply the feature extractor to the textual content to determine or identify the sentiment and the intensity of the sentiment. The sentiment may include, for example, positive (e.g., happy, joy, or satisfied), negative (e.g., sad, angry, or frustrated), neutral (e.g., indifferent), among others. The intensity may identify a degree of level for the sentiment. In some embodiments, the computer may determine the duration of the sentiment using the timestamps for the textual content. For example, the computer may determine the duration corresponding to a time difference between a start and an end of the textual content associated with the sentiment.

In some embodiments, the feature extractor may include an empirical analyzer (e.g., implemented using a parser generator or a lexical tokenizer) to identify one or more statistical parameters from the words (or injections or phrases) in the textual content from the speaker (e.g., caller or agent), The statistical parameter may identify, for example: a length of the textual content, an average length of each segment (e.g., question from the agent or response from the speaker), a total number of words, a number of unique words, a distribution of unique words in the text from the speaker, among others. The computer may apply the empirical analyzer to the textual content to generate one or more NLP features. The NLP features may include or identify the statistical parameters of the textual content.

At step 520, the computer may identify, determine, or classify the caller as one of a machine or human based on the set of NLP features. To classify, the computer may compare the set of NLP features with a rule set. The rule set may identify, specify, or otherwise define a set of combinations of NLP features corresponding to, associated with, or correlated with, one of machine generated speech or human generated speech. For example, the rule set may define that NLP features indicating unsuccessful authorship verification, a low contextual similarity (e.g., below a threshold), a high likelihood of LLM generated text (e.g., above a threshold), or low distribution of unique words (e.g., below a threshold) may be correlated with machine generated speech. Conversely, the rule set may define that NLP features indicating successful authorship verification, a high contextual similarity (e.g., above the threshold), a low likelihood of LLM generated text (e.g., below the threshold), or high distribution of unique words (e.g., above the threshold) may be correlated with human generated speech.

In some embodiments, the computer may classify the caller as one of the machine or human based on a set of acoustic features extracted from the audio speech signal. The set of acoustic features may be used to augment the classification of the caller as one of the machine or human based on the NLP features derived from the textual content. The set of acoustic features may include, for example, a speaker identification, a speaker embedding, a spoof embedding, background classification, or a liveness score, among others, as detailed herein. The rule set may also define a set of combinations of acoustic features (along with NLP features) corresponding to, associated with, or correlated with, one of machine generated speech or human generated speech. The computer may compare the set of acoustics and the NLP features to the combination specified by the rule set.

At step 525, when the features are classified as the machine, the computer may identify, determine, or otherwise classify the caller in the audio speech signal as a machine. Based on the comparison, the computer may determine that the set of NLP features correspond to or match the combination of NLP features defined by the rule set for the machine. In some embodiments, the computer may determine that the set of NLP features along with the acoustic feature correspond to or match the combination of features defined by the rule set for the machine. With the determination, the computer may classify the caller in the audio speech signal as the machine.

At step 530, when the features are classified as the human, the computer may identify, determine, or otherwise classify the caller in the audio speech signal as human. Based on the comparison, the computer may determine that the set of NLP features correspond to or match the combination of NLP features defined by the rule set for the human. In some embodiments, the computer may determine that the set of NLP features along with the acoustic human correspond to or match the combination of features defined by the rule set for the human. With the determination, the computer may classify the caller in the audio speech signal as the human.

At step 535, the computer may send, transmit, or otherwise provide an indication identifying the classification of the caller as machine or human. When the caller is identified as human, the computer may generate the indication to identify the caller as human. Conversely, when the caller is classified as machine, the computer may generate the indication to identify the caller as machine. The computer may provide the indication to an agent computer (e.g., the agent device 116 or the callee communication device 216) for presentation that to the agent. Once received, the agent computer may display, render, or otherwise present that indication of the caller as one of machine or human to the agent via an interface (e.g., a graphical user interface (GUI)).

Using Keystroke Sounds to Detect TTS Systems

During a call to a contact center, the caller device leveraging a TTS software with a human typing the text for the TTS software to convert to speech. Using the TTS software, the caller's (benign or, often, malicious) intent is to not reveal the caller's voice to the contact center systems or users, including the call center agent. At an agent leg of a call, which includes when the caller uses the caller's keyboard to type words for the TTS software to respond to the agent's questions, the sound of keystrokes may be inevitably transmitted to the contact center in addition to the speech generated by the TTS software of the caller device.

The degree of proximity of the spoken word to the sound of the keystrokes and the number of the keystrokes correlated with the spoken words to determine that the keystrokes are indeed the source of the words. As a result, the computing system (e.g., the feature extractor 222) can detect a deepfake caller that is using a TTS software with a human typing the text for the TTS software. Based on the proximity, the computing system (e.g., the risk engine 220) may determine the risk score or other type of score.

Voice Similarity with Synthetic Negative Voice Consortium

Typical TTS software uses a finite set of synthetic voices. The computing system may collect available synthetic voices (possibly numbering in the thousands or more), cluster similar voices together and generate a representation of those clusters as distinct voiceprints. Using this consortium of voiceprints a call may be detected as a deepfake caller using TTS software whether the voiceprint of the caller matches with any of the voiceprints from the consortium set. Based on the comparison, the computing system may determine the risk score or other type of score.

Synthetic Deepfake Detection Using Background Sounds

The background sounds in a typical call are the sounds that do not comprise the speech of the caller. These background sounds found in a call audio for a synthetic deep fake audio may differ from a typical natural call audio from a human. These background sounds may be modeled using phoneprint features to detect whether the call audio is from a synthetic deepfake. The computing system may analyze the background to extract various features. Further details are provided in embodiments described herein.

Deepfake Outlier Features

Although deepfake audio is meant to sound like a human, the quality of a synthetically generated audio, or its similarity to a human voice, may vary within a larger length of audio. For example, it is possible that the 10-second long deepfake audio that a nefarious caller (user) responds with as their answer to a callee's (receiver's) inquiry may consist of 9.5 seconds of realistic and 0.5 seconds of non-realistic audio. The computing system may determine an average across the time dimension of an audio signal might smooth out this outlier character. The computing system may identify strong temporal deepfake characteristics by first applying outlier detection on deepfake audio, and then training a binary classifier to learn the difference between realistic (and mostly-realistic) audio and strongly deepfake audio.

In some embodiments, the computing system may use an autoencoder (deep neural architecture) which takes sub-portions of deepfake audio (or a processed form of the audio) as an input, compresses the inputs down to an encoded representation, reconstructs the sub-portion, and then calculates the reconstruction error from the input. Because outliers are much less common in a training dataset, their reconstruction error will be much larger. A reconstruction error threshold may be tuned to automatically detect sub-portion audio with strong deepfake character in a large dataset.

The computing system may generate a new dataset with a class of audio sub-portions having strong deepfake characteristics and another class of audio sub-portions of human speech and deepfake audio that is very similar to humans. Because outliers are much less common, the classes may be balanced using either sub sampling of the second class or class weighting during training.

Once this new dataset is obtained, the computing system may update or retrain the classifier. In some embodiments, the computing system may train a machine learning or deep learning classifier on this new dataset. In some embodiments, the computing system may fine tune a pre-trained deepfake detection model using the new class by i) retraining one or more end layers or ii) using reinforcement learning (RL) to adapt the model to these strong features such as Reinforcement Learning Human Feedback (RLHF) and PPO (amongst others). The computing system can apply an outlier detection function to both audio data and a text transcription of the audio. From applying the outlier detection function, the computing system may classify whether the speaker is genuine or deepfake.

Silence Features

Building on the temporal features described above, the computing system may collect silences and pauses between speech segments may be useful in detecting deepfakes. The error of deepfakes may cause unnatural silences to occur in the generated audio. The computing system may use a VAD to identify non-speech regions in audio, and then create an array consisting of the time lengths of each non-speech region. Arrays of the kind could be collected for both human audio and deepfake audio forming a two-class dataset. Once this dataset is obtained, the computing system may train a machine or deep learning classifier to differentiate human speech from deepfakes.

Silence features may correspond to or include the output of the classifier. For example, the feature may include a scalar that can be used to differentiate between two classes. In some embodiments, the computing system can extract acoustic features (such as MFCCs) on silence portions of audio, concatenate these features, and use the same processes as described above replacing the "silence length segment array" with silence concatenated MFCCs.

Audio Similarity Features

Figure 6:
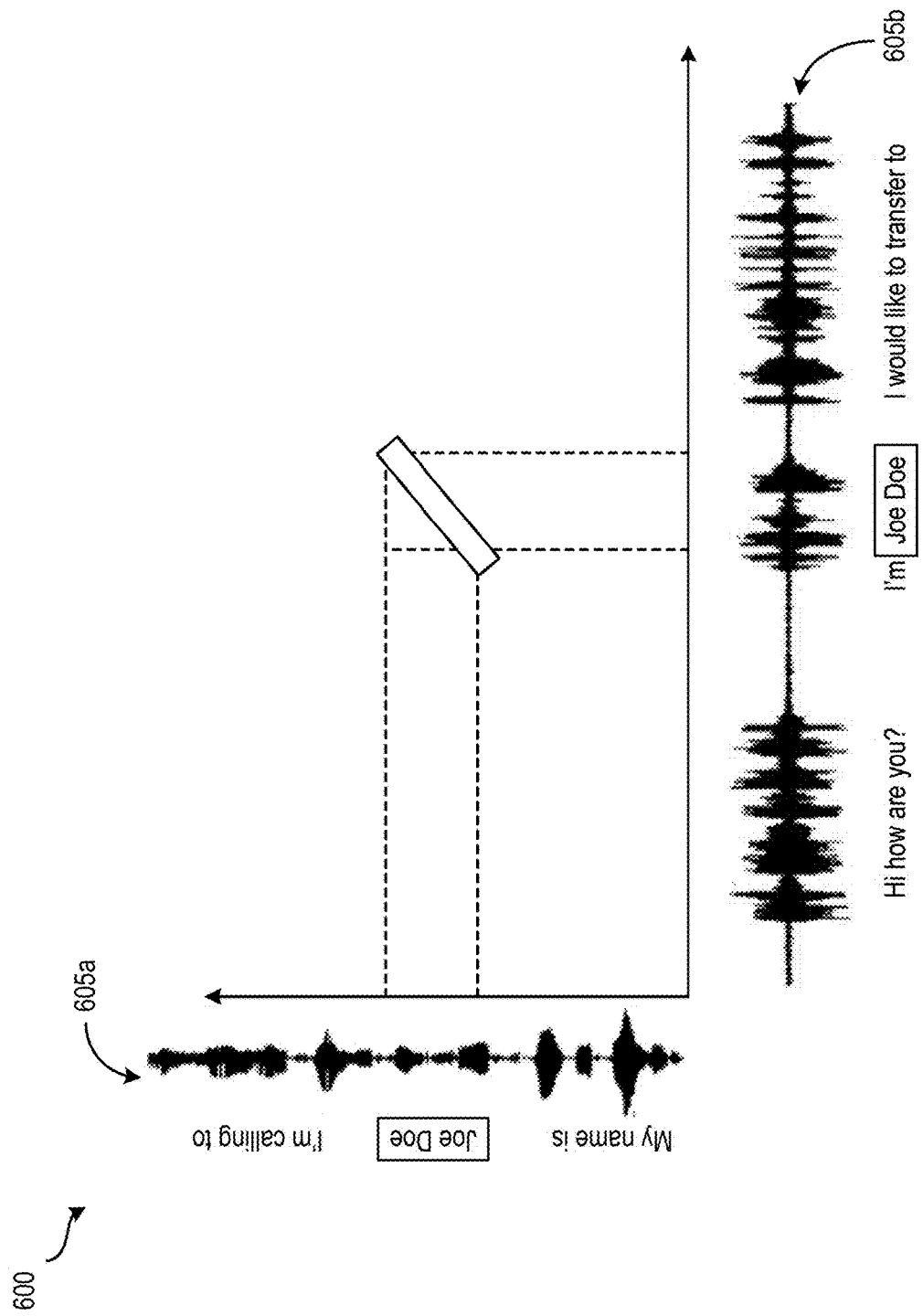
FIG. 6 illustrates a graph showing two speech samples, each containing a repeated phrase, according to an illustrative embodiment.

FIG. 6 illustrates a graph 600 showing two speech samples, each containing a repeated phrase. A computing system (e.g., the analytics server 201) may determine the similarity of sub-portions of audio is partial sequence matching. An approach that can be used to impersonate a speaker's voice in a call center setting would be to prepare audio ahead of time and then replay portions of this deepfake audio to simulate a live speaker. As deepfake technology improves, it is expected that it may eventually be possible to generate deepfake audio in real time. However, even in this case, it is still expected that a deepfake algorithm or program would produce audio with sub portions having higher similarities than that of human speech.

The computing system may determine the similarity of sub-portions of audio is partial sequence matching. For example, within the context of a call center for a financial institution, partial sequence matching may be used by the computing system to analyze repeated words throughout a call and flag calls where the similarity of repeated words (or simply similar audio) is high. In FIG. 6, the graph 600 shows two speech samples 605a and 605b each containing a repeated phrase. A speaker may naturally (or can be prompted to) repeat particular words (e.g., "Joe Doe" every time he calls his financial institution or his insurance company, or multiple times during the call).

Unbounded dynamic time warping (UDTW) algorithm may be used by the computing system independently of the starting point of a specific word in the call or utterance. The computing system may also content-matching approach which utilizes a phonetically-aware DNN system. However, such approaches are computationally very expensive, requiring training a DNN background model and using the background model to compute the required zero-order Baum-Welch statistics at both the enrollment and test time.

The computing system may extract similarity features from the audio. The similarity feature may include any statistic that can be gained from comparing the similarity between two different audio segments. These include, but are not limited to, a max, mean, min, or standard deviation of all similarities present between the two audio segments obtained in methods similar to those used to create FIG. 6.

Risk Engine

A computing system (e.g., the risk engine 220) may reference and analyze the features extracted from the audio signals (such as emotional features, temporal features etc.), to determine the likelihood that the audio is a deepfake. The outputs of the computing device may include one or more scores (e.g., risk score, liveness score, deepfake score) or instructions based upon the scores. The computing system may include a machine learning model that has been trained on a large dataset of both real and synthetic audio data. The training data is used to learn patterns and relationships between the extracted features and the label of whether the audio is a deepfake or not. The machine learning model can be a variety of algorithms, such as Support Vector Machines (SVM), Random Forests, or Neural Networks, among others.

Once the model has been trained, the computing system may use the model to predict the probability whether a new audio sample is a deepfake based on the extracted features. This probability can be compared to a predefined threshold to determine whether the audio is classified as a deepfake or not. The computing system may also incorporate other techniques, such as ensemble methods, to combine the predictions of multiple models and improve overall detection accuracy. Examples of factors that could increase the risk score (or other types of scores): a relatively high voice spoofing and/or fraud score, a mismatch in emotional features and/or temporal features, a relatively risky transaction request (e.g., caller requests an international funds transfer with comparatively higher risk than a request for a balance inquiry).

Example Liveness Detection and NLP Functions

Using the acoustic features extracted from the call audio, the computing system may detect presentation attacks, such as replayed audio speech (e.g., selectively replaying recorded speech) or synthetic speech (e.g., deepfakes, TTS software). Replayed and synthetic speech are known to contain peculiar signal anomalies which distinguish such signals from genuine, live, human-caller speech. The computing system may use acoustic features in a passive manner to perform liveness detection (e.g., the user is not prompted to speak a fixed passphrase or provide a given response). Oftentimes, the accuracy of the computing system changes drastically when a new type of synthetic speech technique is introduced. Thus, to improve the robustness of liveness detection, the computing system may detect various types of anomalies inside the audio signal, in addition or as an alternative to the acoustic features.

In some embodiments, the computing system may classify the presentation attacks by detecting whether there is a background change in the audio clip. The pre-recorded or generated audio used by the malicious actors often have a different background noise than the background noise in the current environment. As such, the computing system may detect and classify changes in the background audio, and can use the result to determine the risk score to predict, for example, whether a call originated from a human caller or robot caller.

In some embodiments, the computing system may identify utterance repetitions. The robustness of liveness detection can be improved further by redesigning the IVR flow to ask the user to repeat the phrase twice. The computing system may can compare the audio similarity between the two phrases. If the phrase is a pre-recorded or generated audio, the similarity of these two phrases is going to be very high.

In some embodiments, an automatic model-upgrade feature can be added to the passive liveness detection in the computing system. The computing system may take human provided feedback and perform automatic model-updates to adapt to new types of presentation attacks. Embodiments may employ any of these above functions or a combination of, for example, passive liveness detection, background change detection audio phrase repetition detection to verify voice liveness with high accuracy and minimizing false acceptances. Below are further descriptions of hardware and software components of sub-systems for performing such functions.

Speech Phrase Repetition Detection

The computing system may determine an amount of repetition in determining the risk score. A human cannot repeat the same sentence twice exactly the same way as pre-recorded audio and/or deepfake do. In the IVR flow, when the IVR asks a question (e.g. first and last name) and gets a response, if the IVR just asks this question again for confirmation. Most likely, a malicious actor will repeat the same audio twice. If the malicious actor is using speech synthesis software, the speech synthesis system will tend to repeat fully or partially the same sentence again. In some cases, this function is performed only on a speech portion. In some cases, this function is performed on the speech portion or text portion.

Figure 7:
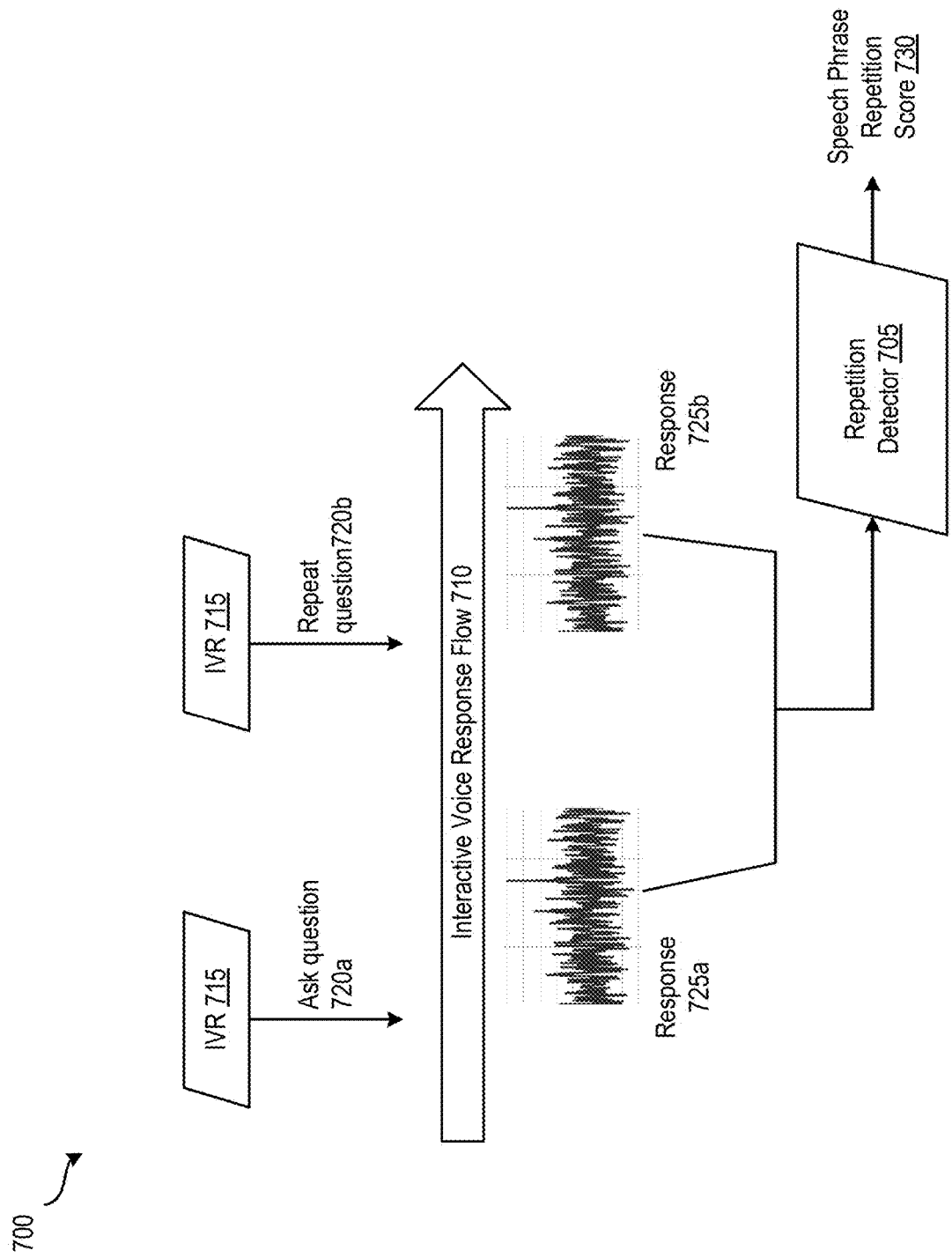
FIG. 7 shows a diagram of a data flow amongst components of a system for fraud detection in audio signals using phrase repetition detection, according to an illustrative embodiment.

FIG. 7 shows a data flow amongst components of a system 700 for fraud detection in audio signals using phrase repetition detection and one or more machine-learning architectures. The system 700 may be implemented using components of the systems 100 or 200. The system 700 may include a repetition detector 705 to process an voice flow 710. The repetition detector 705 may be one or more computing devices (e.g., part of the analytics system 201) to process data associated with the call between the caller and callee (e.g., interactive voice response (IVR) 715). The voice flow 710 may contain or include audio corresponding to questions 720*a* and 720*b* generated by the IVR 715 at two time instances. The voice flow 710 may contain or include responses 725*a* and 725*b* provided by the caller in response to the questions 720*a* and 720*b*. In the voice flow 710, the response 725*a* may be provided in response to the question 720*a* and may thus be subsequent in time to the question 720*a*. Likewise, the response 725*b* may be provided in response to the question 720*b* and may thus be subsequent in time to the question 720*b*.

The repetition detector 705 may receive the voice flow 710, for example, from the callee device. From the voice flow 710, the repetition detector 705 may detect such repeated speech phrases, using a combination of, for example, Dynamic Time Warping (DTW) between first and second responses 725*a* and 725*b*. The repetition detector 705 may use a neural network layer taking the two audio responses to produce a similarity score 730. The repetition detector 705 may also use a speaker embedding neural network to convert the two audio responses into speaker embeddings and compare the similarity between two speaker embeddings, among others.

Figure 8:
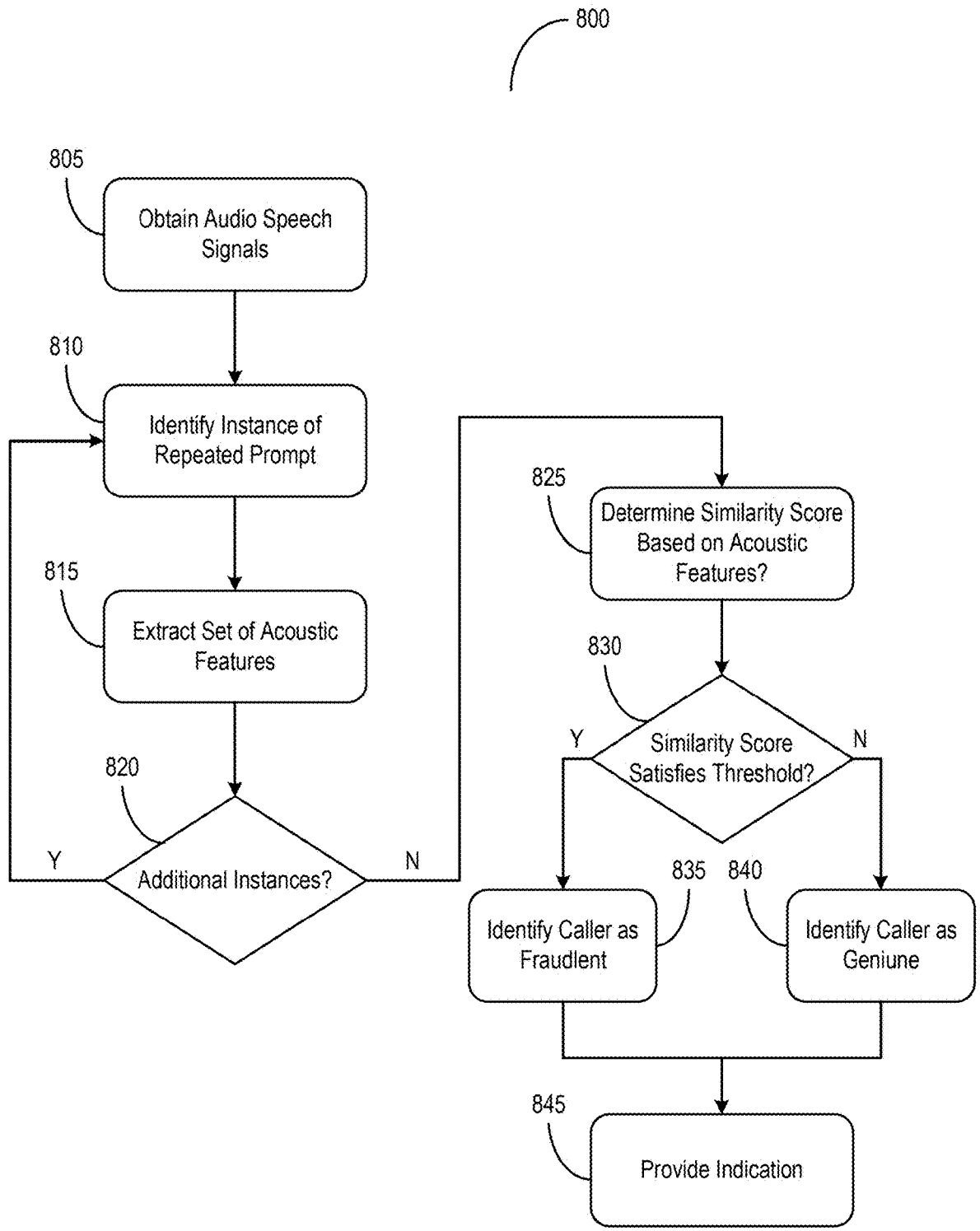
FIG. 8 shows a flow diagram of a method of identifying repeated speech for deepfake detection, in accordance with an illustrative embodiment.

FIG. 8 shows a flow diagram of a method 800 of identifying repeated speech for deepfake detection with one or more machine-learning architectures. The method 800 may be performed or implemented using any of the components detailed herein, such as the customer call center system 110, the customer analytics service system 101, and the analytics system 201, among others. Under the method 800, at step 805, a computer may retrieve, identify, or otherwise receive a set of audio speech signals. The set of audio speech signals may be from a caller on a caller device (e.g., the caller on the caller device 114 or the caller communication device 214). Each audio speech signal may correspond to or include a respective instance of a repeated audible prompt provided by an agent device (e.g., the agent on the agent device 116, the callee agent on the callee communication device 216, or the IVR program) to the caller device. In some embodiments, the set of instances of repeated audible prompts may be provided or generated by an IVR program (e.g., as described herein) for transmission to the caller device. In some embodiments, the computer may provide, send, or otherwise transmit each instance of the repeated audible prompt to the caller device. For example, the computer may be the agent device forwarding audio from the agent using the computer to the caller device. In some embodiments, the computer may receive audio data of audio between the caller device and the agent device.

At step 810, the computer may retrieve, select, or otherwise identify an instance of a repeated audible prompt from at least one of the audio speech signals. Each instance may correspond to or include one or more words provided by an agent device to the caller device. The words forming each instance may be repeated across multiple audio speech signals. In some embodiments, the computer may identify the instance of the repeated audible prompt across multiple segments of audio data corresponding to the set of audio speech signals using a NLP algorithm. For example, the computer may apply an ASR algorithm to convert audio speech signal to a set of words (e.g., in a similar manner as step 1010). From the conversion, the computer may detect repetition of one or more words among the set of words from the audio speech signal. The computer may identify one or more words (e.g., a response by the caller) following the repeated prompt. With the identification, the computer may traverse through the instances of the repeated audible prompt to analyze.

At step 815, the computer may determine, identify, or otherwise extract a set of acoustic features from the instance of the repeated audible prompt. The set of acoustic features may include any number of features derived from the audio speech signals to use in determining whether the caller in the set of audio speech signals is a human or machine. To extract, the computer may apply a ML model of the machine-learning architecture to the portion of the audio speech signal corresponding to the instance of the repeated prompt. In some embodiments, the computer may apply the ASR algorithm to the instance of the repeated audible prompt to extract textual content. The textual content may include or contain text in chronological sequence of strings (e.g., words, phrases, or interjections) corresponding to speech from the caller or the agent, or both.

In some embodiments, the computer may apply a feature extractor to the portion of the audio speech signal corresponding to the instance of the repeated audible prompt to generate or determine a set of acoustic parameters. The set of acoustic parameters may be, for example, Geneva Minimalistic Acoustic Parameter Set (eGeMAPS) low-level descriptor features, such as: frequency related parameters (e.g., pitch, jitter, and formant frequencies), amplitude related parameters (e.g., shimmer, loudness, harmonics to noise (HNR) ratio), and spectral parameters (e.g., alpha ratio, Hammarberg index, spectral scope, relative energies of formants, harmonic differences, MFCCs, and spectral flux), among others. The acoustic parameters may be extracted from a frequency domain representation (e.g., derived from short time Fourier transform) of the portion of the audio speech signal. The computer may identify the set of acoustic parameters as the set of acoustic features.

In some embodiments, the computer may apply the ML model or algorithm to at least one portion of the audio speech signal corresponding to at least one instance of the repeated audible prompt to generate or determine a speech pattern of the caller. The ML model or algorithm (e.g., implemented using a bag of words model, a latent semantic analysis, word embedding model, SVM, Random Forest, Dynamic Time Warping (DTW) algorithm, or a deep learning neural network) may be trained or established using a training dataset including audio samples labeled with corresponding patterns. By applying, the computer may determine the speech pattern of the caller. The speech pattern may identify or include, for example: a sentiment, prosody (e.g., melody or rhythm of speech), pitch, volume, or speech rate, among others, of the caller. The computer may identify the speech pattern as the set of acoustic features. At step 820, the computer may determine whether there are additional instance of repeated prompts across the set of audio speech signals. If there are more instances, the computer may identify the next instance of the repeated audible prompt and repeat from step 810.

At step 825, if there are no more additional instances, the computer may calculate, generate, or otherwise determine at least one similarity score based on the sets of acoustic features. The similarity score may identify or indicate a degree of similarity (e.g., acoustic or lexical similarity). The set of acoustic features may be extracted from across the instance of repeated audible prompts from the set of acoustic speech signals. To determine, the computer may compare the sets of acoustic features across the instances of repeated audible prompts from the set of audio speech signals. For example, the computer may compare the frequency domain representation of one set of acoustic features with the frequency domain representation another set of acoustic features. Based on the comparison, the computer may determine the similarity score between the sets of acoustic features from the sets of audio speech signals. The computer may repeat the comparison across sets of acoustic features derived from the set of audio speech signals in determining the similarity score.

In some embodiments, the computer may apply the DTW function to at least two of the audio speech signals (e.g., the portions corresponding to the instances of repeated audible prompts) to determine the similarity score. The DTW function may be used to compare similarity of the time-domain representations of the sets of audio speech signals. From the comparison, the DTW function may be used to calculate an optimal correspondence between at least two of the audio speech signals by matching indices from one audio speech signal with the indices form another audio speech signals. The computer may apply the DTW function to the audio speech signals to determine the optimal correspondence. The computer may identify the optimal correspondence as the similarity score across the audio speech signals.

In some embodiments, the computer may apply a ML model of the machine-learning architecture to at least two of the audio speech signals to determine the similarity score. The ML model (e.g., implemented using a neural network, SVM, regression model (e.g., a linear or logistic regression), a k-nearest neighbors, or principal component analysis (PCA)) may be used to identify latent features in the audio speech signals with which to compare the latent features in determining the similarity scores. The computer may apply the ML model to at least two of the audio speech signals to compare. From applying, the computer may identify the latent features across multiple audio speech signals. With the identification, the computer may compare the latent features to determine the similarity score. The similarity score may indicate or correspond to a degree of differences between the latent features from one instance with the latent features from another instance.

In some embodiments, the computer may apply a speaker embedding neural network to at least two of the audio speech signals to determine the similarity score. The speaker embedding neural network (e.g., autoencoder) may be trained using a training dataset including sample audio and labeled embeddings. The speaker embedding neural network may be used to generate or extract speaker embeddings from the audio speech signals. The speaker embeddings may identify or include features (e.g., feature map or vector) from the audio speech signals with which to compare to determine similarity scores. The computer may apply the speaker embedding neural network to the audio speech signals to produce speaker embeddings. With the output, the computer may compare the speaker embeddings with one another. Based on the comparison, the computer may determine the similarity score. The similarity score may identify or indicate a degree of similarity among the speaker embeddings.

At step 830, the computer may identify or determine whether the similarity score satisfies a similarity threshold. The similarity threshold may delineate, specify, or otherwise define a value for the similarity score indicating and/or referenced to determine whether the caller as fraudulent (e.g., machine) or genuine (e.g., human). Generally, similarity scores higher than the threshold may be classified as fraudulent, whereas similarity scores lower than the threshold may be classified as genuine, because fraudulent or machine callers provide acoustic features that are identical or nearly identical (e.g., within 90% similarity across instances of repeated audible prompts). To determine whether the caller as fraudulent (e.g., machine) or genuine (e.g., human), the computer may compare the similarity score against the threshold.

At step 835, when the similarity score satisfies the threshold, the computer may determine, classify, or otherwise identify the caller as fraudulent. If the similarity score is greater than or equal to the threshold, the computer may determine that the similarity score satisfies the similarity threshold. A fraudulent caller may be correlated with a source that provides sets of acoustic features that are identical or nearly identical (e.g., within 90-95% similarity across instances of repeated audible prompts). At step 840, when the similarity score does not satisfy the threshold, the computer may determine, classify, or otherwise identify the caller as genuine. In contrast, if the similarity score is less than the threshold, the computer may determine that the similarity score does not satisfy the similarity threshold. A human caller may be correlated with a source that provides sets of acoustic features that are different (e.g., outside 30-50% similarity).

At step 845, the computer may send, transmit, or otherwise provide an indication identifying the classification of the caller as fraudulent or human. When the caller is identified as fraudulent, the computer may generate the indication to identify the caller as a fraudulent caller. Conversely, when the caller is identified as human, the computer may generate the indication to identify the caller as a human caller. The computer may provide the indication to an agent computer (e.g., the agent device 116 or the callee communication device 216) for presentation that to the agent. Once received, the agent computer may display, render, or otherwise present that indication of the caller as one of fraudulent or human to the agent via an interface (e.g., a graphical user interface (GUI)).

Passive Liveness Detection with Human in the Loop

Figure 9:
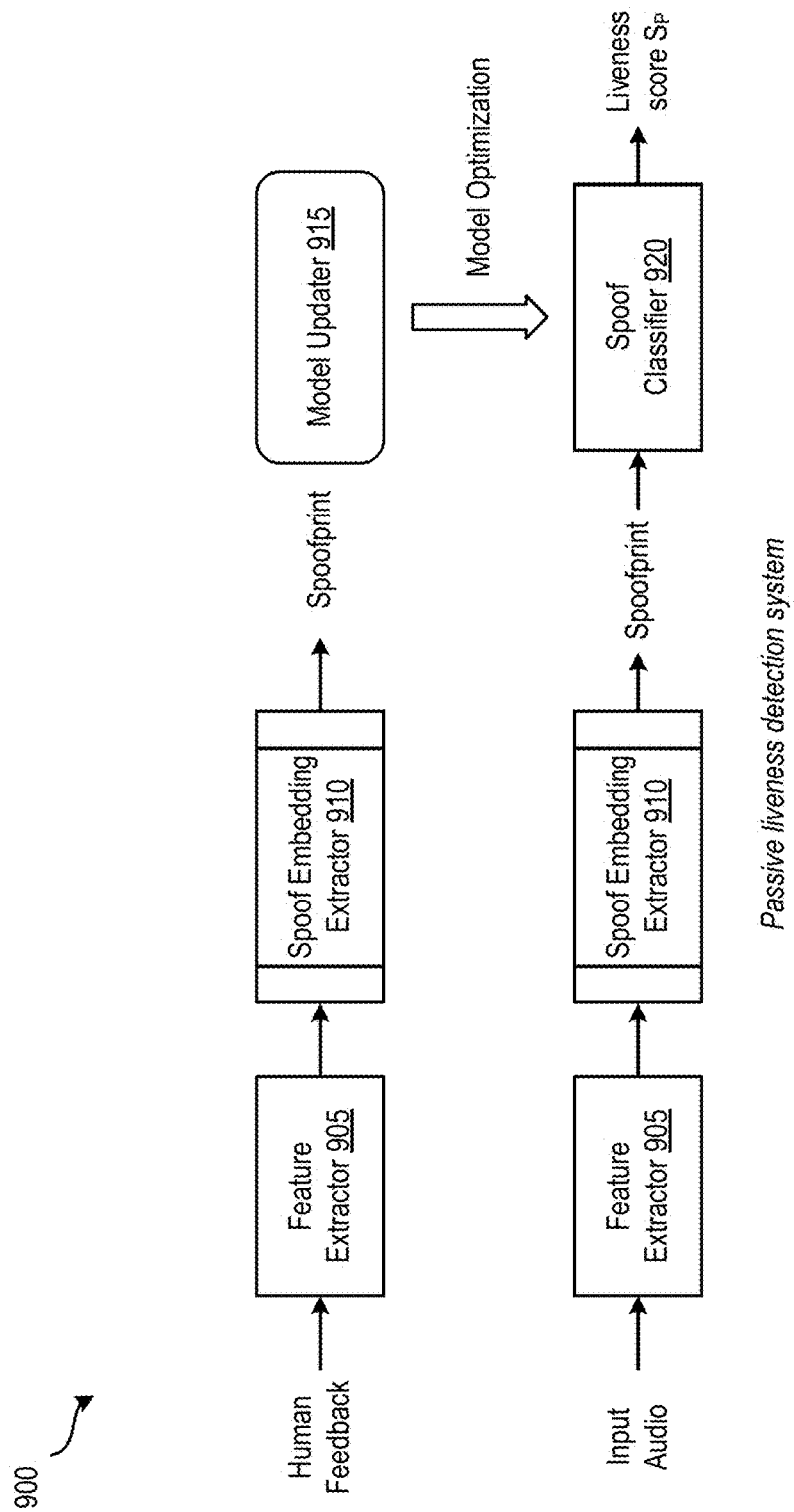
FIG. 9 shows a diagram of a data flow amongst components of a system for passive liveness detection in audio and/or text content, according to an illustrative embodiment.

FIG. 9 shows a data flow amongst components of a system 900 for passive liveness detection in audio and/or text content using one or more machine-learning architectures. The system 900 may be implemented using components of the systems 100 or 200. The system 900 may include one or more computers to execute a feature extractor 905, a spoof embedding extractor 910, a model updater 915, and a spoof classifier 920, among others. In the system 900, the feature extractor 905 may detect replayed pre-recorded human speech or synthetic ("deepfake") speech. The feature extractor 905 may take raw audio waveform as input and outputs a liveness score. The spoof embedding extractor 910 may take in the audio features or the raw audio waveform to extract the spoofprint embedding. This is similar to the speaker verification; however, the embedding and the features focus on artifacts that would be typically present in replayed and/or synthetic speech. In the test phase, the extracted spoof embeddings are fed into the spoof classifier 920 to generate a liveness score.

The system 900 may also include a model updater 915 (executing on the analytics server 202) to quickly adopt the spoof embedding extractor 910 and spoof classifier 915 to out of domain presentation attacks. The out-of-domain attacks may include deepfake audio generated by unknown speech synthesis models, an audio recording replayed in a different environment or using an unknown replay de-vice, among others. An agent can send a human feedback with an indication the new presentation attack audio samples to the system, and the model updater 915 may upgrade the model (e.g., the spoof embedding extractor 910 and the spoof classifier 920) accordingly. This can be performed using several different policy upgrade algorithms, not limited to, using one or more of the following methods.

Under full model update, the model updater 915 may add the new data point to the training dataset and then retrain the entire model using the new training dataset. Under partial model update, the model updater 915 may add the new data point to the training data and retrain the entire model using the new training dataset. During training, the model updater 915 may freeze certain parts of the model. Under trust region policy update, the model updater 915 may retrain the model using the new feedback. This can be done using several reinforcement learning methods such as the trust region policy optimization algorithm, proxy policy optimization and its variance, among others.

Figure 10:
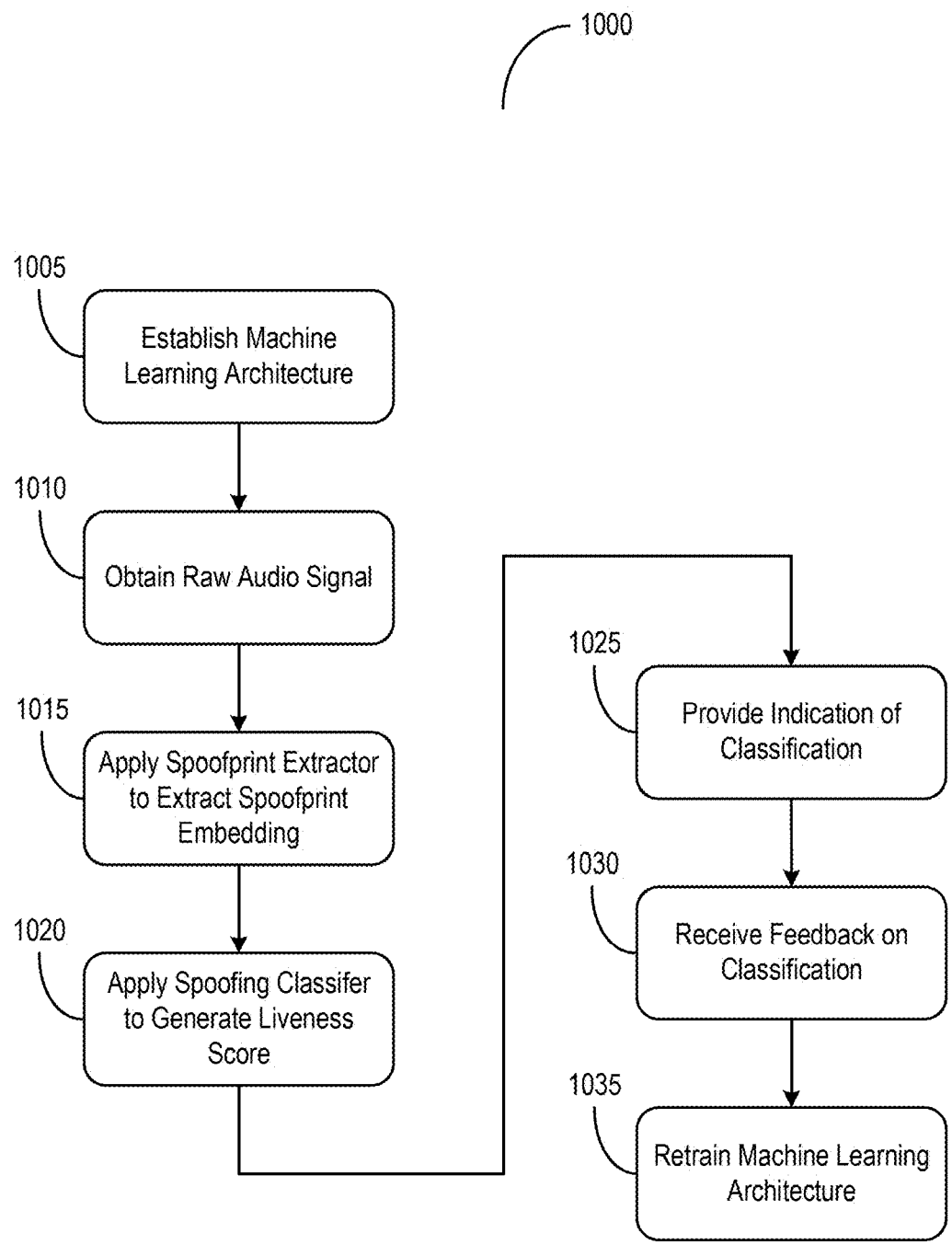
FIG. 10 shows a flow diagram of a method of training machine learning architectures for deepfake detection, in accordance with an illustrative embodiment.

FIG. 10 shows a flow diagram of a method 1000 of training machine learning architectures for deepfake detection using one or more machine-learning architectures. The method 1000 may be performed or implemented using any of the components detailed herein, such as the customer call center system 110, the customer analytics service system 101, and the analytics system 201, among others. Under the method 1000, at step 1005, the computer may initialize or establish a machine learning architecture using a training dataset. The establishment of the machine learning architecture may be prior to the obtaining of the raw audio signal during an evaluation or runtime mode. The machine learning architecture may include a spoofprint extractor and a spoofing classifier. Within the machine learning architecture, the spoofprint extractor and the spoofing classifier may be configured in a serial configuration. The output from the processing the input raw audio signal using the spoofprint extractor may be fed forward as an input to the spoofing classifier to generate the liveness score. The training dataset may identify or include a set of examples. Each example may identify or include a sample audio signal and a label indicating a speaker in the sample raw audio signal as one of a human speaker or a machine spoof attack. The sample audio signal may include a speech signal for the speaker.

To train, the computer may apply the sample audio signal from each example of the training dataset to the spoofprint extractor and the spoofing classifier of the machine learning architecture. The computer may input or feed the sample audio signal into the spoofprint extractor. The computer may process the sample audio signal in accordance with the spoofprint extractor to output or generate a corresponding spoofprint embedding. With the output, the computer may feed or input the spoofprint embedding into the spoofing classifier. The computer may process the spoofprint embedding using the spoofing classifier to output or generate a corresponding liveness score. The computer may compare the liveness score with a threshold to classify the speaker in the sample audio signal as one of the human speaker or a machine spoof attack.

The computer may compare the classification of the speaker using the liveness score from the machine learning architecture with the corresponding label in the example of the training dataset. Based on the comparison, the computer may calculate or determine a loss metric (e.g., a mean squared error, a mean absolute error, a cross-entropy loss, or a Huber loss) indicating a degree of deviation between the output from the machine learning architecture versus the expected output from the label of the example. Using the loss metric, the computer may modify, adjust, or otherwise update the machine learning architecture, including at least one of the spoofprint extractor or the spoofing classifier, or both. With the establishment, the computer may use the machine learning architecture with newly obtained audio signals to classify speakers as human speakers or machine spoof attacks.

At step 1010, a computer may receive, identify, or otherwise obtain at least one raw audio signal. The raw audio signal may be from a calling device (e.g., the caller device 114 or the caller communication device 214) including at least one speech signal for a speaker (e.g., the caller on the calling device). The speech signal may be acquired from the speaker, in a passive manner without any prompts. For example, the computer may obtain the raw audio signal from audio data corresponding to a conversation between the caller and an agent on an agent device (e.g., the agent on the agent device 116, the callee agent on the callee communication device 216, or the IVR program). In some embodiments, the speech signal may be acquired from the speaker, in an active manner. For instance, the computer may obtain the raw audio signal from the audio data corresponding to an answer from the caller in response to a prompt provided by the computer or the agent device.

With the obtaining, the computer may determine, identify, or otherwise extract a set of acoustic features from the raw audio signal. The set of acoustic features may include any number of features derived from the raw audio signal to use in determining whether the caller in the set of audio speech signals is a human or machine. In some embodiments, the computer may apply an automated speech recognition (ASR) algorithm to the raw audio signal to extract textual content. In some embodiments, the computer may apply a feature extractor to the portion of the raw audio signal to generate or determine a set of acoustic parameters. The set of acoustic parameters may be, for example, Geneva Minimalistic Acoustic Parameter Set (eGeMAPS) low-level descriptor features, such as: frequency related parameters, amplitude related parameters, and spectral parameters, among others. In some embodiments, the computer may apply the ML model or algorithm to the raw audio signal to generate or determine a speech pattern of the caller. The speech pattern may identify or include, for example: a sentiment, prosody (e.g., melody or rhythm of speech), pitch, volume, or speech rate, among others, of the caller.

At step 1015, the computer may apply a spoofprint extractor to the raw audio signal to generate, output, or otherwise extract at least one spoofprint embedding. The spoofprint extractor may be part of a machine learning architecture, and may be used to extract the spoofprint embedding. The spoofprint extractor may be implemented using a neural network and related machine-learning functions and techniques, such as an autoencoder, SVM, regression model (e.g., a linear or logistic regression), a k-nearest neighbors, or PCA, among others. The spoofprint embedding may define, identify, or otherwise represent a set of spoofing artifacts used to determine whether the speaker is machine or human. The spoofing artifacts may include one or more objects in the set of acoustic features correlated with machine generated speech.

To apply, the computer may input or feed the raw audio signal to the spoofprint extractor. In some embodiments, the computer may apply the spoofprint extractor to the set of acoustic features derived from the speech signal of the raw audio signal to generate the spoofprint embedding. Upon feeding, the computer may process the raw audio signal (e.g., time-domain or frequency-domain representations) in accordance with the spoofprint extractor. From processing, the computer may generate the spoofprint embedding including a reduced representation of the raw audio signal used to determine whether the speaker is machine or human. In some embodiments, the computer may generate the set of spoofing artifacts in the set of acoustic features from the raw audio signal. The set of spoofing artifacts may correspond to one or more objects in the set of acoustic features used to determine whether the speaker is machine or human.

At step 1020, the computer may apply a spoofing classifier to the spoofprint embedding to calculate, determine, or otherwise generate at least one liveness score. The spoofing classifier may be part of the machine learning architecture (e.g., the same machine learning architecture as the spoofprint extractor), and may be used to generate liveness scores from the spoofprint embedding. The spoofprint classifier may be implemented using, for example, a neural network and related machine-learning techniques and functions, such as SVM, regression model (e.g., a linear or logistic regression), a clustering algorithm (e.g., k-nearest neighbors), or PCA, among others. The liveness score may identify or indicate a likelihood that the speaker is a human speaker (or a machine). In some embodiments, the spoofprint classifier may be a clustering algorithm mapping spoofprint embeddings to liveness scores in a n-dimensional feature space. To apply, the computer may input or feed the spoofprint embedding to the spoofing classifier. Upon feeding, the computer may process the spoofprint embedding in accordance with the architecture of the spoofing classifier. From processing, the computer may generate the liveness score for the speaker (e.g., the caller) in the raw audio signal.

At step 1025, the computer may send, transmit, or otherwise provide an indication of a classification as one of a human speaker or a machine spoof attack. The classification may identify whether the speaker in the speech signal of the raw audio signal as one of the genuine human speaker or machine spoof attack. The computer may determine, identify, or otherwise classify the speaker in the raw audio signal based on a comparison between the liveness score and a threshold. The threshold may delineate, specify, or otherwise define a value at which the liveness score at which to classify the speaker in the raw audio signal as one of a human speaker or a machine spoof attack. In general, the higher the value of the liveness score, the more likely the speaker in the raw audio signal may be a human speaker. Conversely, the lower the value of the liveness score, the less likely the speaker in the raw audio signal may be a human speaker. If the liveness scores satisfies (e.g., greater than or equal to) the threshold, the computer may classify the speaker as a human speaker. On the other hand, if the liveness scores does not satisfy (e.g., less than) the threshold, the computer may classify the speaker as a machine spoof attack.

With the classification, the computer may provide the indication identifying the classification of the speaker as the human speaker or the machine spoof attack. When the speaker is classified as human speaker, the computer may generate the indication to identify the speaker as the human speaker. Conversely, when the speaker is classified as the machine spoof attack, the computer may generate the indication to identify the caller as the machine spoof attack. The computer may provide the indication to an agent computer (e.g., the agent device 116 or the callee communication device 216) for presentation that to the agent. Once received, the agent computer may display, render, or otherwise present that indication of the caller as one of fraudulent or human to the agent via an interface (e.g., a graphical user interface (GUI)).

At step 1030, the computer may retrieve, identify, or otherwise receive feedback on the indication. The feedback may be interactive feedback from the agent on the agent computer via an interface (e.g., the GUI). When the speaker is indicated as a new machine spoof attack via the interface, the computer may receive an indication identifying a new machine spoof attack in the speech signal of the raw audio signal. The indication may be received via one or more user input on an interface. The interface may be presented via the computer or another computer, such as the agent computer. For example, the computer may receive the user input from the agent indicating that the speech signal of the raw audio signal via a graphical user interface presented is a new machine spoof attack via the agent computer. The new machine spoof attack may differ from the machine spoof attacks that the machine learning architecture was previously trained on. Conversely, when the speaker is indicated as the genuine human speaker, the computer may receive the feedback with an indication identifying a lack of machine spoof attack in the speech signal of the raw audio signal. For instance, the agent on the agent computer may confirm or override the classification of the speaker in the speech signal of the raw audio signal as a genuine human speaker via the graphical user interface.

At step 1035, the computer may modify, update, or otherwise retrain at least a portion of the machine learning architecture using the feedback. In response to the indication of the new machine spoof attack, the computer may retrain at least the portion of the machine learning architecture, such as at least one of the spoofprint extractor or the spoofing classifier, or both. To retrain, the computer may calculate, generate, or otherwise determine at least one loss metric based on the comparison between the classification from the liveness score and the indication of the new machine spoof attack. The loss metric may be determined by the computer according to a loss function, such as a mean squared error, a mean absolute error, a cross-entropy loss, or a Huber loss function, among others. The loss metric may indicate or identify a degree of deviation between the classification generated by the liveness score from the machine learning architecture and the indication in the feedback. With the determination, the computer may update or retrain at least the portion of the machine learning architecture. The retraining may be in accordance with an optimization function, such as an implicit stochastic gradient descent (SGD), a momentum, adaptive gradient algorithm, root mean square propagation, and adaptive moment estimation (Adam), among others.

The computer may retrain at least the portion of the machine learning architecture according to an update policy. The update policy may define, identify, specify which portions of the machine learning architecture (e.g., the spoofprint extractor or spoofing classifier or both) are to be updated. The policy may also specify which data points are to be used to retrain the machine learning architecture. In some embodiments, the policy may specify that a portion of the machine learning architecture (e.g., either the spoofprint extractor or the spoofing classifier) is to be retrained. Under the policy, the computer may retrain the portion of the machine learning architecture using the identification of the new machine spoof attack. While retraining, the computer may also freeze, save, or otherwise maintain a remaining portion of the machine learning architecture. The computer may update the specified portion of the machine learning architecture using the loss metric.

In some embodiments, the policy may specify that both the spoofprint extractor and spoofing classifier of the machine learning architecture is to be updated with the indication of the new machine attack. Under the policy, the computer may retrain the entirety of the machine learning architecture using the identification of the new machine spoof attack. To retrain, the computer update the spoofprint extractor and spoofing classifier using the loss metric (e.g., via back-propagation). In some embodiments, the policy may specify that both the spoofprint extractor and spoofing classifier of the machine learning architecture is to be updated and the entire training dataset. Under the policy, the computer may insert, include, or otherwise add a new data point associated with the identification of the new machine spoof attack to the training dataset. With the addition, the computer may retrain the entirety of the machine learning architecture using the training dataset.

In some embodiments, the computer may modify or update the machine learning architecture using the indication of no machine spoof attack in the speech signal of the raw audio signal. The computer may calculate, generate, or otherwise determine at least one loss metric based on the comparison between the classification and the indication of the no new machine spoof attack. With the determination of the loss metric, the computer may update or retrain at least the portion of the machine learning architecture. The computer may update at least the portion of the machine learning architecture according to the policy, in a similar manner with the indication of the lack of new machine spoof attack.

Audio Background Change Detection

Figure 11:
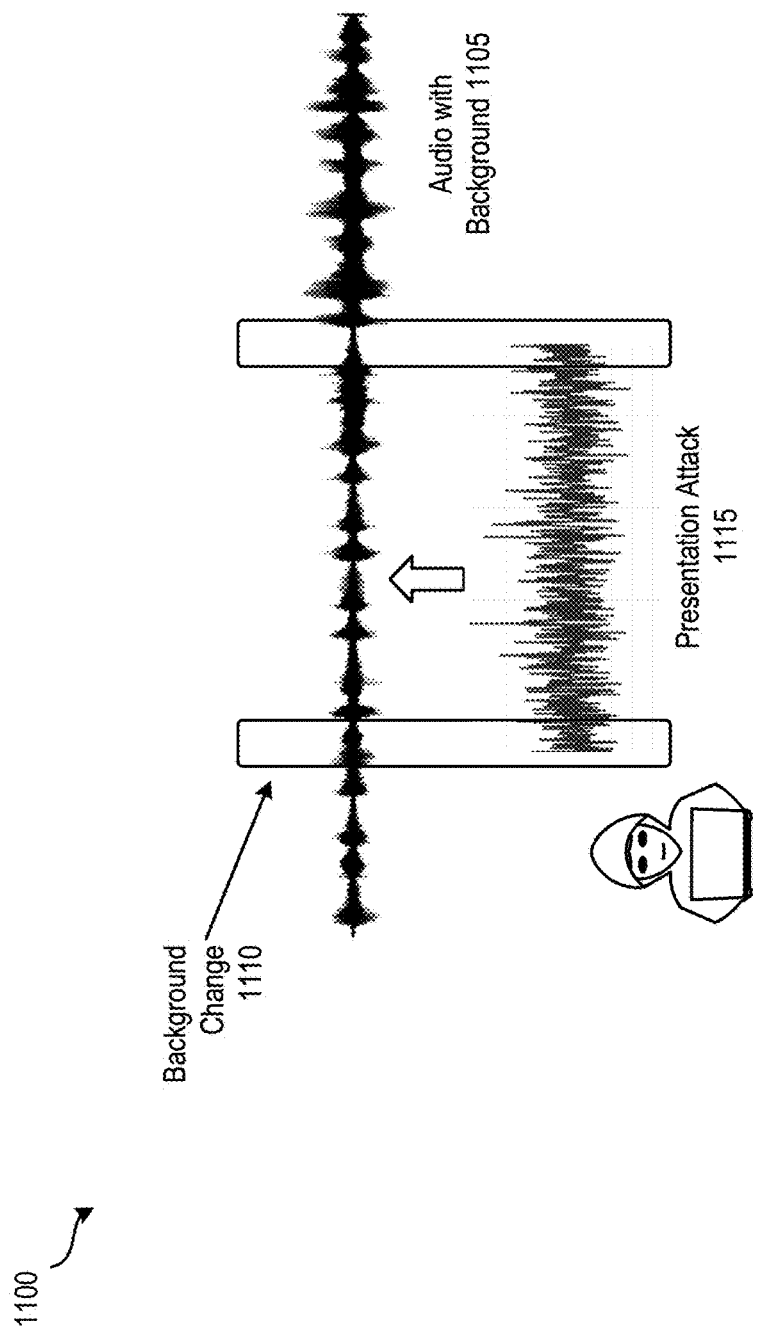
FIG. 11 shows a diagram of a data flow amongst components of a system for synthetic content detection in audio and/or text content using audio background change detection, according to an illustrative embodiment.

FIG. 11 shows a data flow 1100 amongst components of a system for synthetic content detection in audio and/or text content using audio background change detection, and according to one or more machine-learning architectures. The data flow may be implemented using components of the systems 100 or 200. A computing system (e.g., the analytics system 201) may perform audio background change detection on audio 1105 to detect whether there are sudden background changes 1110 in the audio indicative of a presentation attack 1115. Because of the presentation attacks 1115 either using a pre-recorded or generated speech, it is very unlikely that the audio 1105 contains the same environment background noise as the attacker's current environment. Therefore, when the attacker starts to play the pre-recorded audio, the audio background 1110 may suddenly change in terms of noise type, reverberation ratio and signal to noise ratio, among others. The computing system may detect such a change 1110 within the audio 1105. In some cases, the computing system may perform the function on the speech portion or text portion.

The computing system may include or use an audio event detection neural network to detect whether there is one or more anomalous events (e.g., corresponding to the background change 1110) happening in the background. The computing system may also include or use an audio quality estimation model that estimates the noise types and reverb ratio from the audio 1105. A sudden change in audio quality in the audio 1105 indicates a presentation attack 1115. The computing system may also include or use a neural network takes a continuous number of frames at a time interval. The neural network may determine whether there is an environmental background change within these frames.

Figure 12:
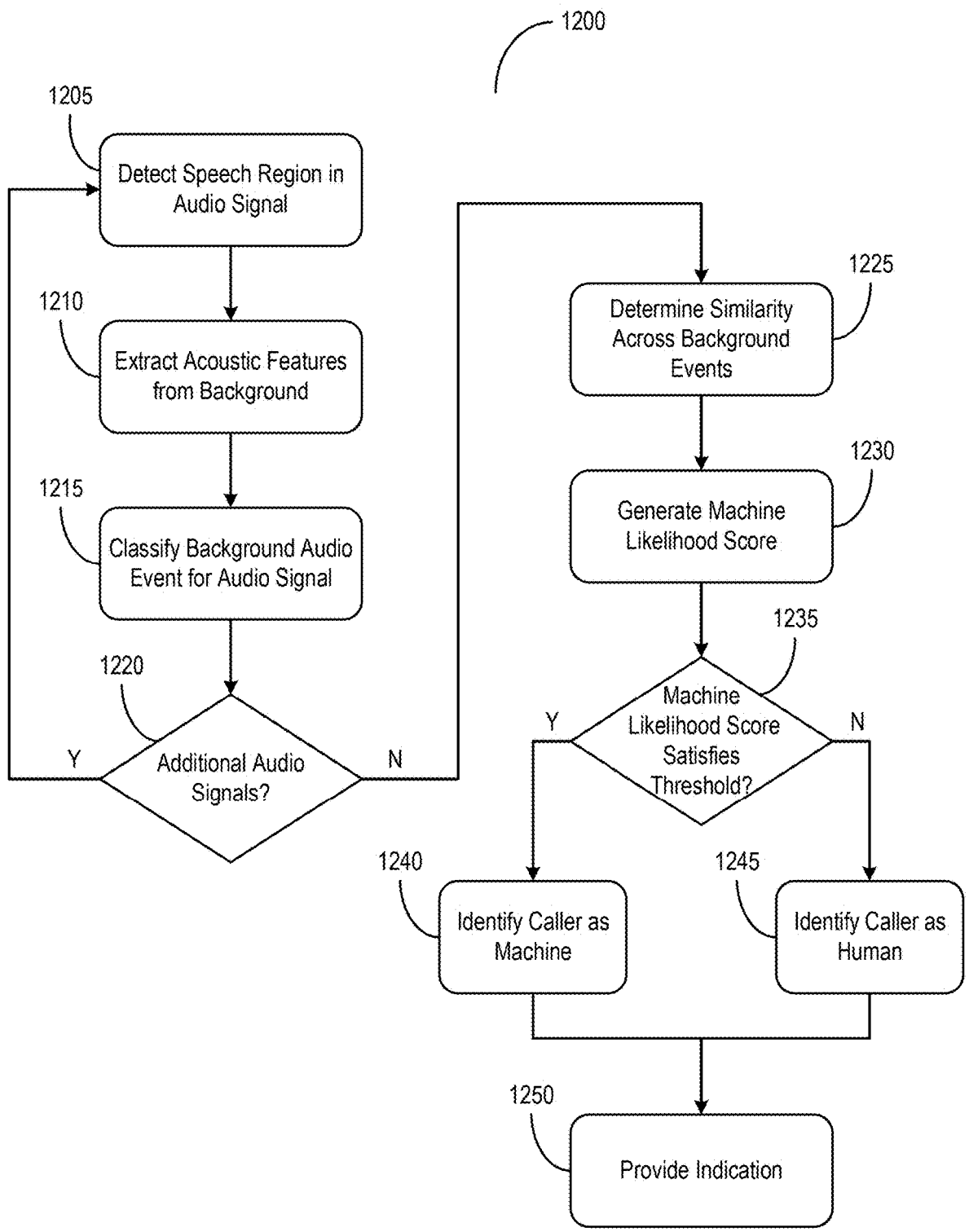
FIG. 12 shows a flow diagram of a method of detecting machine speech in calls based on audio background change detection, in accordance with an illustrative embodiment.

FIG. 12 shows a flow diagram of a method 1200 of detecting machine speech in calls based on audio background change detection and using one or more machine-learning architectures. The method 1200 may be performed or implemented using any of the components detailed herein, such as the customer call center system 110, the customer analytics service system 101, and the analytics system 201, among others. Under the method 1200, at step 1205, a computer may recognize, identify, or otherwise detect at least one speech region in at least one audio signal during at least one call from a caller (e.g., the caller on the caller device 114 or the caller communication device 214). The audio signal may be from audio data of a conversation between the caller and an agent on an agent device (e.g., the agent on the agent device 116 or the callee communication device 216). The speech region may contain or include at least one segment (or frames) of the audio signal corresponding to the agent and at least one other speech segment (or frames) corresponding to the caller. The speech segments forming the speech region may be consecutive within the inbound audio data. For instance, the computer may detect the speech region with a segment corresponding to a question by the agent and a following speech segment corresponding to an answer from the caller. Conversely, the computer may detect the speech region with a segment corresponding to a request by the caller and a following speech segment corresponding to a response from the agent.

At step 1210, with the detection, the computer may determine, identify, or otherwise extract a set of acoustic features from a background in the audio signal. The background audio may correspond to a portion of the audio in the audio signal that does not correspond to the foreground speech between the caller and the agent. For instance, the computer may use a voice activity detection (VAD) algorithm to discriminate between the speech and non-speech portions of the audio signal, and use the non-speech portion to extract acoustic features. To extract, the computer may apply a feature extractor to the background of the audio signal to determine a set of acoustic parameters for the background. The set of acoustic features for the background may identify or include, for example: an amplitude over time, a loudness over time, spectral characteristics, a noise type (e.g., a color of noise), a noise energy, a temporal pattern, an echo, and a reverberation, among others.

At step 1215, the computer may determine, identify, or otherwise classify a set of background audio events for the audio signal based on the set of acoustic features extracted from the background. The set of background audio events may indicate or identify events from the background audio used to determine whether the caller in the speech region of the audio signal is to be classified as machine or human. For example, the classification of background audio events may identify or include: a source of the background audio (e.g., music, environment, ambient noise, vehicle, other speakers); an energy of the background; a stationarity of the noise (e.g., stationary or non-stationarity); or a pattern in the background; among others.

In some embodiments, the computer may apply the event classifier on the set of acoustic features in the audio signal to generate, determine, or otherwise classify the set of background events. In some embodiments, the computer may also apply the event classifier to the speech region in the audio signal. The event classifier may be implemented using a machine learning (ML) model, an artificial intelligence (AI) algorithm, or another function. For example, the event classifier may be a clustering algorithm (e.g., a k-nearest neighbor) defining a mapping between acoustic events to one or more classifications of background events in an n-dimensional feature space. To apply, the computer may input or feed the set of acoustic features to the event classifier. Upon feeding, the computer may process the set of acoustic features in accordance with the event classifier. From processing, the computer may produce or generate the set of background audio events for the background audio in the speech region of the audio speech.

In some embodiments, the computer may apply the event classifier to the set of acoustic features of the background audio (or the audio signal) to detect one or more anomalous events within the audio signal. The event classifier may be an anomaly detection model or algorithm, implemented using a statistical method, a support vector machine (SVM), a random forest, a neural network (e.g., a variation autoencoder or a recurrent neural network), a spectral analysis algorithm, a dynamic time warping (DTW) function, among others. Each anomalous events may identify at least a portion in the background audio that is anomalous, an outlier, or at least different from expect. To apply, the computer may input or feed the set of acoustic features to the event classifier. Upon feeding, the computer may process the set of acoustic features in accordance with the event classifier. From processing, the computer may determine or detect the anomalous events. The computer may also detect a lack of anomalous events from the background audio of the audio signal.

In some embodiments, the computer may apply an estimation model on the set of acoustic features to calculate, generate, or otherwise determine at least one quality metric for the background audio. The quality metric of the background audio may measure, identify, or otherwise indicate a noise type (e.g., a color of noise), an echo, and reverberation, a signal to noise ratio (SNR) (e.g., between the energy of the speech segment and the noise in the background), or a transfer characteristic, among others. The estimation model may be implemented using a machine learning (ML) model, an artificial intelligence (AI) algorithm, or another function. For instance, the estimation model may be a feature extractor to characterize the quality metric of the background audio in the speech region of the audio signal.

At step 1220, the computer may identify or determine whether there are additional audio signals to be processed. In some embodiments, the computer may continue to retrieve or acquire additional audio signals as part of the call between the caller and the agent. For example, the computer may inspect the call taking place between the caller and the agent to evaluate in determining whether the caller is machine or human. In some embodiments, the computer may identify additional audio signals and additional speech segments from the audio data. If there is at least one additional audio signal, the computer may repeat the method from step 1205.

At step 1225, if there are no more additional audio signals, the computer may calculate, generate, or otherwise determine an amount of similarity across the background audio events. The amount of similarity may identify or indicate a degree of similarity among the sets of background events across the audio signals. To determine, the computer may compare one set of background audio events and at least one other set of background audio events. The comparison may be in accordance with a function. The function may specify or identify a mapping between differences in background audio events across the background audio to values for the amounts of similarity. In some embodiments, the computer may determine an amount of similarity across the quality metrics in background audio from the audio signals. To determine, the computer may compare one quality metric and at least one other quality metrics. For example, the computer may calculate a difference in quality metrics as the amount of similarity.

At step 1230, the computer may calculate, determine, or otherwise generate at least one machine likelihood score based on the amount of similarity. The machine likelihood score may identify or indicate a degree of likelihood that the caller in the audio signals is a machine. The machine likelihood score may be over one or more speech segments (or frames) corresponding to the audio signals. In some embodiments, in generating the machine likelihood score, the computer may determine or identify one or more background events within a time period during the call. With the identification, the computer may use the amount of similarities of the one or more background events to generate the machine likelihood score.

The computer may generate the machine likelihood score in accordance with a function. The function may define, specify, or otherwise define a mapping between the amounts of similarities and the machine likelihood scores. In general, a machine caller may be correlated or associated with the provision of sets of background audio events that are distinct throughout the call. As such, the lower the amount of similarity among the sets of background audio events, the lower the value of the machine likelihood score may be. Conversely, the higher the amount of similarity among the sets of background audio events, the higher the value of the machine likelihood score may be.

In some embodiments, the computer may determine the machine likelihood score based on a comparison among the quality metrics, in addition to the classification of the set of background audio events. In some embodiments, the computer may determine the machine likelihood score based on the amount of similarities among the quality metrics. The generation of the machine likelihood score by the computer using the quality metrics may be in accordance with a function. The function may define, specify, or otherwise define a mapping between the differences among the quality metrics and the machine likelihood scores. In general, the higher the difference among the quality metrics, the lower the value of the machine likelihood score may be. In contrast, the lower the difference among the quality metrics, the higher the value of the machine likelihood score may be.

In some embodiments, the computer may apply an attack prediction model to the set of background events across the audio signals to generate the machine likelihood score. In some embodiments, the computer may apply the attack prediction model may also apply the quality metrics across the audio signals. The attack prediction model may be implemented using a machine learning (ML) model, an artificial intelligence (AI) algorithm, or another function. For example, the attack prediction model may be a Bayesian classifier with the background events and quality metrics as inputs and the degree of likelihood that the caller in the audio signals is a machine as the output. In some embodiments, the computer may determine a liveness score to use as the machine likelihood score.

At step 1235, the computer may identify or determine whether the machine likelihood score satisfies a threshold. The threshold may delineate, identify, or otherwise define a value for the machine likelihood score at which to classify the caller as human or machine. Generally, the lower the value of the machine likelihood score, the more likely the speaker in the audio signals may be a human speaker. Conversely, the higher the value of the machine likelihood score, the less likely the caller in the audio signals may be a machine speaker. If the machine likelihood scores satisfies (e.g., greater than or equal to) the threshold, the computer may classify the speaker as the machine caller. On the other hand, if the machine likelihood scores does not satisfy (e.g., less than) the threshold, the computer may classify the speaker as human caller.

At step 1240, if the machine likelihood score satisfies the threshold, the computer may determine, classify, or otherwise identify the caller as machine. When the machine likelihood score is greater than or equal to the threshold, the computer may determine that the machine likelihood score satisfies the threshold. A machine caller may be correlated with a source that provides sets of background audio events features that are distinct (e.g., outside 50-75% difference across sets of background audio events). For example, the source for the machine caller may provide unnatural background noise indicative of machine sources. At step 1245, if the machine likelihood score does not satisfy the threshold, the computer may determine, classify, or otherwise identify the caller as human. When the machine likelihood score is less than or equal to the threshold, the computer may determine that the machine likelihood score does not satisfy the threshold. A machine caller may be correlated with a source that provides sets of background audio events features that are relatively similar (e.g., within 10-25% difference across sets of background audio events).

At step 1250, the computer may transmit, send, or otherwise provide an indication of the caller as one of machine or human. When the caller is identified as machine, the computer may generate the indication to identify the caller as a machine caller. Conversely, when the caller is identified as human, the computer may generate the indication to identify the caller as a human caller. The computer may provide the indication to an agent computer (e.g., the agent device 116 or the callee communication device 216) for presentation that to the agent. Once received, the agent computer may display, render, or otherwise present that indication of the caller as one of fraudulent or human to the agent via an interface (e.g., a graphical user interface (GUI)).

System Combinations for Voice Liveness Detection

Figure 13:
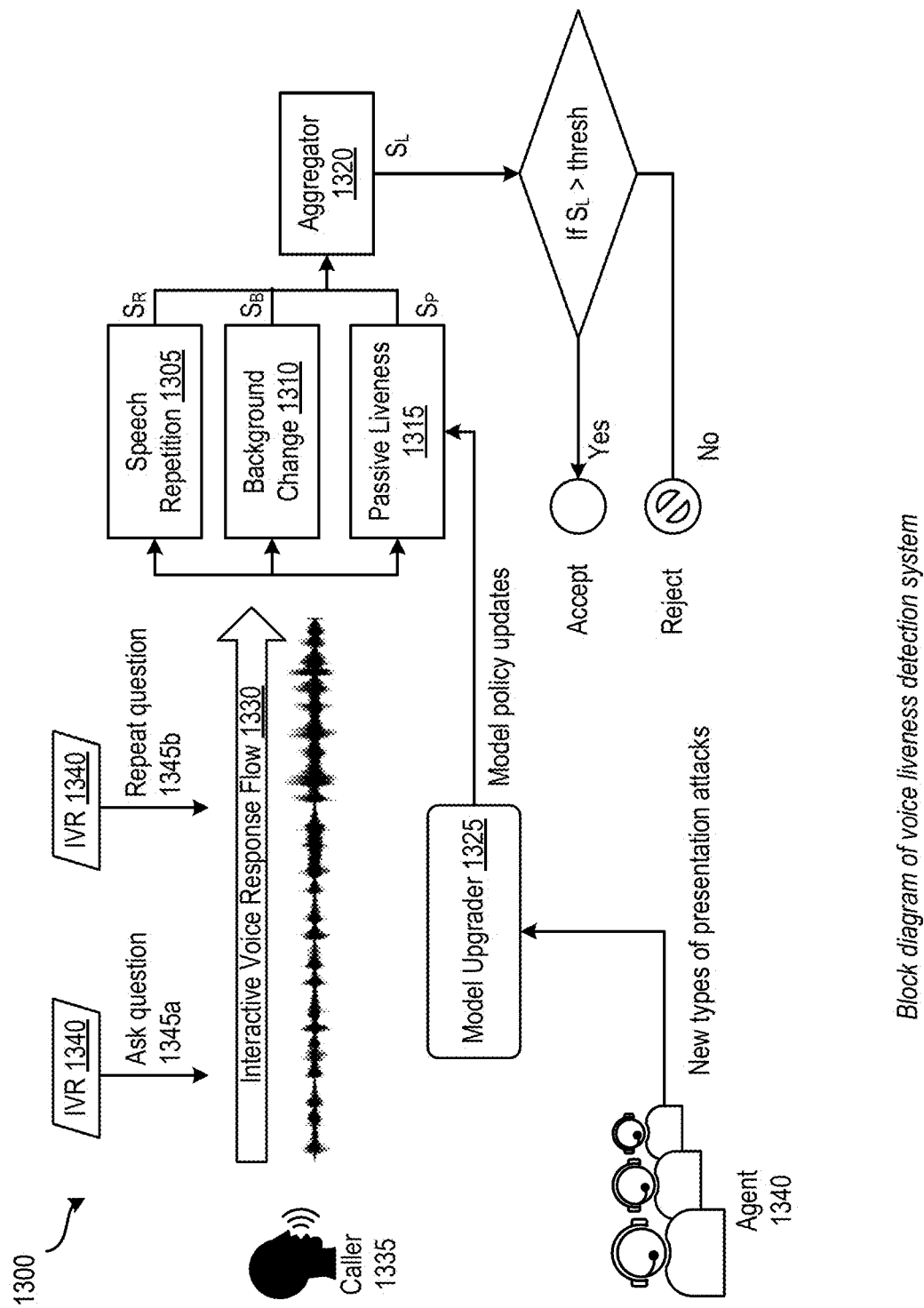
FIG. 13 is a block diagram showing components of a system for voice liveness detection in an IVR, according to an illustrative embodiment.

FIG. 13 is a block diagram showing components of a system 1300 for voice liveness detection in an IVR using one or more machine-learning architectures, according to an embodiment. The system 1300 may be implemented using components of the systems 100 or 200. The system 1300 may include one or more computing devices executing a speech repetition detector 1305, a background change detector 1310, a passive liveness detector 1315, an aggregator 1320, and a model upgrader 1325, among others. The speech repetition detector 1305, a background change detector 1310, a passive liveness detector 1315 may evaluate audio data corresponding to a response flow 1330 between a caller 1335 and an agent 1340, aided by a IVR 1340 program. The response flow 1330 may contain or include audio corresponding to questions 1345a and 1345b generated by the IVR 1340 at two time instances, and responses to the questions 1345a and 1345b from the caller 1335.

Using various features extracted from the voice flow 1330, the speech repetition detector 1305 may determine the speech phrase repetition score $S_R$. The background change detector 130 may calculate background change detection score $S_B$. The passive liveness detector 1315 may determine passive liveness detection score $S_P$. The aggregator 1320 may the set of scores to determine liveness score $S_L$ for making a decision regarding the liveness of the user audio presented at the microphone during the IVR phrase.

This combination of the set of scores by the aggregator 1320 can be performed using several methods. In some embodiments, the aggregator 1320 may use a predefined rule-based combination of scores to use a predefined formula and thresholds for each factor. In some embodiments, the aggregator 1320 may use a data-driven weighted combination of scores to produce a final liveness score $S_L$ that meets performance requirements. In some embodiments, the aggregator 1320 may use a neural network that takes the scores $S_R$, $S_B$ and $S_P$ as inputs and determines the liveness score $S_L$, predicting the likelihood that the caller is human. In some embodiments, the neural network may take intermediate pre-final layer activations from each subsystem as inputs to estimate the liveness score $S_L$.

With the determination, the aggregator 1320 may compare the liveness score to a threshold. If the liveness score is greater than the threshold, the aggregator 1320 may determine that the caller 1335 is a genuine human speaker and accept the call from the caller 1335. Conversely, if the liveness score is less than or equal to the threshold, the aggregator 1320 may determine that the caller 1335 is a deepfake and reject the call from the caller 1335. In conjunction, the model upgrader 1325 may accept feedback indicating new types of presentation attacks from the agent 1340, to adapt to new situations and speech synthesis techniques. The model upgrader 1325 may use the feedback from the agent 1340 to update the models in the speech repetition detector 1305, the background change detector 1310, the passive liveness detector 1315, or the aggregator 1320, among others.

Figure 14:
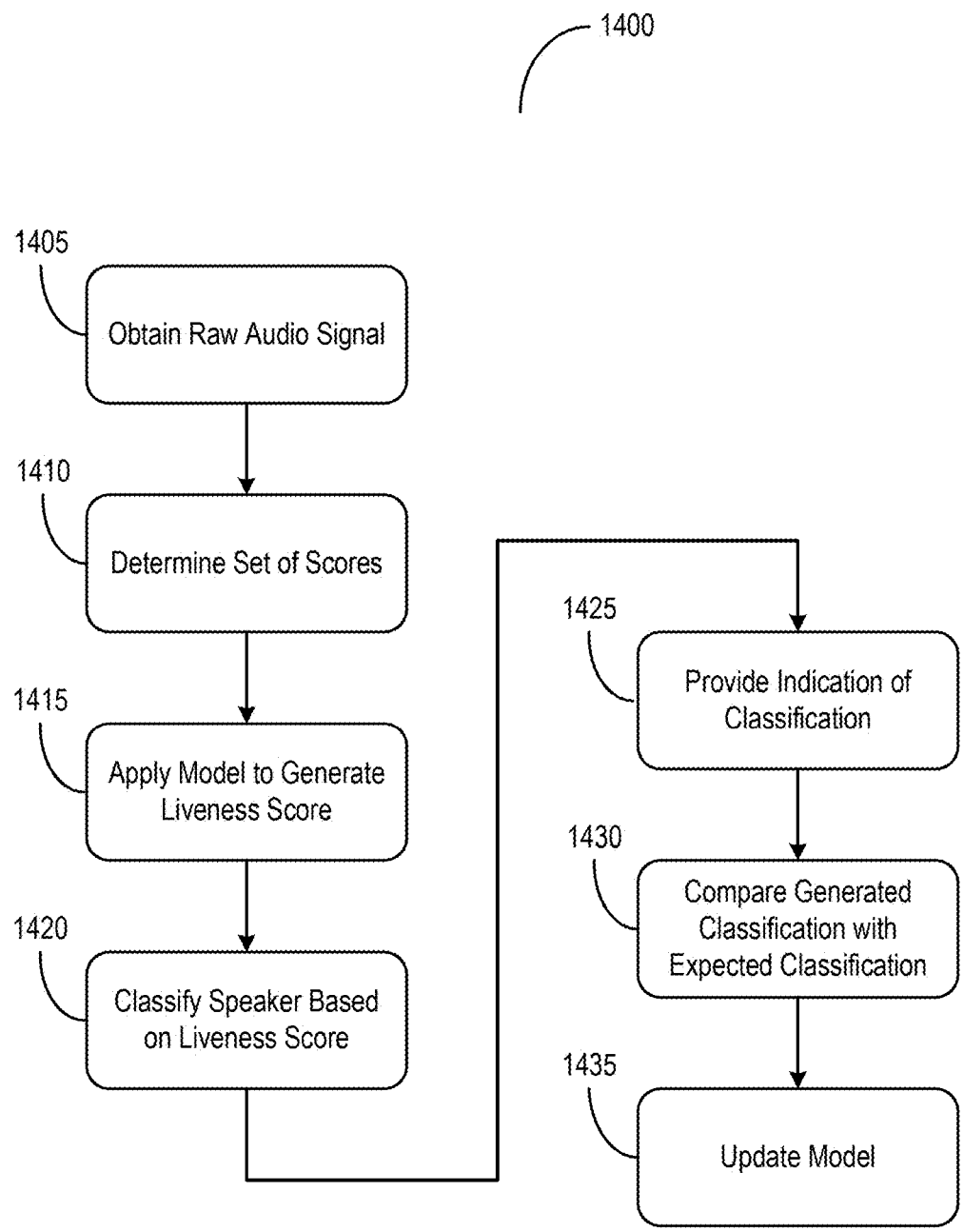
FIG. 14 shows a flow diagram of a method of generating liveness scores for speech audio, in accordance with an illustrative embodiment.

FIG. 14 shows a flow diagram of a method 1400 of generating liveness scores for speech audio with one or more machine-learning architectures. The method 1400 may be performed or implemented using any of the components detailed herein, such as the customer call center system 110, the customer analytics service system 101, and the analytics system 201, among others. Under the method 1400, at step 1405, a computer may retrieve, identify, or otherwise obtain a raw audio signal. The raw audio signal may be from a calling device (e.g., the caller device 114 or the caller communication device 214) including at least one speech signal for a speaker (e.g., the caller on the calling device). The speech signal may be acquired from the speaker, in a passive manner without any prompts (e.g., from the computer). For example, the computer may obtain the raw audio signal from audio data corresponding to a conversation between the caller and an agent on an agent device (e.g., the agent on the agent device 116, the callee agent on the callee communication device 216, or the IVR program). In some embodiments, the speech signal may be acquired from the speaker, in an active manner. For instance, the computer may obtain the raw audio signal from the audio data corresponding to an answer from the caller in response to a prompt provided by the computer or the agent device.

In some embodiments, the computer may retrieve or identify a training dataset used to train a machine learning (ML) model to generate liveness scores. The training dataset may identify or include a set of examples. Each example of the training dataset may identify or include a sample raw audio signal and a label indicating one of machine or human for the associated sample raw audio signal. From each example in the training dataset, the computer may identify the sample audio signal to train the ML model. The sample raw audio signal may include a speech signal from a calling device with a human caller or machine synthesizer. The labels may have been previously generated by an agent or another user examining the speech signal.

At step 1410, the computer may calculate, generate, or otherwise determine a set of scores based on the raw audio signal. The set of scores may be used to determine whether the speaker (e.g., the caller) in the speech signal of the raw audio signal. The set of scores may identify or include at least one first score identifying a change in the background of the speech signal; at least one second score identifying a passive liveness of the speech speaker in the speaker; and at least one third score identifying a degree of repetition of speech within the speech signal of the speaker, among others. In some embodiments, the computer may determine each score based on a set of acoustic features extracted from the speech signal of the raw audio signal.

In determining the set of scores, the computer may determine, identify, or otherwise extract a set of features from one or more portions of the raw audio signal. The set of features may include any number of features derived from the raw audio signal to use in determining whether the caller in the set of audio speech signals is a human or machine. The portions may include the speech signal from the speaker, the background, and instances of repeated audible prompts, among others. To extract, the computer may apply a machine learning (ML) model, artificial intelligence (AI) algorithm, or other functions of the machine-learning architecture to each portion of the raw audio signal. In some embodiments, the computer may apply an automated speech recognition (ASR) algorithm to the raw audio signal to extract textual content. The textual content may include or contain text in chronological sequence of strings corresponding to speech from the caller or the agent, or both In some embodiments, the computer may apply a feature extractor to the portion of the raw audio signal to generate or determine a set of acoustic parameters. The set of acoustic parameters may be, for example, Geneva Minimalistic Acoustic Parameter Set (eGeMAPS) low-level descriptor features, such as: frequency related parameters, amplitude related parameters, and spectral parameters, among others. In some embodiments, the computer may apply the ML model or algorithm to the raw audio signal to generate or determine a speech pattern of the caller. The speech pattern may identify or include, for example: a sentiment, prosody (e.g., melody or rhythm of speech), pitch, volume, or speech rate, among others, of the caller.

In extracting the set of features from the raw audio signal, the computer may determine the set of scores. Using the set of features from the background, the computer may identify or determine the first score identifying the change in the background of the speech signal. For example, the computer may determine a rate of change or lack of change in the background across one or more segments of the raw audio signal. Based on the set of features from the speech signal of the speaker, the computer may determine the score identifying a passive liveness of the speech speaker in the speaker. For instance, the computer may use the speech patterns to determine a degree of liveness of the speaker in the speech signal. From the set of features from the instances of repeated audible prompts (or other repetition), the computer may determine the score identifying a degree of repetition of speech within the speech signal of the speaker. For example, the computer may compare the set of acoustic features across multiple segments of the audio signal to determine the score indicating the degree of similarity for the score.

At step 1415, the computer may apply the ML model of the machine-learning architecture to the set of scores to calculate, determine, or otherwise generate at least one liveness score. The liveness score may identify or indicate a likelihood that the speaker in the raw audio signal is human (or conversely a machine). Using the ML model, the computer may combine, join, or otherwise aggregate the set of scores to generate the liveness score. In some embodiments, the ML model may identify, define, or otherwise a set of weights corresponding to the set of scores. Each weight of the weights may specify, identify, or otherwise define a value to which to bias or factor the respective score. To apply, the computer may feed or input the set of scores in the ML models to process the set of scores. In accordance with the set of weights defined by the ML model, the computer may generate a weighted combination (e.g., a weighted sum or average) of the set of scores as the liveness score.

In some embodiments, the ML model of the machine-learning architecture may include a neural network (e.g., a deep learning neural network) with a set of parameters arranged across a set of layers. In applying, the computer may input or feed the set of scores into the neural network. Upon feeding, the computer may process the set of scores in accordance with the set of parameters arranged across the set of layers in the neural network of the machine-learning architecture. From processing of the input set of scores, the computer may generate the liveness score. In some embodiments, the machine-learning architecture may include the ML model for the spoofprint extractor and the spoof classifier. In some embodiments, the machine-learning architectures may implement the ML models, techniques, or functions used to generate the liveness score, such as a SVM, a clustering algorithm (e.g., K-nearest neighbors), a regression model (e.g., a linear or logistic regression), or PCA, among others.

At step 1420, the computer may determine, identify, or otherwise classify the speaker as one of human or machine based on the liveness score. To classify, the computer may compare the liveness score with a threshold. The threshold may delineate, identify, or otherwise define a value for the liveness score at which to classify the speaker of one of human or machine. Generally, the higher the value of the liveness score, the more likely the speaker in the raw audio signal may be a human speaker. Conversely, the lower the value of the liveness score, the less likely the speaker in the raw audio signal may be a human speaker. If the liveness scores satisfies (e.g., greater than or equal to) the threshold, the computer may classify the speaker as a human speaker. On the other hand, if the liveness scores does not satisfy (e.g., less than) the threshold, the computer may classify the speaker as machine.

In some embodiments, the threshold may be fixed at a value pre-determined for distinguishing between the machine or human. In some embodiments, the computer may calculate, generate, or otherwise determine at least one threshold to compare against the liveness score. The determination of the threshold by the computer may be based on feedback data. The feedback data may be received via a user input on an interface (e.g., a graphical user interface) on an agent computer (e.g., the agent device 116 or the callee communication device 216). The feedback may indicate or identify a value to define the threshold. Using the feedback, the computer may assign or set the value identified in the feedback to threshold to compare against the liveness score.

The computer may determine the threshold to compare against the liveness score based on a training dataset. As discussed herein, the training dataset may include a set of examples, each of which may identify or include a sample raw audio signal and a label indicating one of machine or human for the associated sample raw audio signal. During training the ML model, the computer may adjust or update the threshold based on loss metrics. Each loss metric may identify a degree of deviation between the classification output using the liveness score from the ML model versus the label indicating the expected classification of the speaker from the training dataset. The computer may also set the threshold based on modifications of the ML model. In some embodiments, the training dataset may be acquired or derived from historical data (e.g., logs of calls between callers and agents on a database).

At step 1425, the computer may send, transmit, or otherwise provide an indication of the classification of the speaker as one of human or machine. The classification may identify whether the speaker in the speech signal of the raw audio signal as one of the genuine human speaker or machine. When the speaker is classified as human speaker, the computer may generate the indication to identify the speaker as the human speaker. Conversely, when the speaker is classified as the machine, the computer may generate the indication to identify the caller as the machine. The computer may provide the indication to an agent computer (e.g., the agent device 116 or the callee communication device 216) for presentation that to the agent. Once received, the agent computer may display, render, or otherwise present that indication of the caller as one of fraudulent or human to the agent via an interface (e.g., a graphical user interface (GUI)).

At step 1430, the computer may compare the classification generated using the liveness score from the ML model with an expected classification. The expected classification may be from feedback or the training dataset. In some embodiments, the computer may compare the generated classification with feedback. The feedback may be received via a user input on an interface (e.g., a graphical user interface) on another computer (e.g., the agent computer). The feedback may include or identify an expected classification (e.g., as indicated by the agent computer) indicating the speaker in the raw audio signal as one of human or machine. With the receipt, the computer may compare the expected classification identified in the feedback with the generated classification.

In some embodiments, the computer may retrieve or identify a corresponding label from the training dataset for the raw audio signal inputted into the ML model. In each example of the training dataset, the label may identify or include the expected classification indicating the speaker in the sample raw audio signal as one of human or machine. With the receipt, the computer may compare the expected classification identified in the label with the classification generated using the ML model. The computer may traverse through the examples to identify the corresponding example, as the computer applies the associated sample raw audio from the example to the ML model.

Based on the comparison between the generated classification and the expected classification, the computer may calculate, generate, or otherwise determine at least one loss metric. The loss metric may be determined by the computer according to a loss function, such as a mean squared error, a mean absolute error, a cross-entropy loss, or a Huber loss function, among others. The loss metric may indicate or identify a degree of deviation between the classification generated by the liveness score from the ML model versus the expected classification.

At step 1435, the computer may modify, retrain, or otherwise update the ML model based on the comparison between the generated classification and the expected classification. In some embodiments, the computer may update or retraining the ML model using the loss metric determined from the comparison. The updating or retraining may be in accordance with an optimization function, such as an implicit stochastic gradient descent (SGD), a momentum, adaptive gradient algorithm, root mean square propagation, and adaptive moment estimation (Adam), among others.

EXAMPLE EMBODIMENTS

Voice-Enabled or Voice-Assistant or AI-Enabled IVR where Caller Responses are Generated Via Deepfake In this embodiment, a computing system (e.g., the analytics system 201) leverages the voice-based IVR scenario to prompt the user to provide a response that can be used to assess the likelihood that the user is a deepfake. By processing the response in real-time and using deepfake detection system to analyze relevant features, the computing system can provide an accurate assessment of the likelihood that the response is a deepfake. Furthermore, by providing real-time feedback to the IVR system, the computing system can help prevent fraudulent activity and protect the integrity of the IVR system.

The user calls the IVR system and is prompted to provide a response to a series of questions or prompts, such as a request to enter a PIN number or to select an option from a menu. The user's response is recorded and processed to extract relevant features. The extracted features are fed into a risk engine, which is a machine learning model that has been trained on a large dataset of both real and synthetic audio data. The risk engine uses the extracted features to predict the likelihood that the response is a deepfake. The predicted probability is compared to a predefined threshold to determine whether the response is classified as a deepfake or not.

If the response is classified as a deepfake, the call can be flagged for further review and verification. If the response is not classified as a deepfake, the user can proceed to the next step in the IVR system. During the IVR session, the computing system can continue to monitor the user's responses and provide real-time feedback to the IVR system about the likelihood that the user's responses are deepfakes. If the computing system detects a deepfake during the IVR session, the call can be flagged for further review and verification.

Call Center Agent Inbound Calls to the Call Center Agent

The above embodiment can be extended to the call center agent leg of the call as well. Rather than DDS providing the response to the IVR system, it can provide the likelihood of the deepfake responses to the call center agent.

In this embodiment, the user is using deepfake while in conversation with the call center agent as the receiver. To every query by the call center agent, a response is generated through deepfake, and the agent may not be able to validate if the response is deepfake generated or human-generated. This type of misidentification by agents can lead to account takeovers and cause big losses to organizations and individuals. Alternatively, it can be scaled to generate denial-of-service attacks against call centers by overwhelming the agents with calls from deepfake audio enabled bots. Once again, by using the computing system, it can be validated if the response generated by the user is deepfake or not.

Call Center Agent Outbound Calls (Virtual Hold Scenario or Callback)

In this embodiment, the caller calls to the call center and rather than waiting in the queue to talk to the agent, the caller opts for the callback. The user calls the call center. The user is put on hold and then asked to key in his/her phone number to be called back. The call center agent initiates a callback to the user, who is prompted to provide a response to a series of questions or prompts. Rest of the steps are the same as in embodiment 1.

NLP-Based Responses are Generated Via Deepfake

In this embodiment, presented herein is a natural language processing-based solution for deepfake detection. After the user's response is transcribed. The computing system may use machine learning algorithms to analyze the text and compare it to the original content to identify any discrepancies. The computing system may employ various NLP techniques, such as authorship verification and large language modeling, to analyze the text.

The user calls the IVR system and is prompted to provide a response to a series of questions or prompts, such as a request to enter a PIN number or to select an option from a menu or state the reason for the call. The user's response is recorded and processed to be transcribed to text. The text features are fed into NLP model that has been trained on a large dataset of both real and synthetic text data to conduct classification. The text features are also fed into authorship verification model to compare the text features to that of the original speaker from the past to determine if the features originated from the same speaker.

If the response is classified as a deepfake or classified as different from the past speaker, the call can be flagged for further review and verification. If the response is not classified as a deepfake, the user can proceed to the next step in the IVR system. During the IVR session, the computing system can continue to monitor the user's responses and provide real-time feedback to the IVR system about the likelihood that the user's responses are deepfakes. If the computing system detects a deepfake during the IVR session, the call can be flagged for further review and verification.

Active Liveness Detection with an Audio Prompt

This embodiment covers the usage of the analytics system 201 in an audio interface such as IVR. When a user initiates an audio interaction with the application, the application would prompt the user to speak a particular phrase or ask a question with an expected fixed answer. This embodiment specifically covers the use case where the text-based prompt is replaced with an instruction or question presented to the user as speech audio in the application. The application can optionally be a phone conversation with an automated customer service application or a human representative.

Passive Liveness Detection with Human in the Loop

This embodiment covers the liveness detection without spoken content verification. There may be instances where the computing system needs to detect the liveness of an input utterance without any text prompting. This mode of operation of the computing system would combine only the scores from $S_V$, $S_P$ and $S_Q$ for detecting the liveness of the utterance.

Figure 15:
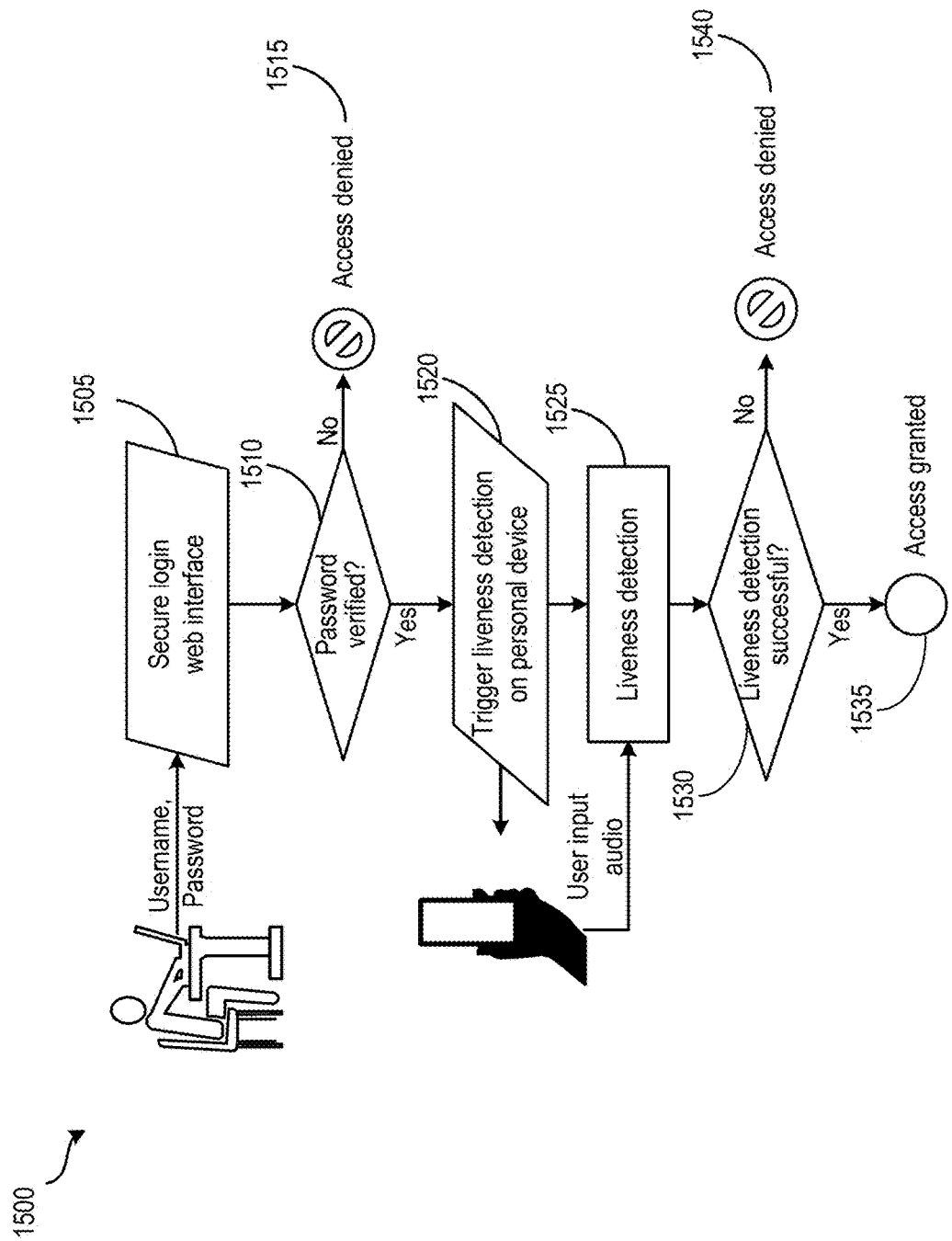
FIG. 15 shows a flow diagram of a method of using liveness detection as second factor of user authentication, according to an illustrative embodiment.

Liveness Detection on Personal Mobile Device as Second Factor for User Authentication FIG. 15 shows a flow diagram of a method 1500 for liveness detection as second factor of user authentication. The method 1500 may be performed or implemented using any of the components detailed herein, such as the customer call center system 110, the customer analytics service system 101, and the analytics system 201, among others. The active liveness detection system can be used as a second factor for user authentication. While logging in to a secure web portal, after first factor password verification, the web application can trigger the liveness detection application on the user's other personal devices like smartphone, smartwatch or a VR headset to verify the liveness of the user as a second factor of authentication. The verification result would be shared with the web application, which would then make a decision about granting entry into the user's profile.

Under the method 1500, at step 1505, a computer may retrieve, identify, or otherwise receive user authentication credentials from a caller (sometimes referred herein as a user) of a caller device (e.g., the caller device 114 or the caller communication device 214). The user authentication credentials may identify or include a user identifier (e.g., an account identifier or a username for the caller) and a passcode (e.g., a password or non-vocal biometric information) to be used to authenticate the caller. The user authentication credentials mays be received as part of a first factor authentication procedure of a multi-factor authentication process to access a resource through the computer (e.g., the customer call center 110). The caller may input the user authentication credentials using input/output (I/O) devices on the caller device. For example, the caller may enter the account identifier and passcode via a keyboard of the caller device. Upon entry, the caller device may send the credentials to the computer.

At step 1510, the computer may determine whether an initial authentication using authentication credentials is successful. The initial authentication using authentication credentials may be part of a first factor authentication. With the receipt of the authentication credentials, the computer may carry out, perform, or otherwise execute the initial authentication. The computer may check the authentication credentials received from the caller against the credentials for the caller maintained on the computer. For example, the computer may maintain a database (e.g., the database 112 in the customer call center system 110) with account identifiers with corresponding passcodes to compare against received credentials. In checking, the computer may identify the stored passcode with the received passcode for the authentication credential.

With the identification, the computer may compare the passcodes for the caller corresponding to the account identifier. If the passcodes do not match, the computer may determine that the initial authentication is unsuccessful. On the other hand, if the passcodes match, the computer may determine that the initial authentication is successful. In some embodiments, the computer may invoke a separate service (e.g., an identity provider) to carry out the initial authentication. The service may return the results of the initial authentication process. At step 1515, if the initial authentication is unsuccessful, the computer may terminate the authentication to deny access. For example, the computer may send, provide, or otherwise return an indication that the initial authentication is unsuccessful to the caller computer for presentation. The caller on the caller computer may be provided with an opportunity to reenter initial authentication credentials.

At step 1520, if the initial authentication using the initial authentication credentials is successful, the computer may trigger liveness detection on the caller device. In performing the detection, the computer may retrieve, receive, or otherwise identify at least one audio speech signal from the caller on the caller device. The audio speech signal may be used for a second factor authentication of the multi-authentication procedure. The audio speech signal may be received in a passive manner (e.g., without prompt) or an active manner (e.g., upon prompting). In some embodiments, the computer may retrieve or acquire the audio speech signal from audio data for a conversation between the caller and an agent on the agent device (e.g., the agent on the agent device 116). In some embodiments, the computer may provide, send, or otherwise transmit a prompt (e.g., an audio prompt via the agent device 116 or a notification on a graphical user interface (GUI) on the caller device) to direct the caller to provide the audio speech signal. Upon transmitting the prompt, the computer may receive the audio speech signal from the caller on the caller device.

The computer may generate, determine, or otherwise extract a set of features from the audio speech signal. The set of features may include any number of features derived from one or more portions the raw audio signal to use in determining whether the caller in the set of audio speech signals is a human or machine. The portions may include the speech signal from the speaker, the background, and instances of repeated audible prompts, among others. To extract, the computer may apply a machine learning (ML) model, artificial intelligence (AI) algorithm, or other functions to each portion of the raw audio signal. In some embodiments, the computer may apply an automated speech recognition (ASR) algorithm to the raw audio signal to extract textual content. The textual content may include or contain text in chronological sequence of strings corresponding to speech from the caller or the agent, or both.

In some embodiments, the computer may apply a feature extractor to the portion of the raw audio signal to generate or determine a set of acoustic parameter. The set of acoustic parameters may be, for example, Geneva Minimalistic Acoustic Parameter Set (eGeMAPS) low-level descriptor features, such as: frequency related parameters, amplitude related parameters, and spectral parameters, among others. In some embodiments, the computer may apply the ML model or algorithm to the raw audio signal to generate or determine a speech pattern of the caller. The speech pattern may identify or include, for example: a sentiment, prosody (e.g., melody or rhythm of speech), pitch, volume, or speech rate, among others, of the caller.

In some embodiments, the computer may use a machine learning architecture including a spoofprint extractor to generate or extract a set of spoofprint embeddings for the set of acoustic features. The spoofprint extractor may be part of a machine learning architecture, and may be used to extract the spoofprint embedding. To apply, the computer may input or feed the audio speech signal (or the other set of acoustic features) to the spoofprint extractor. From processing, the computer may generate the spoofprint embedding including a reduced representation of the audio speech signal used to determine whether the speaker is machine or human.

The computer may calculate, determine, or otherwise generate a liveness score of the caller in the audio speech signal. In generating the liveness score, the computer may calculate, generate, or otherwise determine a set of constituent scores. Using the set of features from the background, the computer may identify or determine the first score identifying the change in the background of the speech signal. For example, the computer may determine a rate of change or lack of change in the background across one or more segments of the raw audio signal. Based on the set of features from the speech signal of the speaker, the computer may determine the score identifying a passive liveness of the speech speaker in the speaker. For instance, the computer may use the speech patterns to determine a degree of liveness of the speaker in the speech signal. From the set of features from the instances of repeated audible prompts (or other repetition), the computer may determine the score identifying a degree of repetition of speech within the speech signal of the speaker. For example, the computer may compare the set of acoustic features across multiple segments of the audio signal to determine the score indicating the degree of similarity for the score.

With the determination, the computer may apply a ML model of the machine-learning architecture to the set of scores to calculate, determine, or otherwise generate at least one liveness score. The liveness score may identify or indicate a likelihood that the speaker in the raw audio signal is human (or conversely a machine). The ML model may have been initialized and trained using a training dataset with a set of examples. In some embodiments, the ML model of the machine-learning architecture may include a neural network (e.g., deep learning neural network) with a set of parameters arranged across a set of layers. In applying, the computer may input or feed the set of scores into the neural network. Upon feeding, the computer may process the set of scores in accordance with the set of parameters arranged across the set of layers in the neural network of the machine-learning architecture. From processing of the input set of scores, the computer may generate the liveness score. Other potential machine-learning architectures may implement the ML model, techniques, or functions used to generate the liveness score, such as a SVM, a clustering algorithm (e.g., k-nearest neighbors), a regression model (e.g., a linear or logistic regression), or PCA, among others. In some embodiments, the computer may use the machine learning architecture including a spoofprint classifier to generate the liveness score based on the set of spoofing embeddings extracted by the spoofprint extractor. The liveness score may identify or indicate a likelihood that the speaker is a human speaker (or a machine). From processing, the computer may generate the liveness score for the speaker (e.g., the caller) in the raw audio signal.

At step 1530, the computer may determine whether the liveness detection is successful. In determining, the computer may identify or determine whether the liveness score satisfies a threshold. The threshold may delineate, identify, or otherwise define a value for the liveness score at which to classify the caller of one of human or machine. Generally, the higher the value of the liveness score, the more likely the speaker in the raw audio signal may be a human speaker. Conversely, the lower the value of the liveness score, the less likely the speaker in the raw audio signal may be a human speaker. The computer may compare the liveness score with the threshold to determine, identify, or otherwise classify the caller in the audio speech signal as one of genuine human or machine generated speech. If the liveness scores satisfies (e.g., greater than or equal to) the threshold, the computer may classify the caller as a human speaker. On the other hand, if the liveness scores does not satisfy (e.g., less than) the threshold, the computer may classify the caller as machine.

At step 1535, if the liveness score satisfies the threshold, the computer may proceed to complete a final authentication of the caller. The final authentication may be a terminal or last factor in the multi-factor authentication process (e.g., first with the user authentication credentials and second with the audio speech signal). When the caller is classified as a human speaker, the computer may determine that the final authentication is successful to complete the multi-factor authentication process. The computer may perform the final authentication to permit the client access to the resource. At step 1540, if the liveness score does not satisfy the threshold, the computer may terminate the final authentication of the caller. When the caller is classified as a machine, the computer may determine that the final authentication is unsuccessful and may terminate the multi-factor authentication process. The computer may perform the final authentication to restrict the client access from the resource.

The computer may transmit, send, or otherwise provide an indication of a result of the final authentication. The indication may be provided to the caller device or the agent device, or both, and may be of the result of the final authentication identifying whether the user is permitted access to the resource. If the final authentication is successful, the computer may provide the indication that the final authentication is successful. The computer may also provide the indication identifying the caller in the audio speech signal as human. The computer may also provide the indication to grant or permit the caller access to the resources. If the final authentication is unsuccessful, the computer may provide the indication that the final authentication is unsuccessful. The computer may also provide the indication identifying the caller in the audio speech signal as machine generated. The computer may also provide the indication to block or restrict the caller access to the resources.

User Prompt Based on Speech Quality Estimate

A speech quality estimator can be used to check the quality of any input speech utterance irrespective of liveness detection. If the quality is below a predefined threshold, then the system can provide feedback to the user to move closer to the device or move to a quieter place.

ADDITIONAL EXAMPLE EMBODIMENTS

A deepfake detection system for use in a call center environment, comprising a feature extractor for extracting one or more above mentioned features from a user's response to a prompt in the IVR system or to the agent; a risk engine, comprising a machine learning model trained to classify responses as either real or deepfake based on the extracted features; and a processor for receiving the extracted features and outputting a prediction of the likelihood that the response is a deepfake.

A deepfake detection system for use in a call center environment, comprising: a feature extractor for extracting time delay features from a user's response to a prompt in the IVR system or a call center agent's questions, wherein the time delay features represent the time between the prompt and the user's response; a risk engine, comprising a machine learning model trained to classify responses as either real or deepfake based on the extracted features; a processor for receiving the extracted time delay features and outputting a prediction of the likelihood that the response is a deepfake based on the risk engine's classification of the response.

A deepfake detection system comprising a processor that executes natural language processing software functions for analyzing text and speech associated with audio content or text content; and identifying one or more discrepancies between original and deepfake content.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for detecting machine-based speech in calls, comprising:
   obtaining, by a computer, an audio speech signal for a caller from a caller device;
   identifying, by the computer, textual content from the audio speech signal for the caller;
   applying, by the computer, a feature extractor to the textual content to generate a plurality of natural language processing (NLP) features, each of the plurality of NLP features indicating a degree of a likelihood that the textual content as machine generated; and
   classifying, by the computing, based on the plurality of NLP features, the caller as one of a machine or a human.

2. The method of claim 1, wherein applying the feature extractor includes generating, by the computer, an NLP feature indicating authorship verification by applying the feature extractor trained on second textual content from the caller.

3. The method of claim 1, wherein applying the feature extractor includes generating, by the computer, an NLP feature indicating a degree of contextual similarity between the textual content of the caller and a second textual content of an agent in the audio speech signal, by applying the feature extractor trained on a textual corpus.

4. The method of claim 1, wherein applying the feature extractor includes generating, by the computer, an NLP feature indicating a degree of likelihood that the textual content is generated by a large language model (LLM), by applying the feature extractor trained on a corpus of human text and machine text.

5. The method of claim 1, wherein applying the feature extractor includes generating, by the computer, one or more NLP features indicating (i) a sentiment of the caller from a plurality of candidate sentiments and (ii) at least one of an intensity or a duration of the sentiment within the textual content.

6. The method of claim 1, wherein applying the feature extractor includes generating, by the computer, an NLP feature identifying a distribution of unique words within the textual content.

7. The method of claim 1, wherein the computer classifies the caller based on a plurality of acoustic features extracted from the audio speech signal.

8. The method of claim 1, further comprising comparing, by the computer, the plurality of NLP features against a rule defining a combination of NLP features correlated with one of machine-generate speech or human-generated speech.

9. The method of claim 1, further comprising classifying, by the computer, the caller as a machine, responsive to determining that the plurality of NLP features satisfying a combination of NLP features correlated with machine generated speech.

10. The method of claim 1, further comprising providing, by the computer, via an interface, an indication of the caller classified as one of the machine or human.

11. A system for detecting machine-based speech in calls, comprising:
   a computer having one or more processors and configured to:
      obtain an audio speech signal for a caller from a caller device;
      identify textual content from the audio speech signal for the caller;
      apply a feature extractor to the textual content to generate a plurality of natural language processing (NLP) features, each of the plurality of NLP features indicating a degree of a likelihood that the textual content as machine generated; and
      classify based on the plurality of NLP features, the caller as one of a machine or a human.

12. The system of claim 11, wherein, when applying the feature extractor, the computer is configured to generate an NLP feature indicating authorship verification by applying the feature extractor trained on second textual content from the caller.

13. The system of claim 11, wherein, when applying the feature extractor, the computer is further configured to generate an NLP feature indicating a degree of contextual similarity between the textual content of the caller and a second textual content of an agent in the audio speech signal, by applying the feature extractor trained on a textual corpus.

14. The system of claim 11, wherein, when applying the feature extractor, the computer is further configured to generate an NLP feature indicating a degree of likelihood that the textual content is generated by a large language model (LLM), by applying the feature extractor trained on a corpus containing human text and machine text.

15. The system of claim 11, wherein, when applying the feature extractor, the computer is further configured to generate one or more NLP features including (i) a sentiment of the caller from a plurality of candidate sentiments and (ii) at least one of an intensity or a duration of the sentiment within the textual content.

16. The system of claim 11, wherein, when applying the feature extractor, the computer is further configured to generate an NLP feature indicating a distribution of unique words within the textual content.

17. The system of claim 11, wherein the computer is configured to classify the caller based on a plurality of acoustic features extracted from the audio speech signal.

18. The system of claim 11, wherein the computer is further configured to compare the plurality of NLP features with a rule defining a combination of NLP features correlated with one of machine-generated speech or human-generated speech.

19. The system of claim 11, wherein the computer is further configured to classify the caller as machine, responsive to determining that the plurality of NLP features satisfying a combination of NLP features correlated with machine generated speech.

20. The system of claim 11, wherein the computer is further configured to provide, via an interface, an indication of the caller classified as one of the machine or human.

* * * * *